United States Patent [19]
Lee et al.

[11] Patent Number: 5,007,054
[45] Date of Patent: Apr. 9, 1991

[54] NETWORK AND PROTOCOL FOR REAL-TIME CONTROL OF MACHINE OPERATIONS

[75] Inventors: David K. Lee, Monroe; Peter C. DiGiulio, Bridgeport, both of Conn.

[73] Assignee: Pitney Bowes Inc., Stamford, Conn.

[21] Appl. No.: 291,477

[22] Filed: Dec. 28, 1988

[51] Int. Cl.$^5$ .............................................. G06F 11/00
[52] U.S. Cl. ..................................................... 371/32
[58] Field of Search .................... 371/32, 34; 364/131, 364/200, 900

[56] References Cited
U.S. PATENT DOCUMENTS
4,587,609  5/1986  Boudreau ............................ 364/200

*Primary Examiner*—Jerry Smith
*Assistant Examiner*—Robert W. Beausoliel
*Attorney, Agent, or Firm*—Charles G. Parks, Jr.; David E. Pitchenik; Melvin J. Scolnick

[57] ABSTRACT

A communication network is comprised of a first, second, third and fourth controller node in line communication. Each controller node includes a microprocessor. Each microprocessor is programmable to respond to and generate data message bytes, each data byte having one start bit, eight data bits, one programmably settable bit and one stop bit. Each microprocessor is further programmable to respond only to a unique address-command data message byte from a message source node. The address-command byte is recognized because the settable bit is set. Each microprocessor is programmed to generate a reply message byte with the ninth bit not set and to then receive from the source node a message count byte followed uninterrupted by the data message bytes. Upon receiving a complete data message conforming to the received count of the count byte, the microprocessor then generates an acknowledgement byte.

4 Claims, 43 Drawing Sheets

MMP/METER COMMUNICATION SYSTEM INTERFACE

FIG. 2A

<ADD. CMD> (REPLY) [protocol control], or
<ADD. CMD> (REPLY) <BYTE. C> <data> [<data>--<data>] <CRCH><CRCL>(ACK/NAK)
[between MMP and Meter, or MMP send a message to WOW], or

FIG. 2B

<ADD. CDM> (REPLY) (BYTE. C) (data) [(data)--(data)] (CRCH) (CRCL) <ACK/NAK>
[MMP receives a message from WOW], or

FIG. 2C

<ADD. CMD> (REPLY) <BYTE. C> <data> [<data>--<data>] <CRCH> <CRCL> (ACK)
(BYTE. C) (data) [(data)--(data)] (CRCH) (CRCL) <ACK/NAK> [Meter transmits
a message to Dater and it receives a message from Dater.], or

FIG. 2D

<ADD. CMD> (REPLY) <BYTE. C> <data> [<data>--<data>] <CRCH> <CRCL> (NAK)
[Meter transmits a message to Dater, but CRC error].

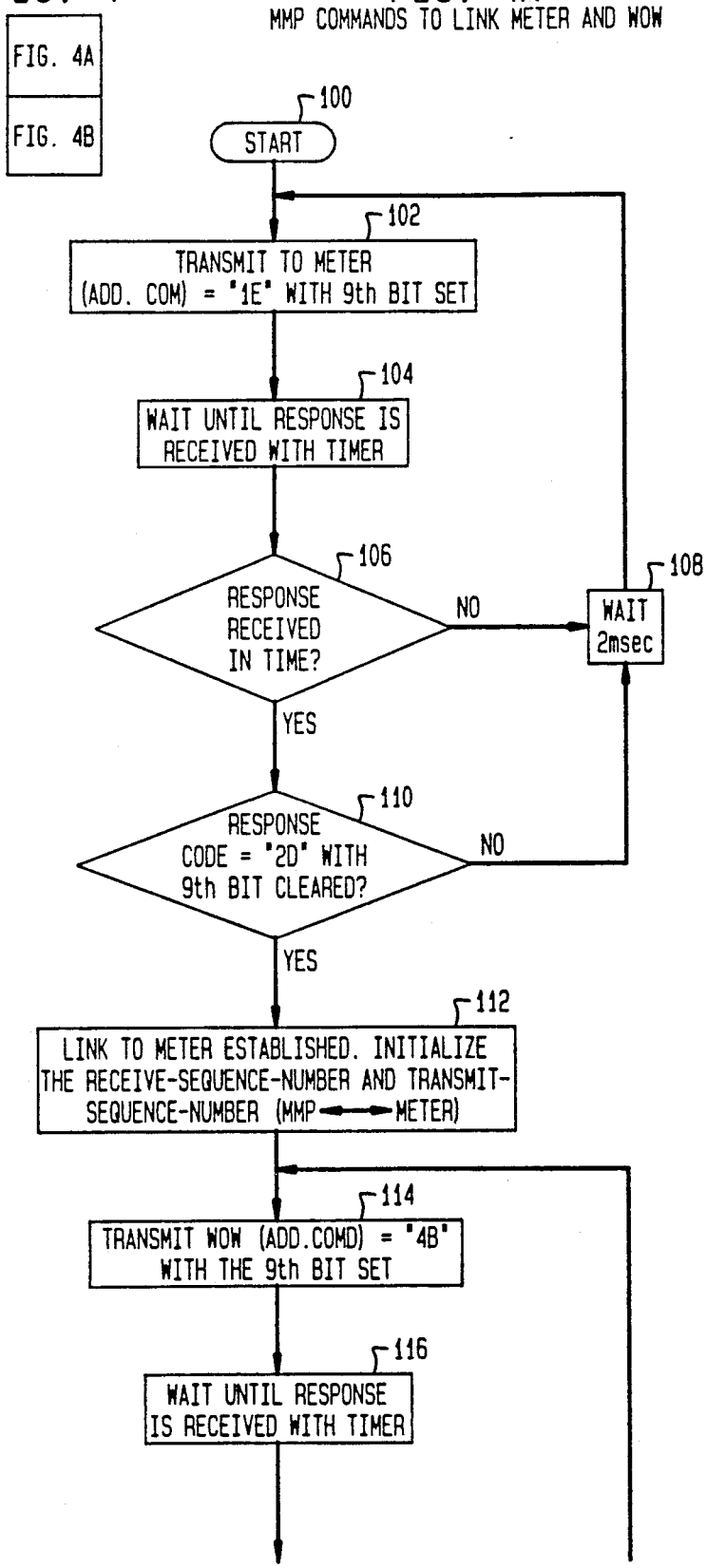

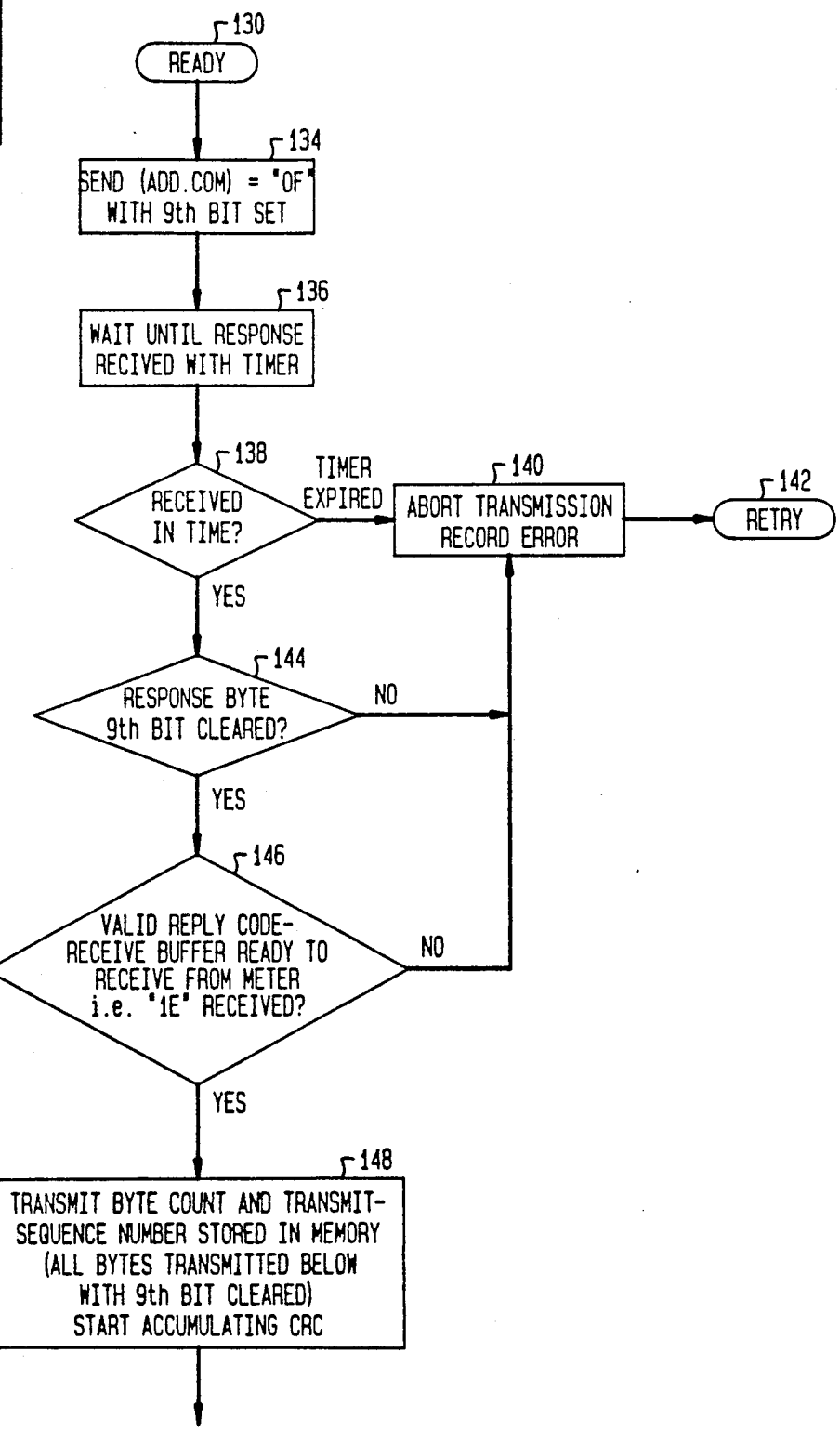

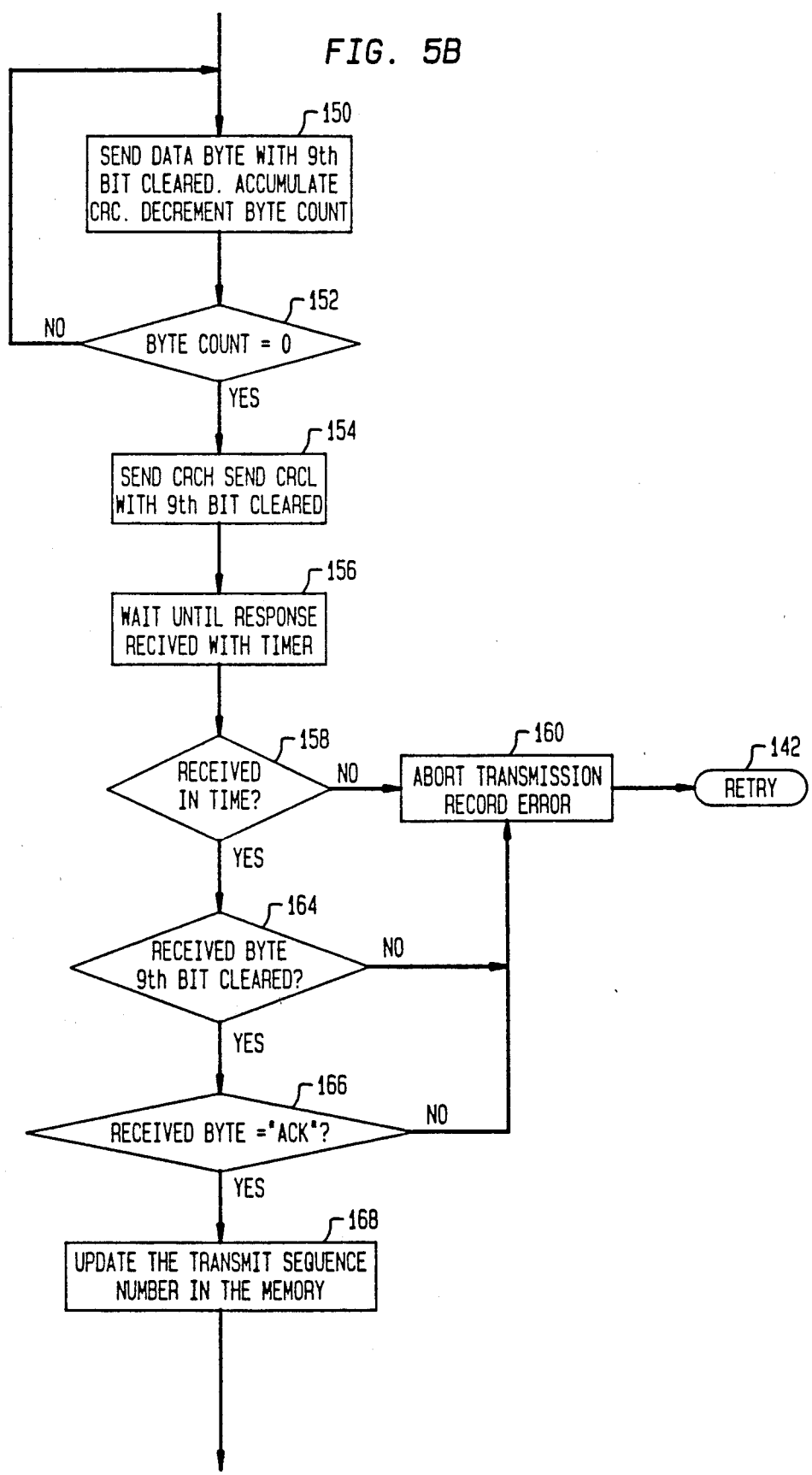

MMP RECEIVE PROCEDURE FROM METER

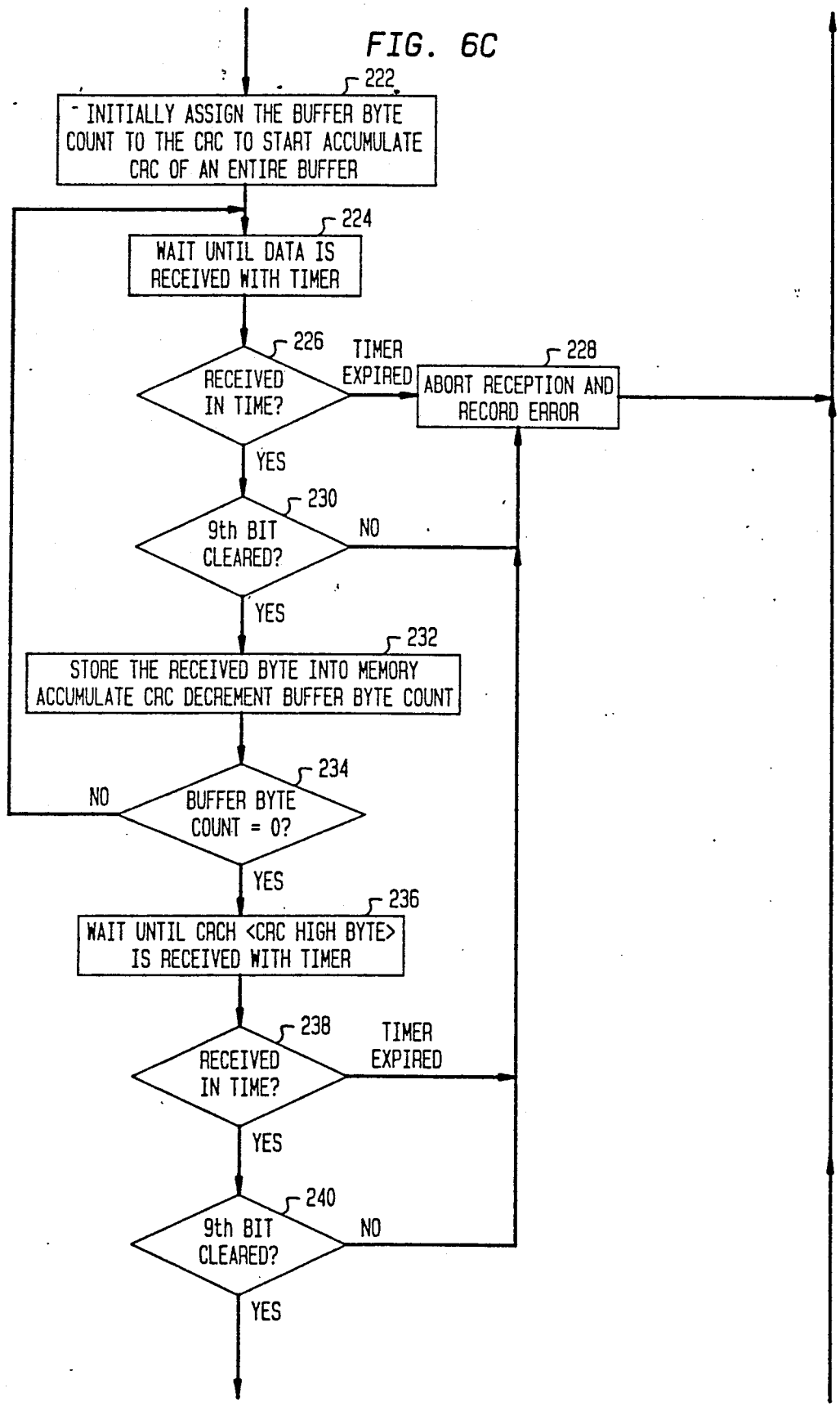

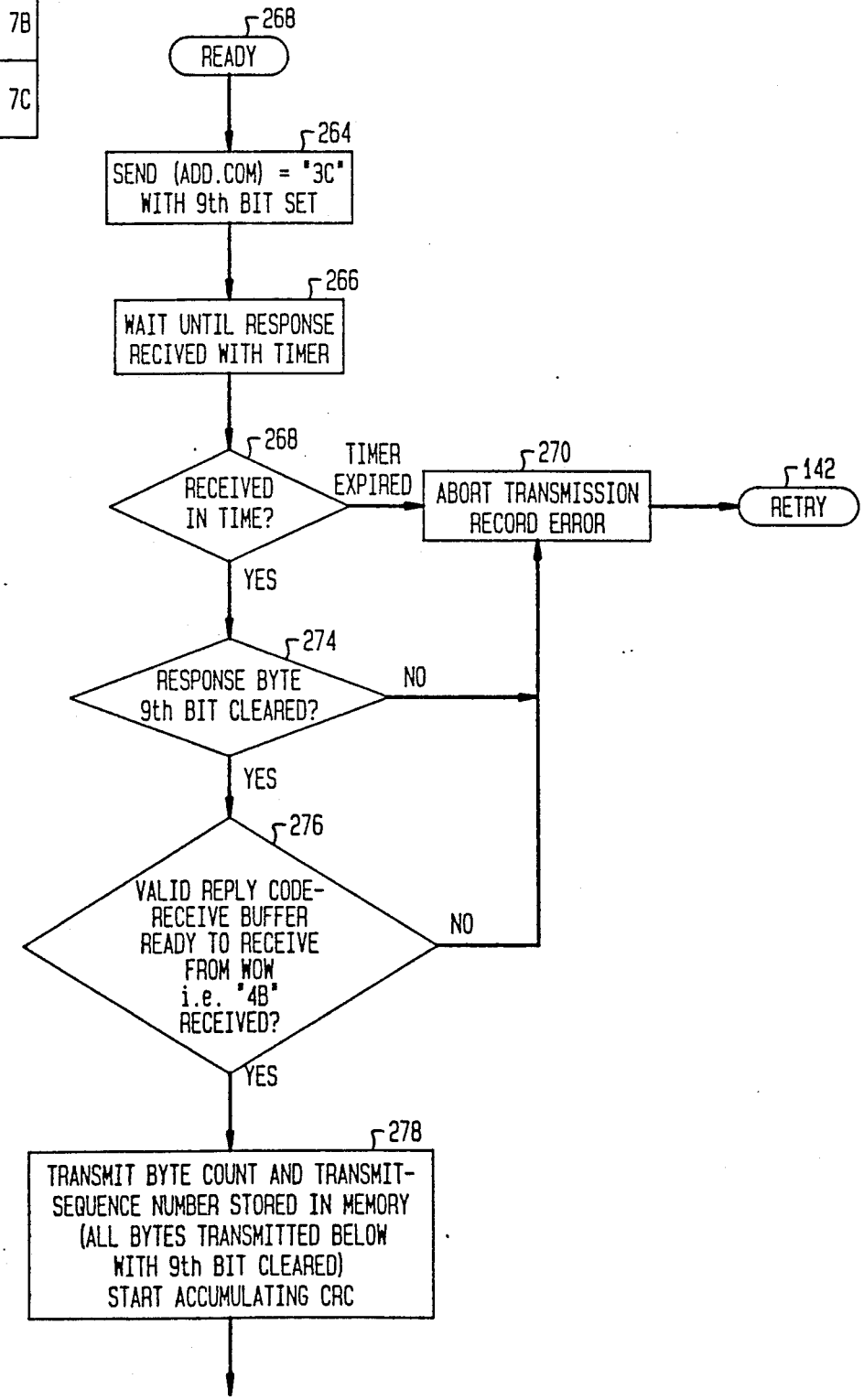

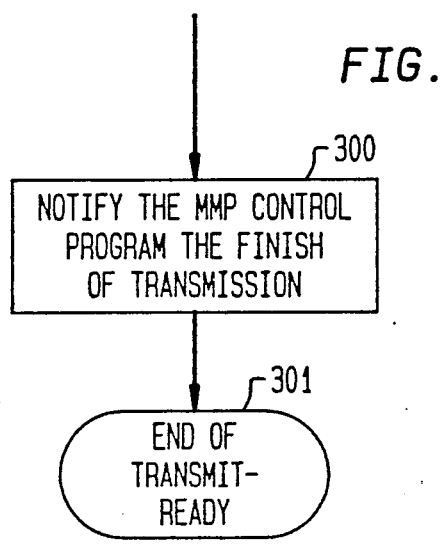

MMP RECEIVE POLLING PROCEDURE FROM WOW

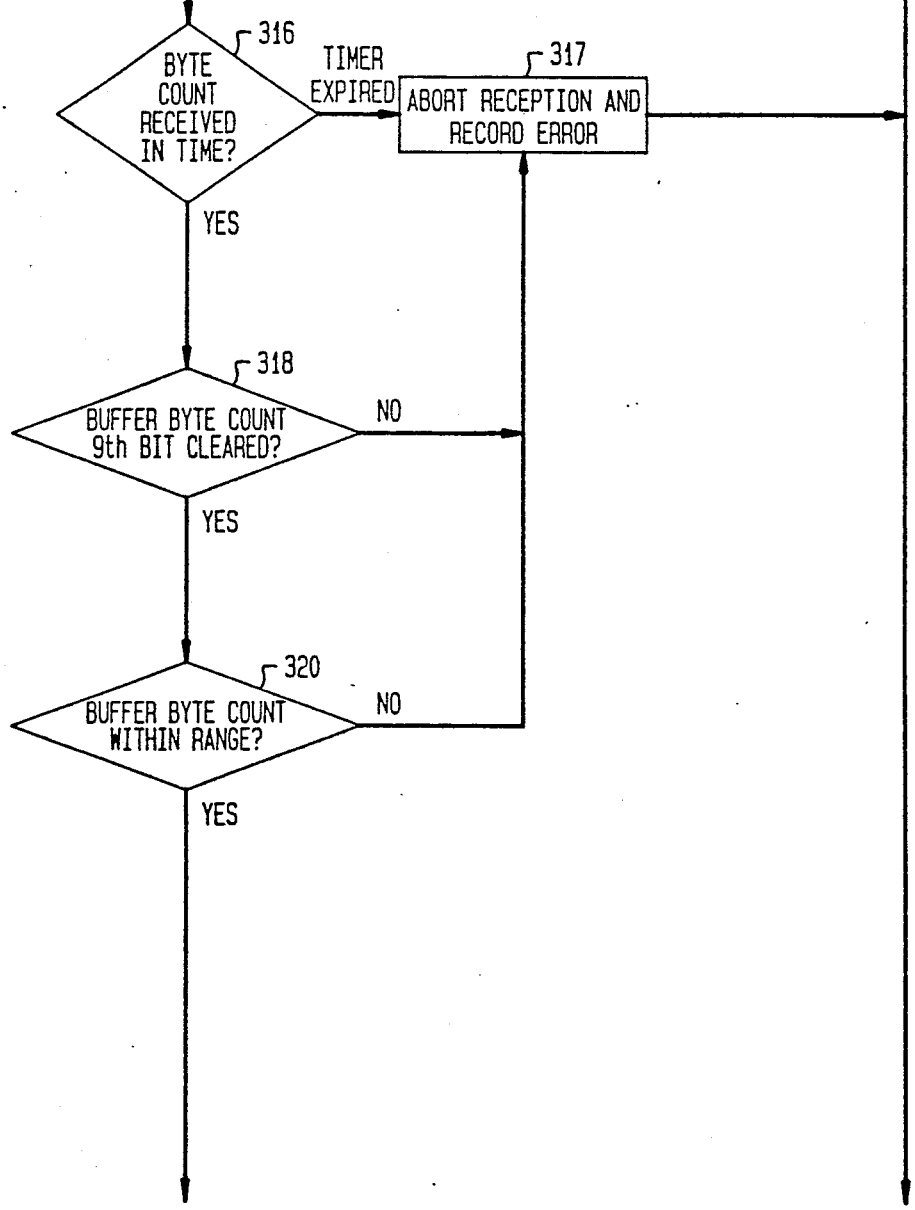

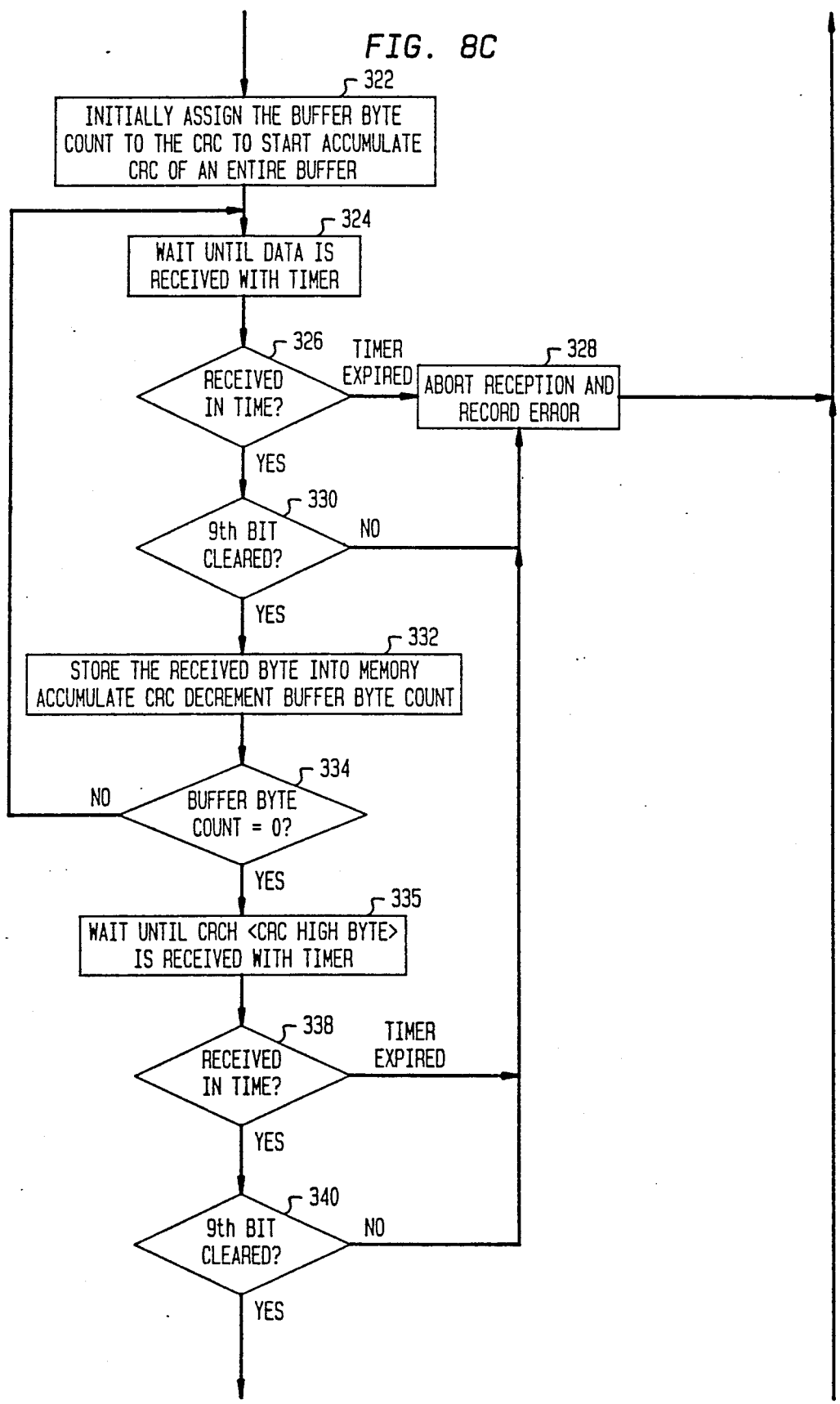

METER COMMANDS TO LINK DATER

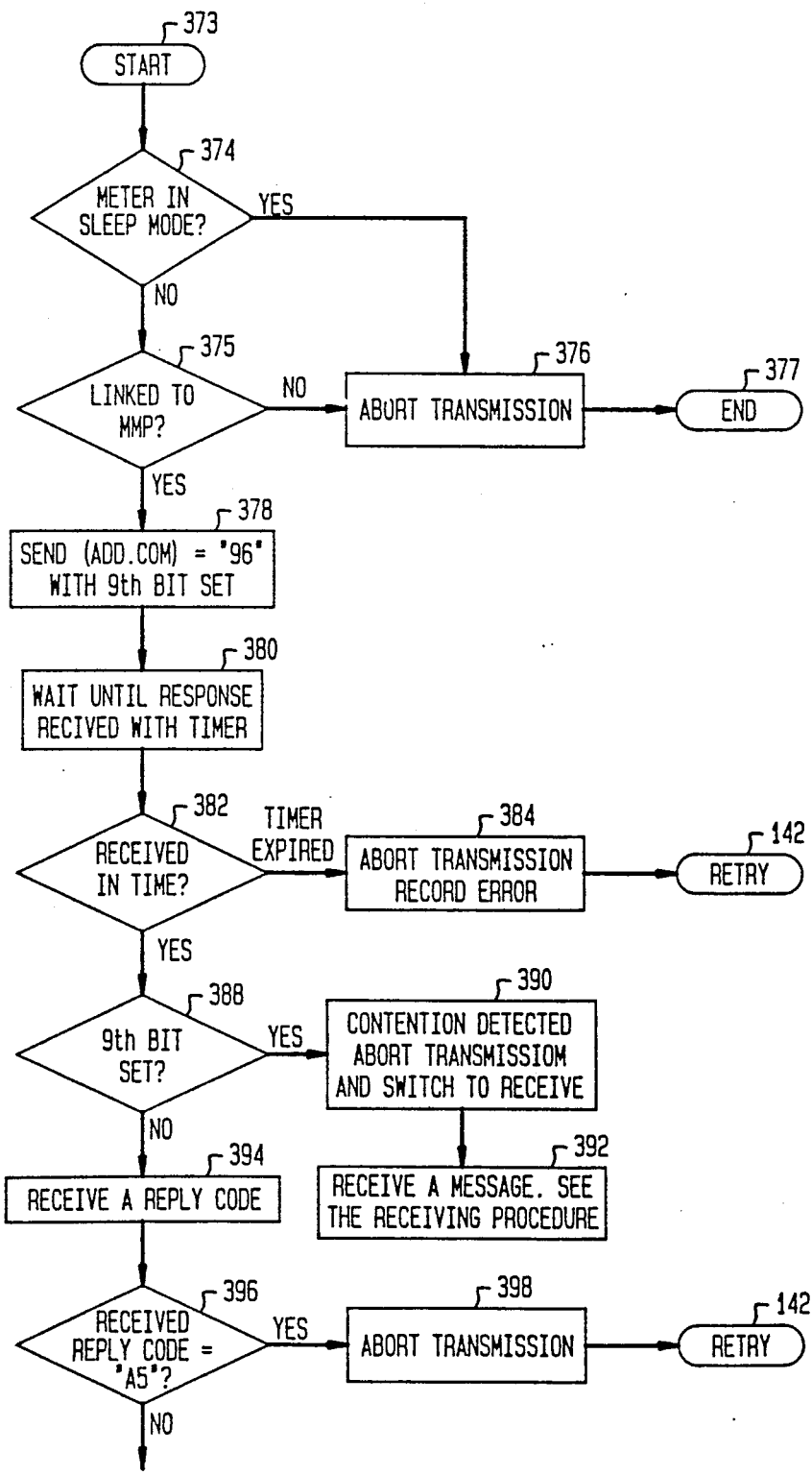

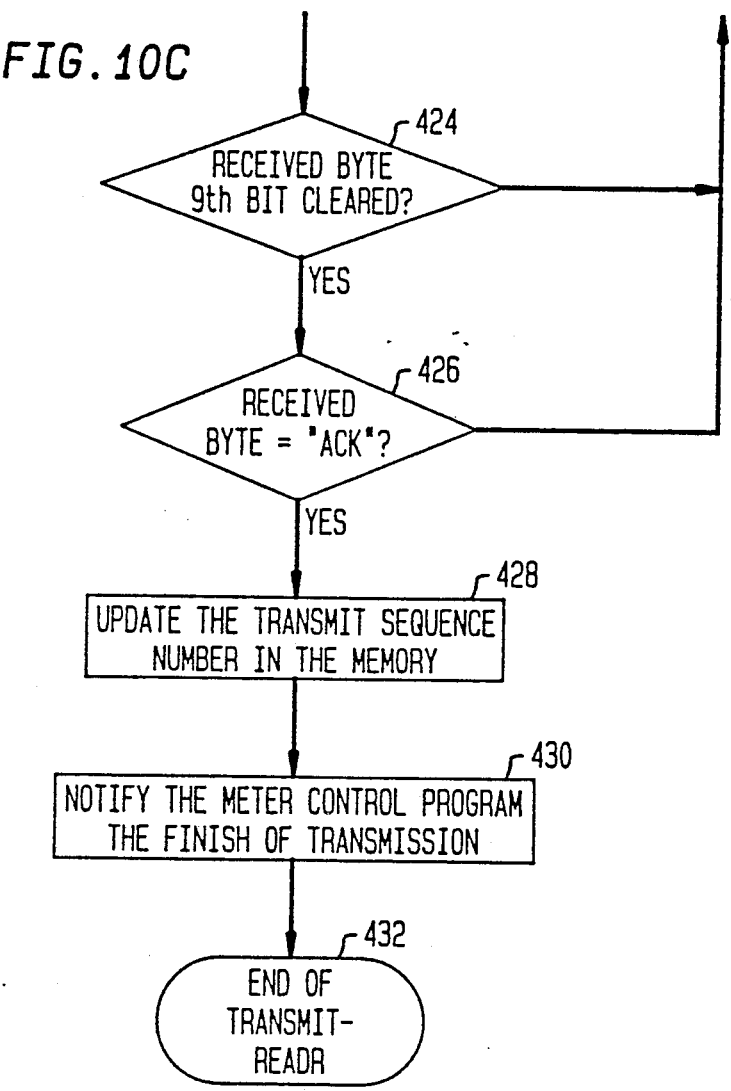

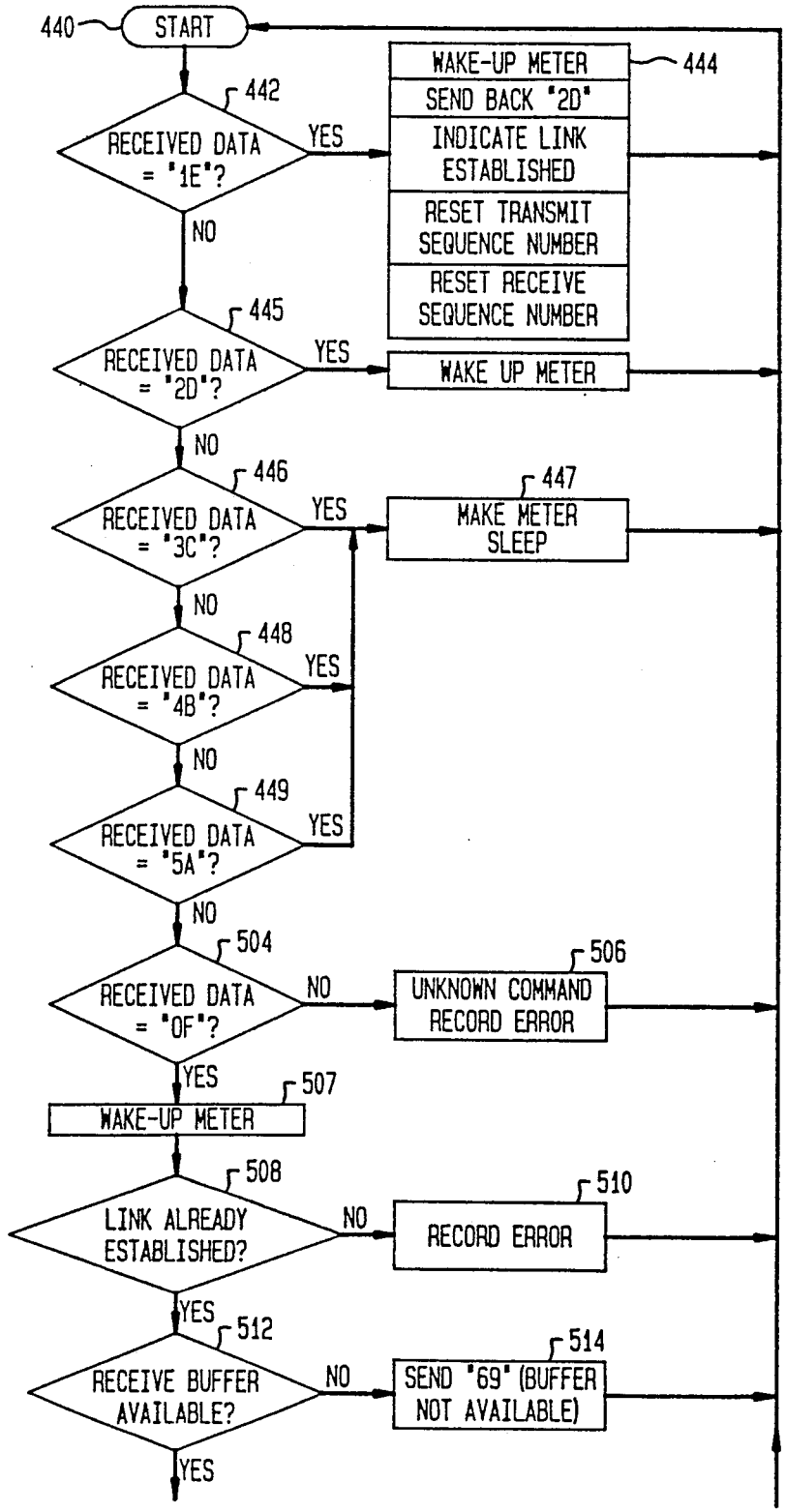

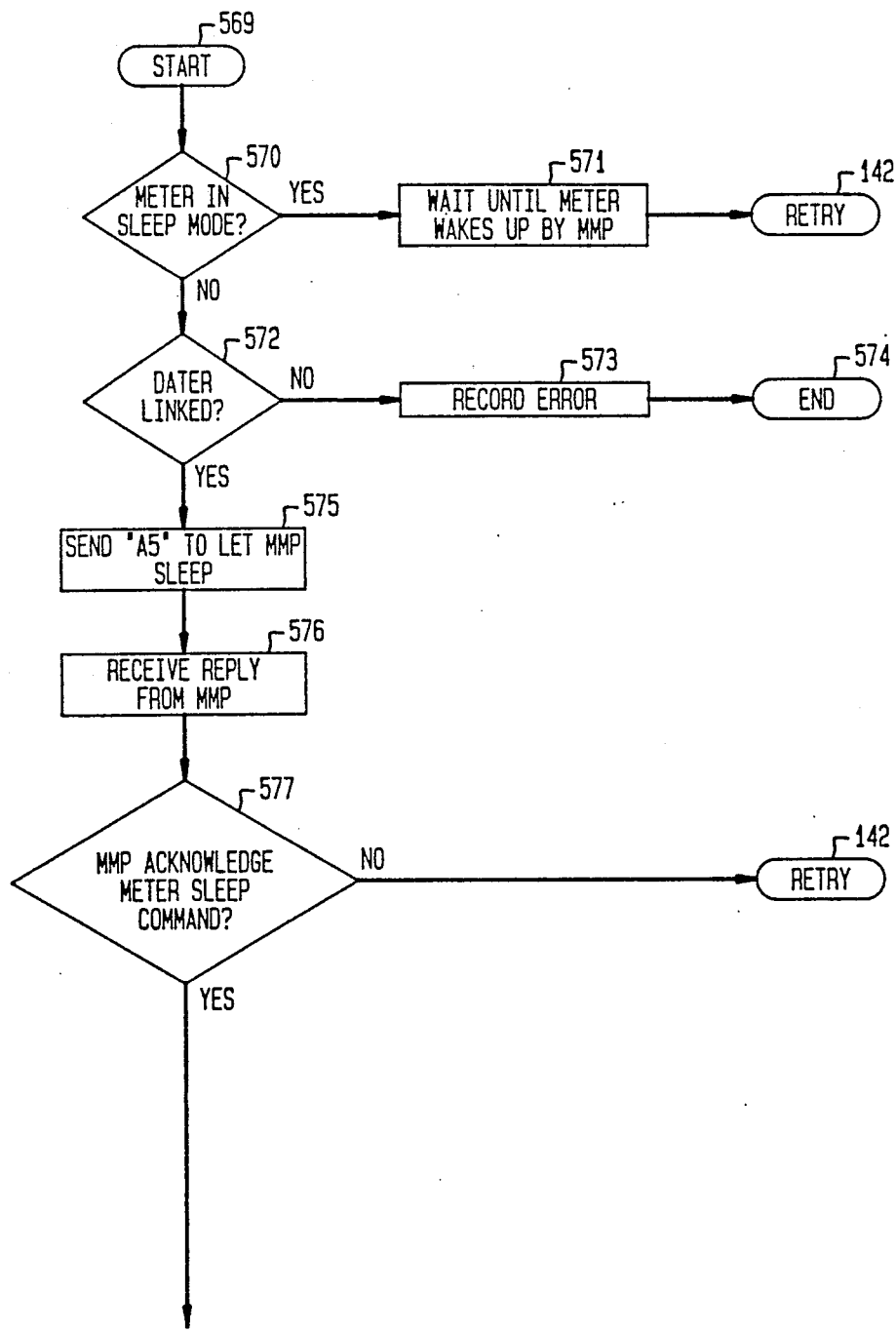

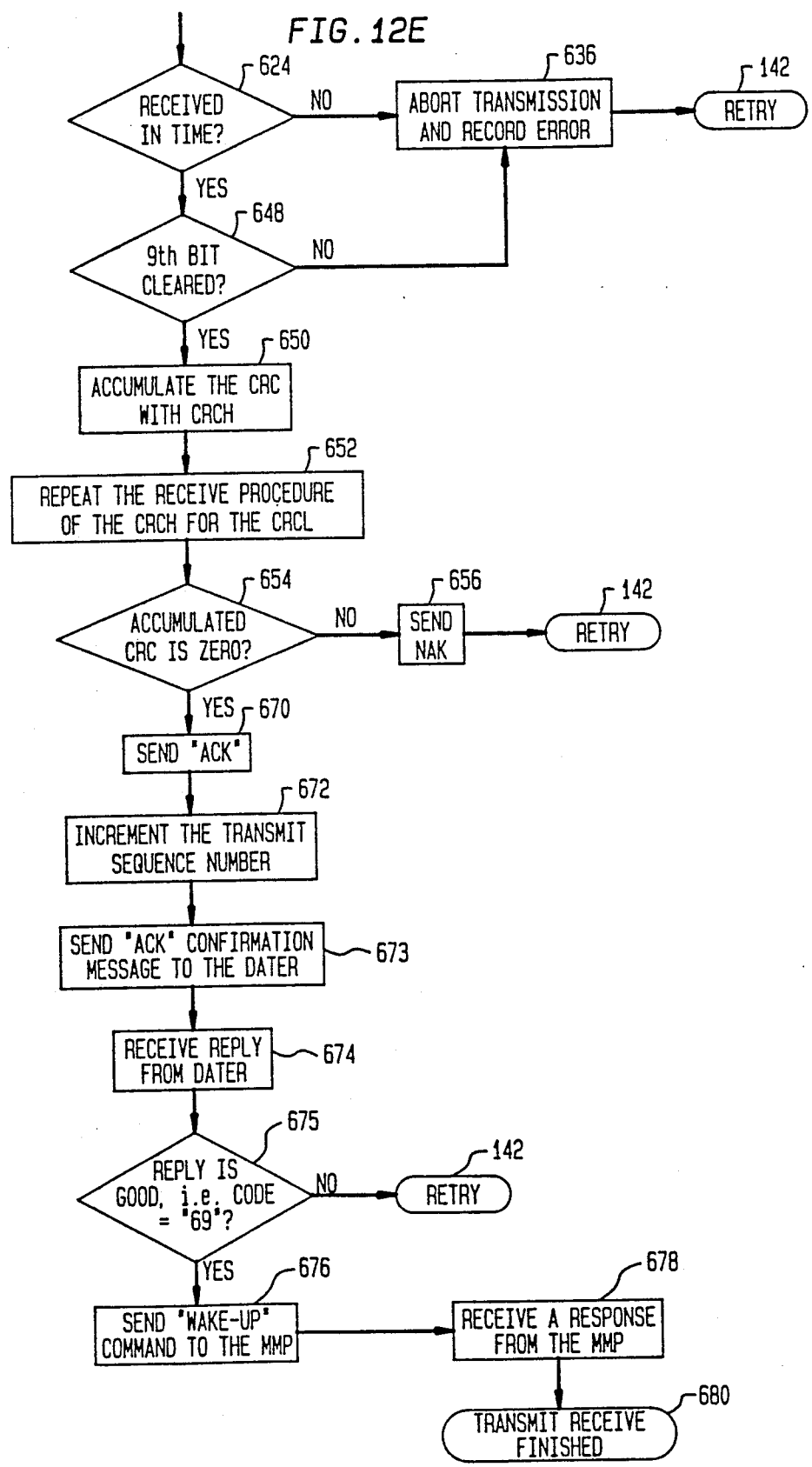

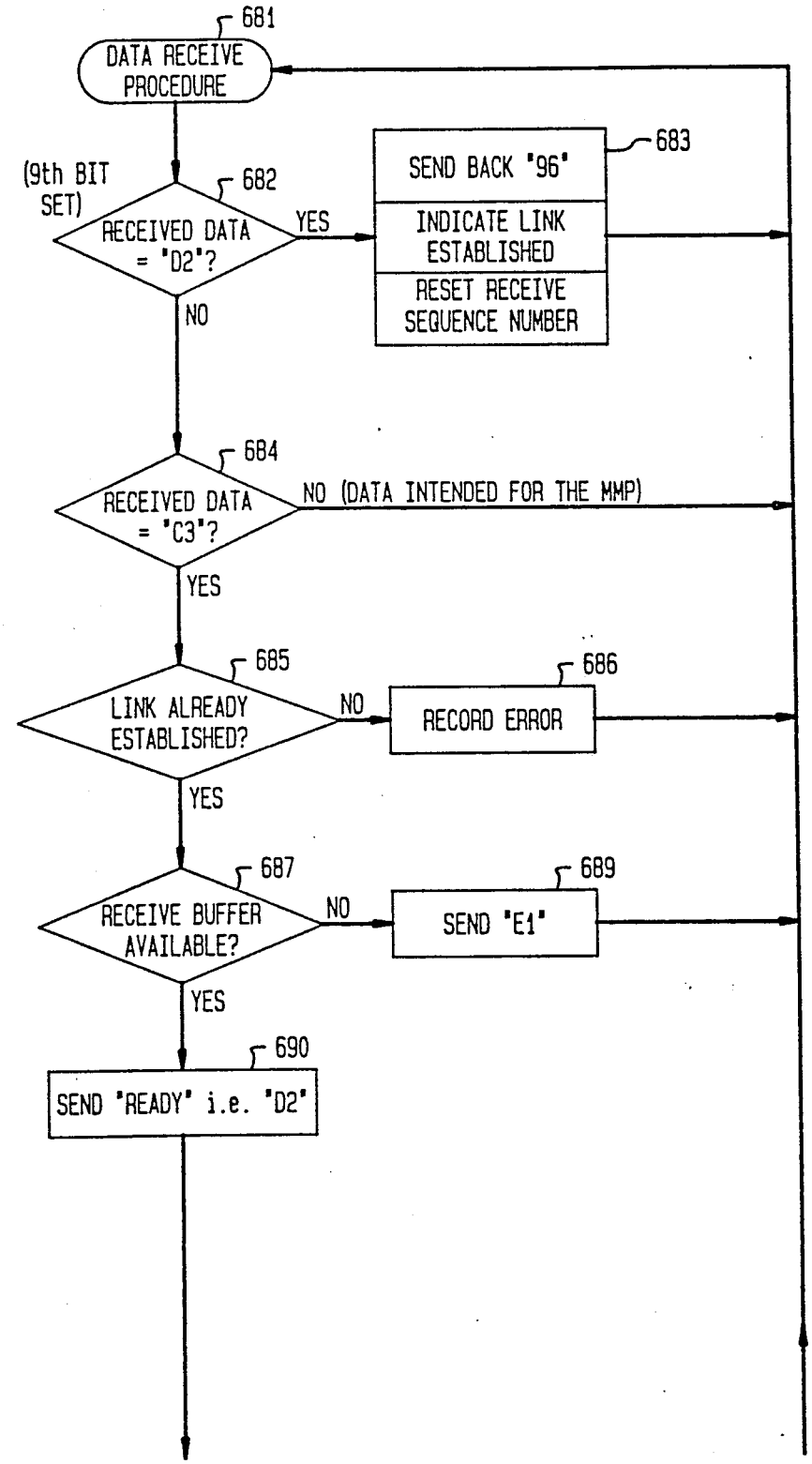

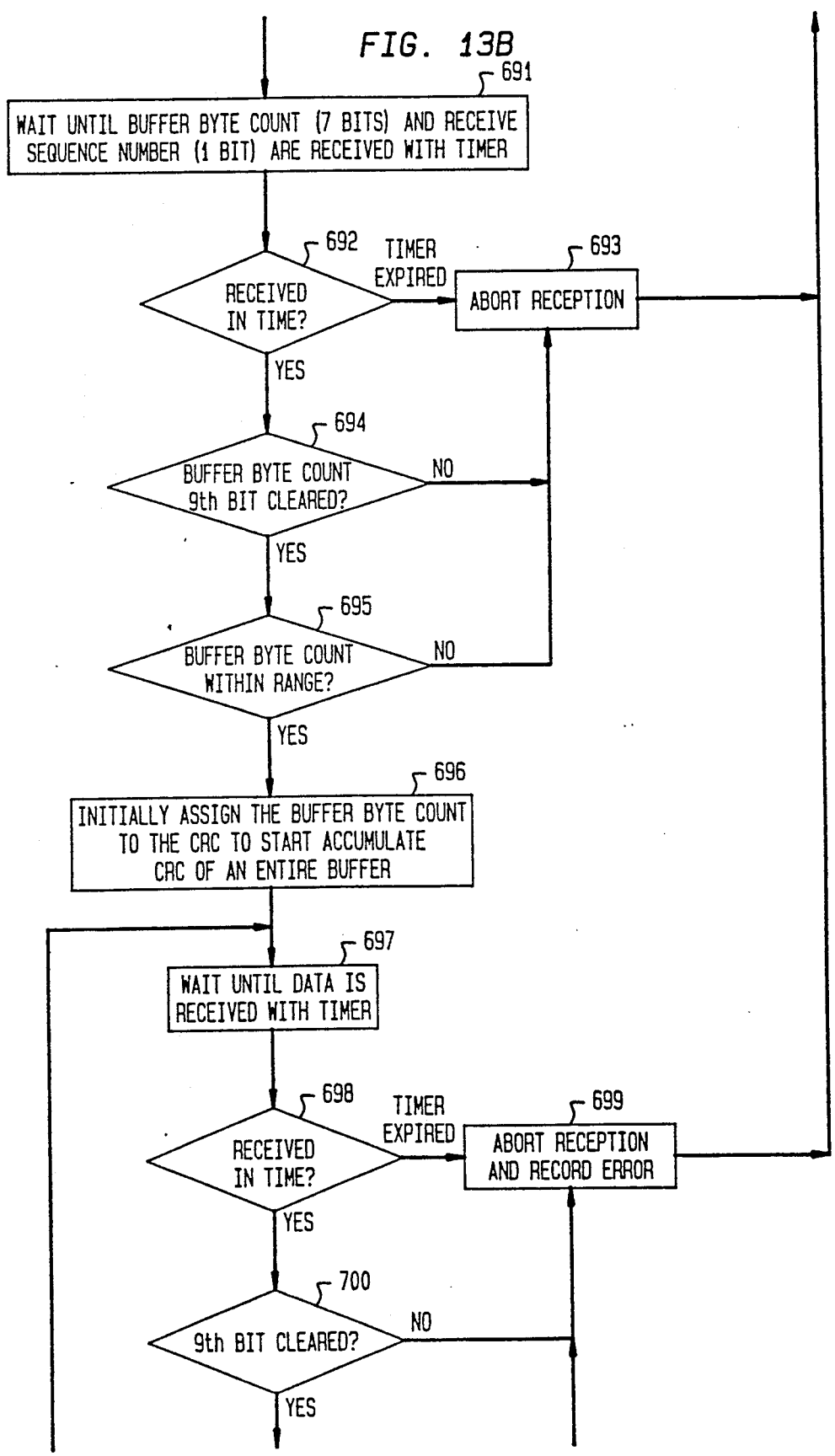

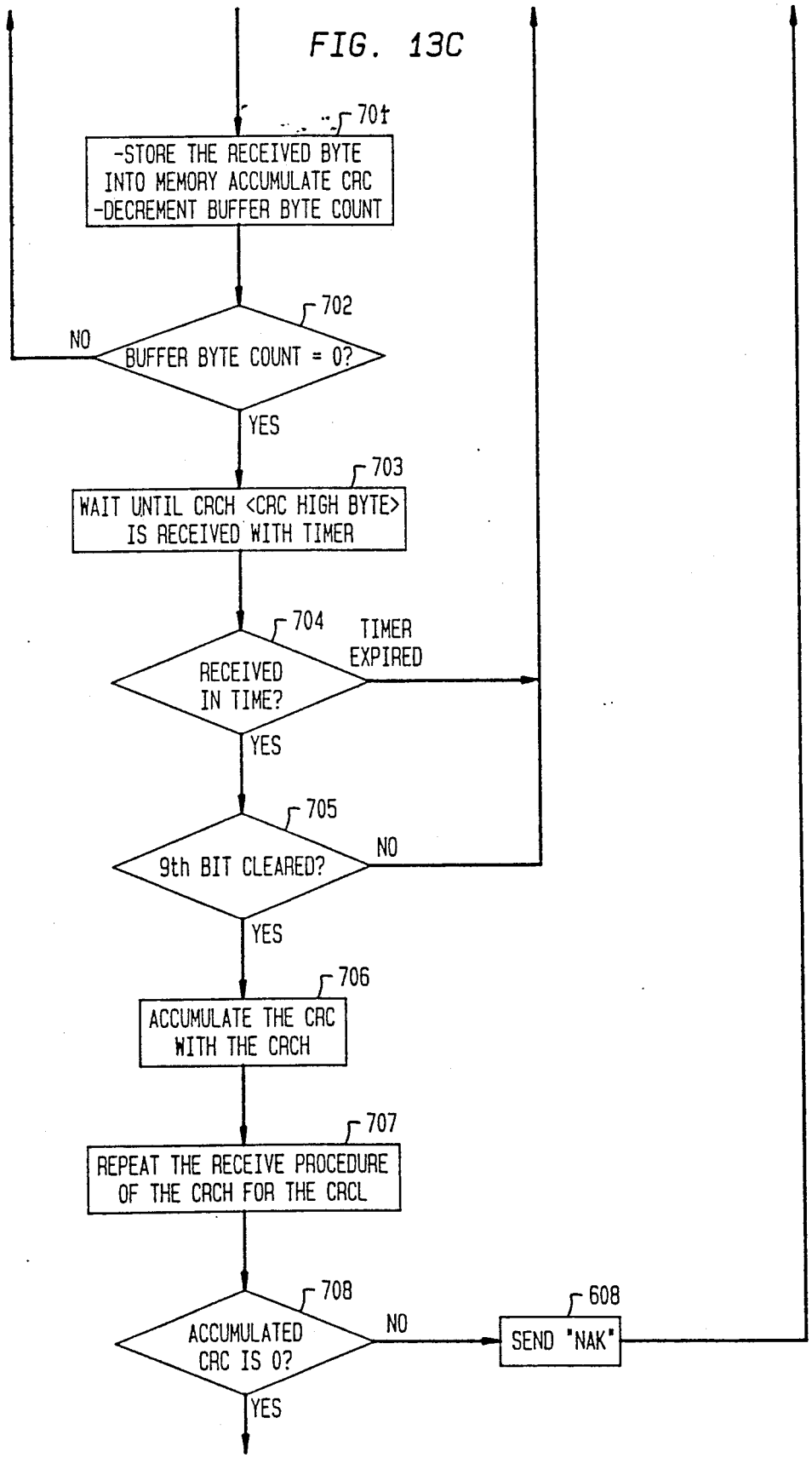

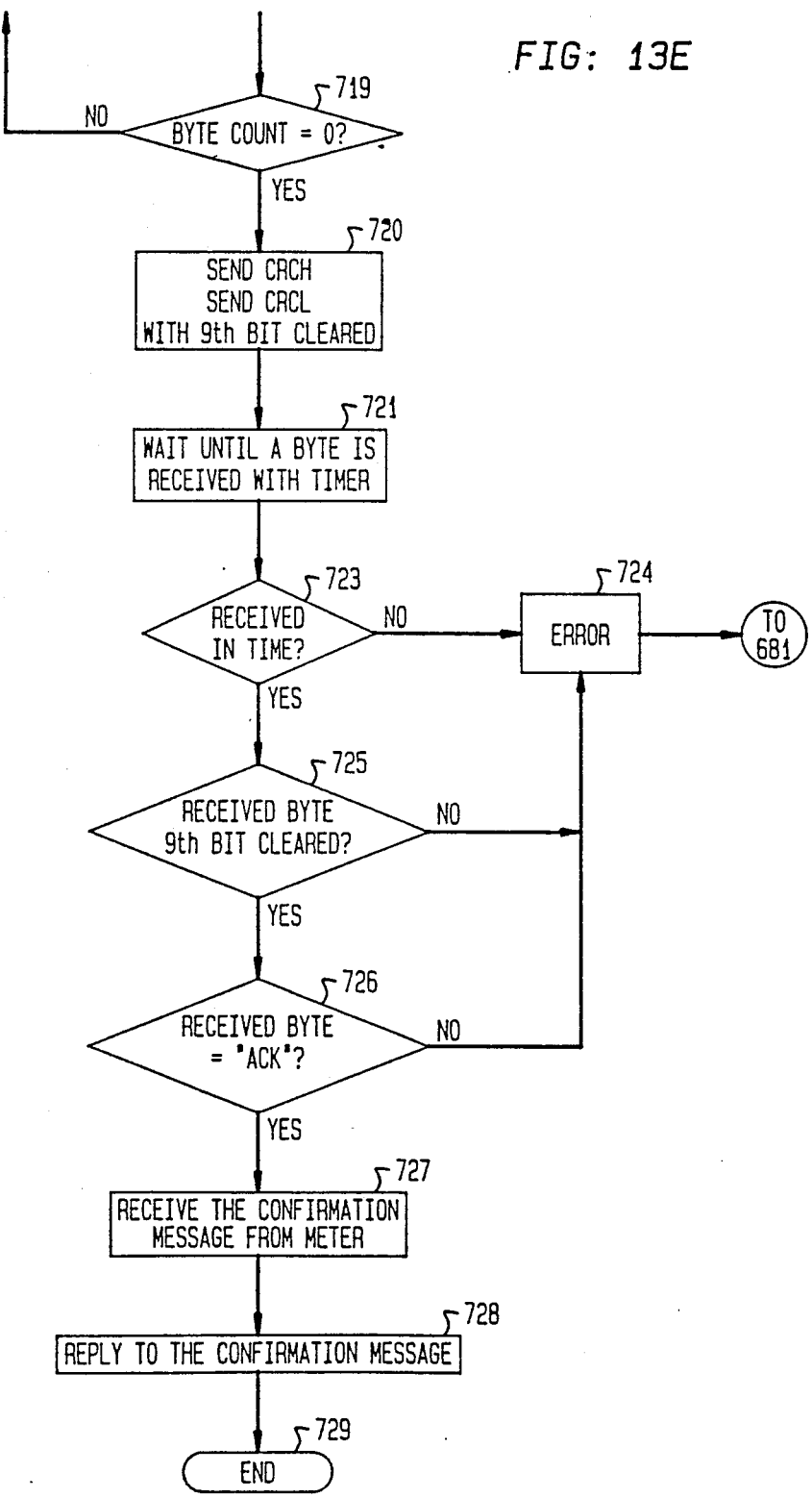
FIG: 13E

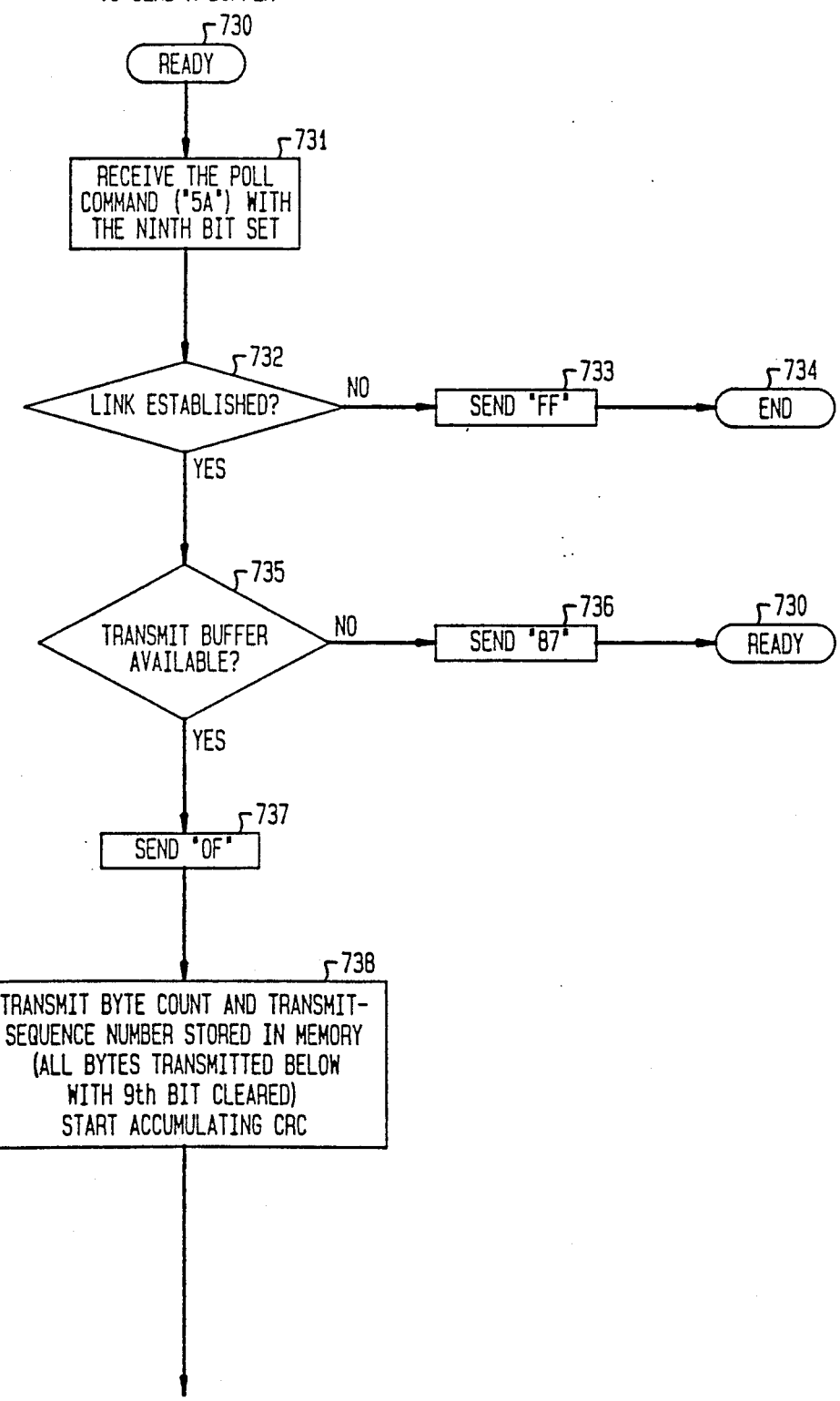

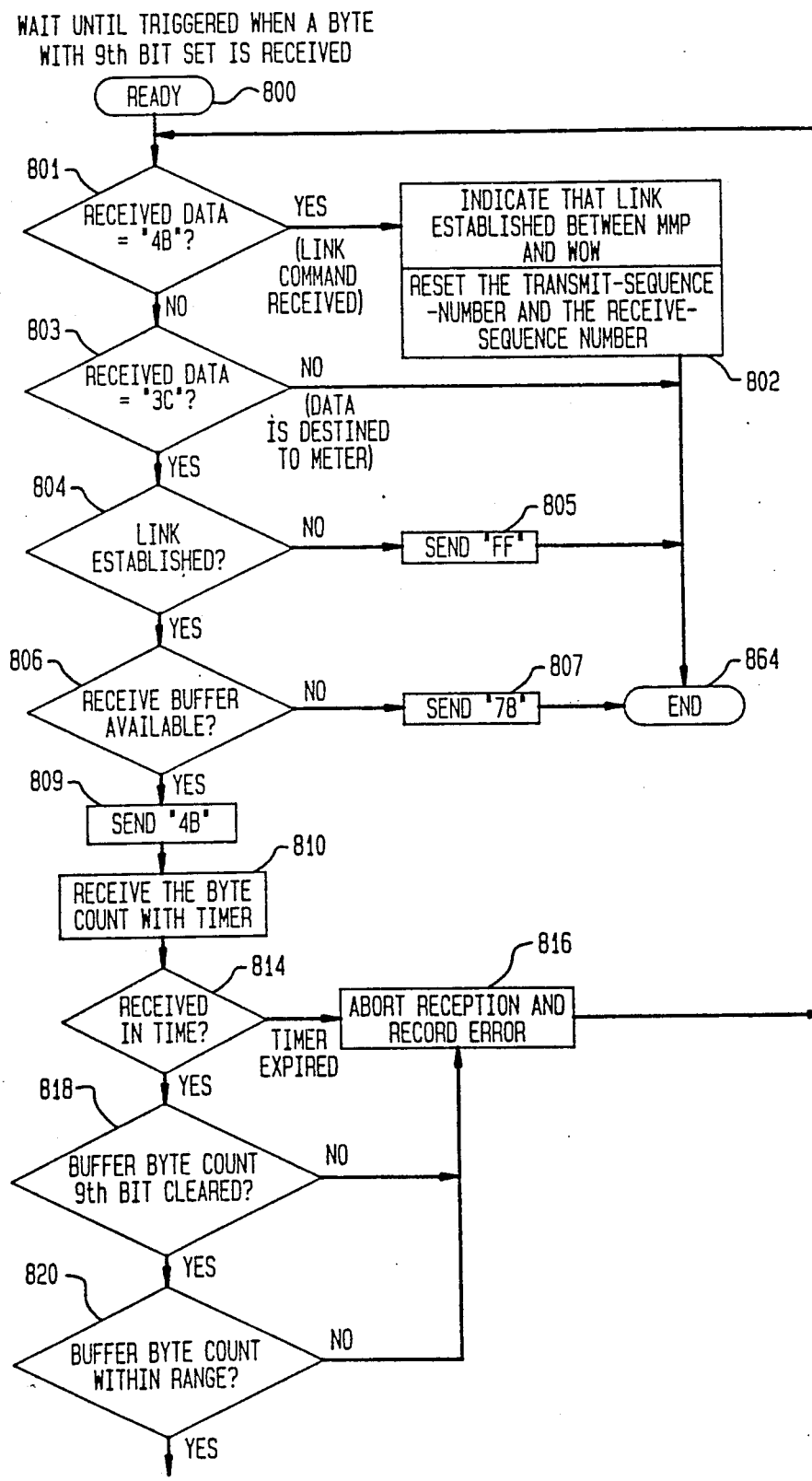

NETWORK AND PROTOCOL FOR REAL-TIME CONTROL OF MACHINE OPERATIONS

BACKGROUND OF THE INVENTION

This invention relates to the field of machine process control systems, and, more particularly, to process controllers networking in a manner most suitable for real-time operations control of mailing machine process systems.

Conventionally, high speed mail processing systems have included an envelope singulating and feed mechanism, a scale or other means of determining mailpiece weight, a transport mechanism and a postage indicia printing mechanism, such as a postage meter. Such processing systems have as their objective, the processing of mailpieces in a seriatim manner at the fastest possible rate, through-put rate.

Conventionally, such mail processing systems are configured by establishing individual processing stations and providing synchronized transports for transporting the mailpieces between stations. For example, in one such system a feeder station singulates mailpieces from a mailpiece stack. The respective mailpieces are transported to a scale for weighing. The weight is electronically communicated to a postage meter for setting to the postage print mechanism and the accounting of the corresponding postage. Subsequent to weighing the mailpiece, the mailpiece is transported to a mailing machine print station for indicia printing by the postage meter which is conventionally mounted to the mailing machine.

Processing of a mail stream in the described fashion requires a high degree of coordination between the individual mechanism. Each mechanism is customarily under the controlling influence of its own microprocessor controller. System coordination between the individual system mechanism is accomplished by simple "STOP-GO" signals between the individual mechanism. The "STOP" signal, in most cases, being triggered by a simple electro-mechanical switch and the "GO" signal being electrically triggered by the processing mechanism upon completion of its functional task. For example, upon singulation of a mailpiece from the mailpiece stack, the feeder triggers the transport, either through a mechanical switch or simple "GO" signal from the feeder's microprocessor, to take control over the positioned mailpiece. The transport, responding to the 'GO" signal assumes control over the mailpiece for delivery to the scale, placing the feeder in a "STOP" or standby mode. Upon arrival of the mailpiece at the scale, the transport releases control over the mailpiece and triggers a "GO" signal to the scale, thereby placing the transport in a "STOP" of standby mode. The described "STOP-GO" procedure is repeated between the scale, mailing machine transport and postage meter. Variation on this type of system coordination theme are known in efforts to increase the mail process through-put.

In order to improve the through-put of such mailing system, it is known to make the system time dependent. That is, each mechanism is given a discreet time interval to perform its given function before the next mechanism is activated. Time dependent mail processing systems are often provided with "serving-up" ability, i.e., a mailpiece is presented to the next process station just prior to processing completion of the preceding mailpiece.

It has been found that the described system coordination schemes are ill-suited for greater high-speed mail processing systems where such systems are expected to process mixed mailpieces, i.e., a mailpiece stack having substantial variation in envelope dimensions and weights. As applied to such higher speed mail processing systems, it has been found that increases in processing system through-put is adversely effected by an increased presence of process system jamming. Also, in order to accommodate mixed mailpieces, the station process time must be increased.

SUMMARY OF THE INVENTION

It is an object of the present invention to present a communication network with a particularly suitable protocol therefor for connecting microprocessor controllers of a mail processing system for providing real-time data communication between the controllers. Pursuant to that objective, the presented communication network and protocol facilitate real-time control of mail process system functions in a highly synchronized fashion. The communication configuration is architected to permit liberal communication between the nodes in a manner synergetic to machine operation. The protocol is configured to exploit the communication configuration and to minimize actual communication time and processor overhead associated with the communication function.

It is a further objective of the present invention to present a communication configuration and protocol well suited for control in real-time of much higher speed mailing machine operation, particularly, where such operations must be controlled synchronously. Synchronous controlled operation requires frequent internodal communication of data transmissions. A complimenting objective of the present invention is to provide a protocol having means for message error recognition and, should a message error occur, to provide message retransmission providing for high message reliability. A still further objective of the present invention is to present within the communication configuration, a contention scheme which consumes minimum processor overhead nor requires additional hardware.

A mail processing system performs many functions on a mailpiece under the guidance and control of a single system controller (second node). The processing system will include a postage meter which, for funds security reason, is under the control of a separate controller. A postage meter most suited for the present invention is comprised of two (2) sections, a secured meter section and an unsecured Parcel Identification Number and Dater (PIN-Dater) section. The meter section is under the control of a microprocessor based controller (first node) which controls several meter systems, e.g., the print wheel setting mechanism, funds accounting system, etc. The PIN-Dater (collectively "Dater") section is under the control of a unsecured microprocessor controller subject to exclusive communication with the first master node.

The mail process system may further include a scale, preferably a resonance scale of the type that relates a mailpiece weight to changes in the resonant frequency of the scale when excited. The scale functions are under the control of a microprocessor controller (fourth node). The first node, (postage meter controller), and second node, (mailing machine controller) can each be master controllers relative to their respective real-time controlled functions which for the purpose of functional synchronization must communicate with each other. The third node can only communicate directly with the first node and the fourth node can only communicate directly with the second node.

Each controller in the preferred embodiment includes an onboard programmable microprocessor having a resident UART (Universal Asynchronized Receive-Transmit). Each microprocessor controller includes a transmit and a receive communication pin. The transmit pin of the first node (postage meter) is in line communication with the receive pin of the second node (mailing machine) and third node (Dater) and the transmit pin of the fourth node (scale). The receive pin of the first node is in line communication with the transmit pin of the second and the third nodes and the receive pin of the fourth node. The line connection between the nodes does not permit direct communication between the second and third nodes, first and fourth nodes, and third and fourth node.

The protocol is tuned to minimize processor communication overhead and response time, in that, (a) communication control data is protected by redundant bytes which promotes accurate messaging.

(b) the text portion of a message is transparent to the eight-byte microsystem, i.e., 8-bit character instead of ASCII code;

(c) transmission errors are detected by redundant bytes, e.g., cyclic redundant check, error recovery being achieved by time-out and retransmission;

(d) a protocol related message is always acknowledged;

(e) the protocol is to be able to recover communication with the data if a message exchange is not received, or when the transmission of a series of data is aborted; and (f) message sequencing is introduced to detect the duplication: for this purpose, "send" and "receive" sequence numbers are independently maintained at each communication node.

When the Dater transmits, its destination is always the meter and when the scale transmits, its destination is always the mailing machine. Each node includes a receiving and transmit buffer. There are no electrical circuits between the transmit/receive pins of the controllers. The availability of the receiving buffer is checked by the sending node prior to transmitting a message. The maximum number of data bytes which can be transmitted at one time is 32 bytes between the MMP and the meter, and 8 bytes between the meter and the PIN, excluding the byte count.

BRIEF DESCRIPTION OF THE DRAWINGS

FIGS. 2A, 2B, 2C, and 2D is a schematic of protocol message formats in accordance with the present invention.

FIGS. 4A and 4B is a logic chart of MMP commands to link Meter.

FIGS. 5A, 5B, and 5C is a logic chart of MMP transmit procedure from MMP to Meter.

FIGS. 6A, 6B, 6C, and 6D is a logic chart of MMP receive from Meter.

FIGS. 7A, 7B, and 7C is a logic chart of MMP transmit procedure for MMP to WOW.

FIGS. 8A, 8B, 8C and 8D is a logic chart of MMP receive polling procedure from WOW.

FIGS. 10A, 10B, and 10C is a logic chart Meter transmit procedure to MMP.

FIGS. 11A, 11B, 11C, and 11D is a logic chart of Meter receive procedure from MMP.

FIGS. 12A, 12B, 12C, 12D and 12E is a logic chart of Meter transmit/receive to/from Dater.

FIGS. 13A, 13B, 13C, 13D, and 13E is a logic chart of Dater receive/transmit from/to Meter.

FIGS. 14A and 14B is a logic chart of WOW transmit procedure when polled from MMP.

FIGS. 15A, 15B, and 15C is a logic chart of WOW receive procedure from MMP.

DETAILED DESCRIPTION OF THE PREFERRED EMBODIMENT

Figure 1:
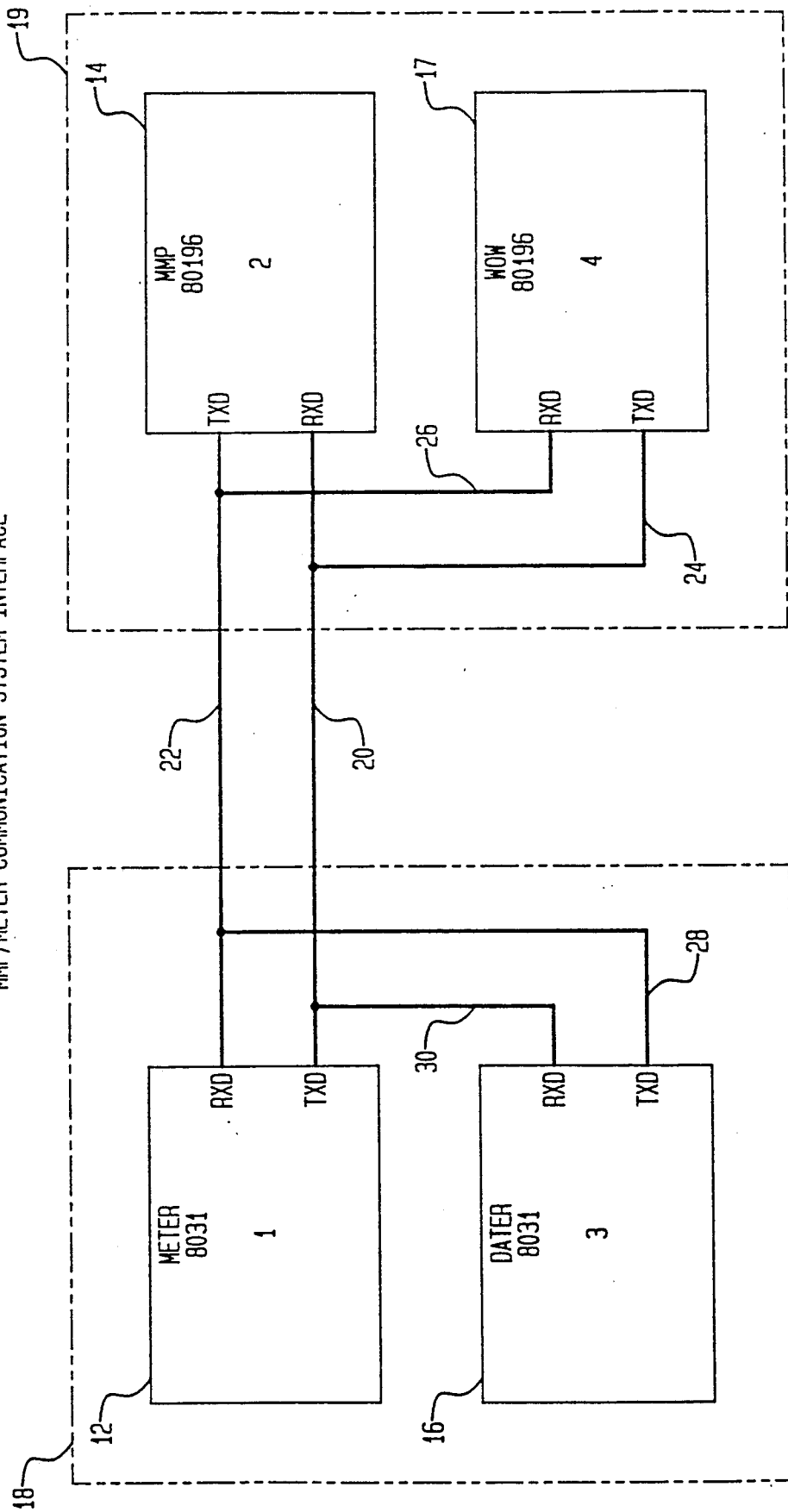
FIG. 1 is a nodal network configuration in accordance with the present invention.

Referring to FIG. 1, a mail processing system, generally indicated as 10, having a four (4) nodal communication architecture, nodes 12, 14, 16 and 17. Node 14 is representative of a mailing machine controller 2, also referred as MMP, which controls a number of machine operations. A scale, also referred to as WOW, having a controller 4 is represented by node 17. Node 12 represents the meter controller 1 which controls a plurality of subsystems such as postage print wheel setting mechanism and funds accounting system. The meter mechanism is constructed in a secure mechanism to prevent tampering with the funds accounting system. The postage meter 18 includes a Dater controller 3 which is generally mounted in a unsecured manner. The communication configuration and protocol hereafter described allows the segregation of systems not requiring high security, such as, the Dater, from the secure system of the postage meter, e.g., the postage print wheel setting mechanism and the funds accounting system. The ability to dichotomize the postage meter function facilitates dedicating system controllers which result in decreased response times and promotes increased overall system efficiency. Also, onsite servicing of the unsecured system is facilitated.

The postage meter 18 includes meter section 12, hereafter also referred to as Node 1, and PIN-Dater section 16, hereafter also referred to as Node 3. The mailing machine 19, includes a system controller, hereafter also referred to as Node 2 which is in communication with postage meter 18, through lines 20 and 22 and a scale controller, hereafter referred to as Node 4. Each node, 1, 2, 3 and 4, includes either an Intel 8031 or 80196 UART microprocessor based controller which microprocessor contains onboard hardware functions to implement the communication protocol hereafter described. Refer to Intel Corporation, Santa Clara, Calif., Publication No. ISBN 1-55512-072-5 entitled, "EMBEDDED CONTROLLER HANDBOOK", Vol. 1, 1988.

The Intel microprocessor UART provides a transmit (TXD) pin and a receive (RXD) pin. The nodal configuration institutes a multi-drop full duplexing communication scheme. The node 1 transmit TXD pin is connected to the node 2 received RXD pin through lines 20 and 22, respectively. The transmit TXD pin of node 4 is in line 24 communication with line 20 and the receive RXD pin of node 4 is in line 26 communication with line 22. The transmit TXD pin of node 3 is in line 28 communication with line 22 and the receive RXD pin of node 3 is in line 30 communication with line 20. The configuration does not allow direct communication between the nodes 2 and 3, or 1 and 4. Each transmit TXD and receive RXD pin of the respective nodes 1, 2, 3 and 4 has associated therewith a respective buffer.

When node 1 transmits, both node 2 and 3 receive the signal with only the intended receiver responding to the addressed signal in a manner hereafter described. When node 2 transmits, both nodes 1 and 4 receive the signal with only the intended receiver responding to the address signal. It is possible for both nodes 2 and 3 to simultaneously transmit to the node 1 and nodes 1 and 4 to simultaneously transmit to node 2. Nodes 1 and 2 are free to transmit at any time. Contention is resolved by utilizing the full duplex circuit between them and by giving a high priority to node 2. Node 2 holds the bus for Node 4, preventing transmission from the node 1. In like manner, node 1 holds the bus for node 3.

Referring to FIGS. 1, 2 and 3, the Intel 8031 Model 2 microprocessor UART contains hardware functions to implement the hereafter described protocol. The 8031 UART operates at 375K bytes per second (bps) at 12 megahertz crystal clock frequency. A one byte transmission consists of 11 bits: 1 start bit and 8 data bits, one programmable bit, and 1 stop bit. The programmable byte is to be used to signal the start of a message frame. At receiving, if the programmable bit is not set, the UART can enter a "sleep" mode requiring no CPU overhead due to communication. One byte transmission (8 bit data plus 3 bit overhead) takes 29.2 microseconds at 375 Kbps, that is, 29.2 $\mu$sec. is available after loading the UART transmission register. This period is utilized to implement a software based message level communication protocol. Within the preferred nodal environment, propagation delay and turnaround delay (switching from transmission to receive, vice-versa) are negligible within the definition of the protocol.

Four full duplex circuits exists: MMP-Meter, MMP-WOW, Meter-Dater and Dater-WOW. For a full duplex circuit, two nodes can transmit data at the same time. The protocol uses this feature to resolve a contention between the MMP and the Meter. The MMP or the Meter can initiate a transmission at will. The WOW and the Dater modules are strictly slave nodes to the MMP and the Meter, respectively. The WOW module only responds when it is polled by the MMP. The Dater only responds to the meter when it receives data from the Meter.

When the MMP transmits, it puts a node address at the beginning of a message exchange to designate a receiving node, i.e., either the Meter or the WOW. An addressed receiving node replies with its address, identifying itself. After this hand-shaking, meaningful data is exchanged. If a message is addressed to the Meter, the WOW ignores all data and waits for the start of a new message exchange. If a message is addressed to the WOW, the Meter will go to a "sleep" mode, during which period the Meter is not allowed to transmit. The MMP sends a "wake-up" message to the Meter after it finishes with the WOW.

When the Meter transmits to the MMP, it puts the MMP node address at the beginning of a message exchange. The Meter then waits for a reply. The MMP replies with its address, identifying itself. After this hand-shaking, meaningful data is exchanged. However, during the waiting period, the Meter may receive a start of a new message exchange from the MMP, which indicates contention. If this happens, the Meter aborts the transmission and switches to receiving (if addressed to the Meter) or to a "sleep" mode (if addressed to the WOW), thus resolving contention. Data destined to the MMP is ignored by the Dater. The Meter will wake up either upon receiving an explicit "wake-up" command or upon an ordinary message from the MMP.

In order for the Meter to transmit a message to the Dater, it first sends a "MMP sleep" command to the MMP. This message is contention based as described in the above paragraph. Then, the Meter communicates to the Dater. The MMP will wake up when one of three things happen: (1) automatically after 1.5 millisecond, (2) upon receiving an explicit "wake-up" command, or (3) upon receiving a message from the Meter. The MMP should not transmit in the "sleep mode". Message codes are set forth in Table 1 and message exchange summary is set forth in Table 2.

TABLE 1

COMMAND CODE

0FH: the MMP transmits a message to the Meter.
1EH: the MMP transmits to establish a link to the Meter.
2DH: the MMP transmits to the Meter to wake up.
3CH: the MMP transmits a message to the WOW.
4BH: the MMP transmits to establish a link to the WOW.
5AH: the MMP polls the WOW (solicits a message from the WOW).
69H - 87H not used
96H: the Meter intends to transmit a message to the MMP.
A5H: the Meter asks the MMP to sleep.
B4H: the Meter asks the MMP to wake up.
C3H: the Meter transmits a message to the Dater, and the Dater may send a message to the Meter within 200 micro-seconds.
D2H: the Meter transmits to establish a link to the Dater.

REPLY CODE

1EH: the Meter replies to the MMP command <0FH> indicating that it is ready to receive.
2DH: the Meter replies to the MMP command <1EH> indicating that a link is established.
3CH: the Meter replies to the MMP command <3CH> indicating that the Meter is out of sleep mode.
4BH: the WOW replies to the MMP command <3CH> indicating that it is ready to receive.
5AH: the WOW replies to the MMP command <4BH> indicating that a link is established.
0FH: the WOW replies to the MMP command <5AH> indicating that it has a message to transmit.
69H: the Meter replies to the MMP command <0FH> indicating that it is not ready to receive (receive buffer not available).
78H: the WOW replies to the MMP command <3CH> indicating that it is not ready to receive.
87H: the WOW replies to the MMP command <5AH> indicating that it does not a message to transmit.
F0H: the MMP replies to the Meter command <96H> indicating that it is ready to receive.
A5H: the MMP replies to the Meter command <96H> indicating that it is not ready to receive.
B4H: the MMP replies to the Meter command <A5H> indicating that it entered the sleep mode.
C3H: the MMP replies to the Meter command <B4H> indicating that it entered the wake-up mode.
D2H: the Dater replies to the Meter command <C3H> indicating that it is ready to receive.
E1H: the Dater replies to the Meter command <C3H> indicating that is not ready to receive.
96H: the Dater replies to the Meter command <D2H> indicating that a link is established.
FFH: all nodes reply with (FF) when a transmitting node sends a message transfer command before a link is established. Message transfer commands are: <0F>, <3C>, <5A>, <96>, and <C3>.

ACKNOWLEDGEMENT

55H: a positive acknowledgement indicating that a message is received without error.
AAH: a negative acknowledgement indicating that an error(s)

TABLE 1-continued was detected in receiving a message.

TABLE 2
MESSAGE EXCHANGE

| MMP | ←→ | Meter | 9th bit | comments |
|---|---|---|---|---|
| <OFF> | → | | set | handshake |
| | ← | (1E) | cleared | buffer available. |
| data | → | | cleared | byte count, data, CRCs |
| | ← | (55/AA) | cleared | ACK or NAK |
| <OF> | → | | set | handshake |
| | ← | (69) | cleared | buffer not available. |
| <OF> | → | | set | handshake |
| | ← | (FF) | cleared | link error |
| <1E> | → | | set | establish link |
| | ← | (2D) | cleared | handshake |
| <2D> | → | | set | wake-up command |
| | ← | (3C) | cleared | wake-up acknowledge |
| | ← | <96> | set | handshake |
| <F0> | → | | cleared | buffer available |
| | ← | (data) | cleared | byte count, data, CRCs |
| (55/AA) | → | | cleared | ACK or NAK |
| | ← | <96> | set | handshake |
| <A5> | → | | cleared | buffer not available |
| | ← | <96> | set | handshake |
| <FF> | → | | cleared | link error |
| | ← | <A5> | set | ask MMP to sleep |
| <B4> | → | | cleared | acknowledge from MMP |
| | ← | <B4> | set | ask MMP to wake up |
| <C3> | → | | cleared | acknowledge from MMP |
| MMP | ← | WOW | 9th bit | comments |
| <3C> | → | | set | handshake |
| | ← | (4B) | cleared | buffer available |
| data | → | | cleared | byte count, data, CRCs |
| | ← | (55/AA) | cleared | ACK or NAK |
| <3C> | → | | set | handshake |
| | ← | (78) | cleared | buffer not available |
| <3C> | → | | set | handshake |
| | ← | (FF) | cleared | link error |
| <4B> | → | | set | establish link |
| | ← | (5A) | cleared | handshake |
| <5A> | → | | set | polling the WOW |
| | ← | (0F) | cleared | WOW has a message to transmit |
| data | → | | cleared | byte count, data, CRCs |
| | ← | (55/AA) | cleared | ACK or NAK |
| <5A> | → | | set | polling the WOW |
| | ← | (87) | cleared | WOW no message to transmit |
| <5A> | → | | set | handshake |
| | ← | (FF) | cleared | link error |
| Meter | ←→ | Dater | 9th bit | comments |
| <C3> | → | | set | handshake |
| | ← | (D2) | cleared | buffer available |
| data | → | | cleared | byte count, data, CRCs |
| | ← | (AA) | cleared | NAK |
| <C3> | → | | set | handshake |
| | ← | (D2) | cleared | buffer available |
| data | → | | cleared | byte count, data, CRCs |
| | ← | (55) | cleared | ACK |
| | ← | data | cleared | byte count, data, CRCs |
| <55/AA> | → | | cleared | ACK/NAK |
| <C3> | → | | set | handshake |
| | ← | (E1) | cleared | buffer not available |
| <C3> | → | | set | handshake |
| | ← | (FF) | cleared | link error |
| <D2> | → | | set | establish link |
| | ← | (96) | cleared | handshake |
| <E1> | → | | set | confirming <ACK> |
| | ← | (FF) | cleared | link error |
| <E1> | → | | set | confirming <ACK> |
| | ← | (69) | cleared | <ACK> received |

The 9th bit of the 8031 type UART is set to indicate the start of a message exchange. The WOW of the Dater does not transmit data with the 9th bit set. Therefore, the WOW and the Dater should program the UART to generate a communication interrupt on the 9th bit set, so that majority of unwanted data is filtered by hardware.

The protocol ensures that only one node is transmitting at a time except for the period of contention resolving and the availability of a receive buffer is checked by a transmitting node before transmitting a communication buffer.

The maximum number of data bytes, excluding the byte count, which can be transmitted at one time is 33 bytes, except between the Meter and the Dater, which is 8 bytes. An application program should reserve a buffer at least 34 bytes long which include the byte count, for the MMP, the Meter and the WOW. For the Dater, a communication buffer size should be 9 bytes which include the byte count. A byte count of zero is not allowed. The most significant bit (MSB) of the byte count is used for transmitting a sequence number. This MSB is transparent to an application program. The communication driver will mask out the MSB, use it, and pass out the value range 1 to 33, or 1 to 8 to an application program. It takes about 35 μsec to transmit a byte.

Referring more particularly to FIG. 2, all the data defined in the message format will appear on the physical communication line, 20, 22, 24, 26, 28 and 30 as a signal. The general form of message format includes an address-command byte <ADD.CMD> which has a one byte field. The address-command byte is sent from the source node and is followed by a reply (REPLY) from the destination nodes 1, 2 or 3, i.e., handshake. Following the successful handshake, the source node transmits a data byte count <BYTE.C> followed by the data byte file [<data>--<data>] to the destination node. The source node then transmits a two byte cyclic redundancy check, cyclic redundancy check high <CRCH> and cyclic redundancy check low <CRCL>, which covers from and includes the byte count <BYTE.C>. The destination node then transmits a positive/negative acknowledgement for the data integrity after performing a error check. Communication between nodes 2 and 4 occurs upon polling of node 2 by node 4. Node 2 issues a <ADD.CMD> address to node 4 which sends a reply (REPLY) followed by a byte count <BYTE.C>. A non-zero byte count <BYTE.C> will then be followed by a data byte file [<data>--<data>], redundancy check <CRCH> and <CRCL> and a acknowledgement <ACK/NAK>. Error checking for the data message is achieved by comparing the received data with stored and predefined values in a receiving node.

The 9th bit is used to distinguish the address byte <ADD.CMD> from other bytes. All other bytes in the above format are sent with the 9th bit cleared. At a receiving node, software instructions can be set to allow a processor receive-interrupt only when the 9th bit is set. Whenever the 9th bit is set, the receiving sequence is restarted.

If a negative acknowledgement (ACK/NAK) is transmitted by the destination node, the message is retransmitted by the source node. Message sequencing is used to detect a duplicated message, i.e., an identical message is transmitted more than once upon detecting an error condition. When a duplication is detected, the duplicated message is discarded. For example, node 1 transmits a message and node 2 received it correctly, however the acknowledgement <ACK> is not delivered from the node 2 to the node 1. The meter will then retransmit the same message, resulting in a duplicated message at node 2.

In general, a transmission of the sending node sends a sequence number as part of the byte count <BYTE.C> to a receiving node. The receiving node updates the receive sequence number and sends the updated sequence number to the transmitting node as part of the acknowledgement <ACK>, finishing one cycle. At the end of each cycle, the transmit sequence number and the receive sequence number should be the same. The meter maintains one pair of receive-transmit sequence number for the MMP, and another pair for the PIN module. The MMP maintains one pair of receive-transmit sequence number for the meter and another pair for the WOW. The Dater maintains one pair of receive-transmit sequence numbers for the meter and the scale maintains one pair of receive-transmit sequence numbers for the MMP.

All sequence number of a node are initialized at power-up, or when the "linking command" is received. The MMP issues the linking command to the Meter and the WOW. The Meter issues the linking command to the Dater. Just after a link is established by the linking command, the sequence numbers between the two nodes are same.

Only the transmit sequence number appears on the physical communication line. One bit sequence number is assigned to the most significant bit of the <BYTECNT>. Between the MMP and the Meter, and between the MMP and the WOW, there are two pairs of sequence numbers. The Meter will have the transmit sequence number for the Dater, but no receive sequence number for the Dater. Likewise, the Dater will have the receive sequence number, but no transmit sequence number. The reason is that the Dater is not allowed to initiate transmission and that the Meter instructs the Dater retransmission only if a complete message is not received.

Figure 3A:
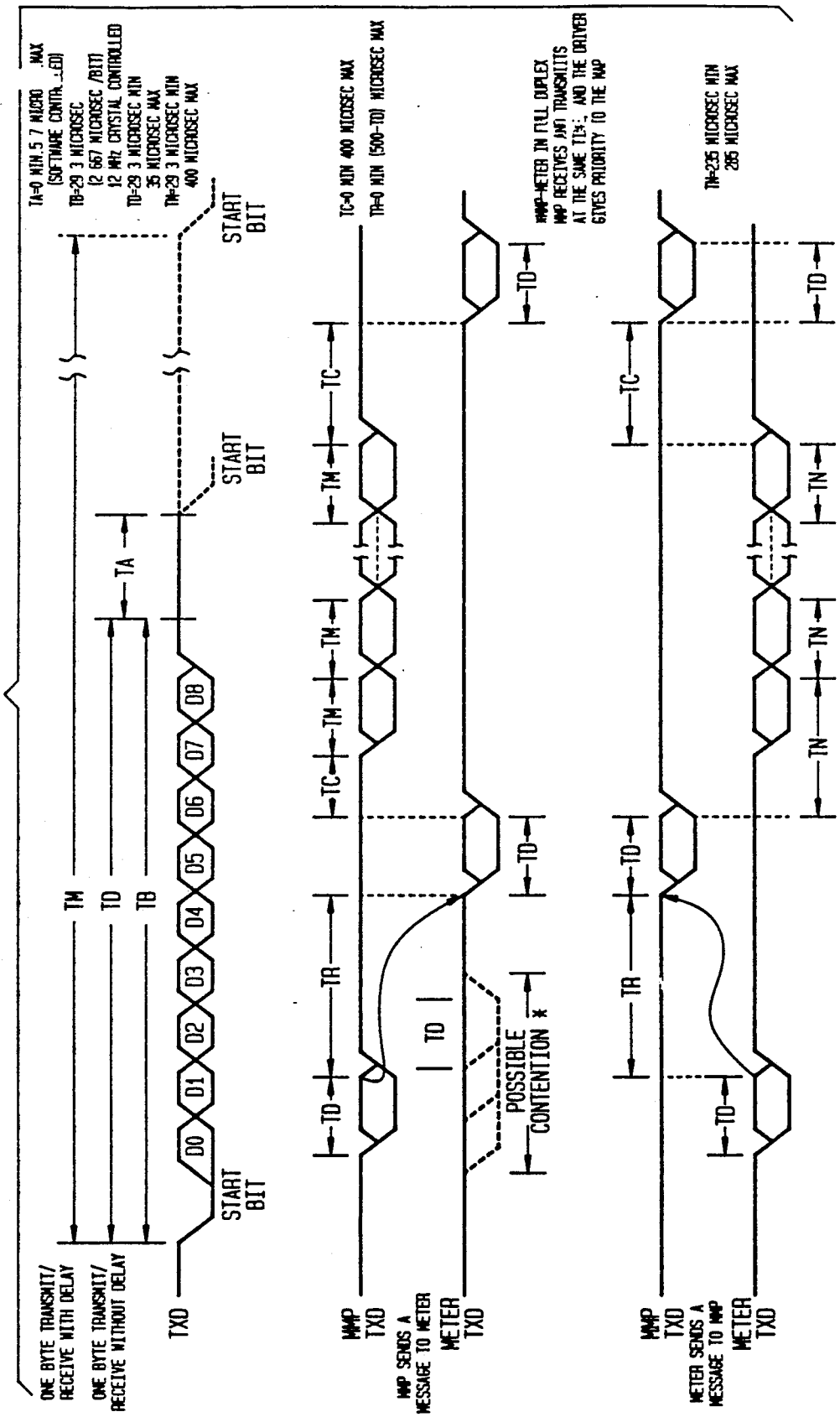
FIGS. 3A and 3B is a messaging timing chart in accordance with the present invention.
Figure 3B:
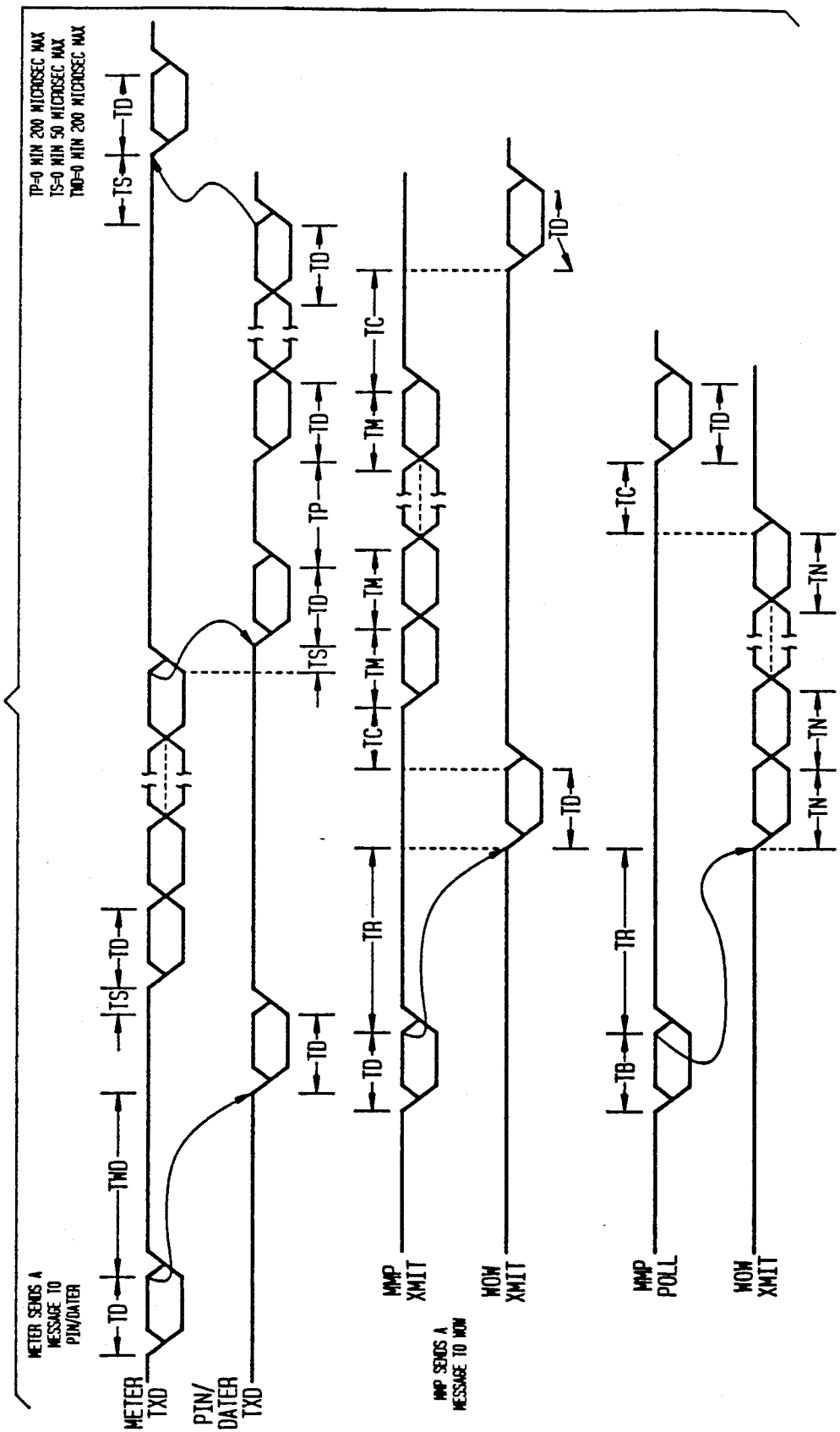

The timing diagram shown in FIGS. 3A and 3B illustrates the timing of the communication between the MMP-Meter, MMP-WOW, Meter-Dater.

The MMP and the meter can initiate transmission in the protocol. This may cause contention when the two nodes try to transmit simultaneously. The contention is resolved by configuring the MMP as a high priority node. The contention approach eliminates the need of polling between the two nodes.

The MMP can always transmit when it pleases, receiving process is not in progress. That is, before transmitting a buffer, it should examine the receive register. If data is already received, then the MMP should serve the receiving process first. However, once the transmitting process is started, the MMP can finish transmission without interrupts. In contrast, the Meter may have to abort a transmitting process to give a priority to the MMP.

Referring to FIGS. 3, when the MMP transmits a <ADD.CMD>, it expects a (REPLY) within minimum 70 microseconds and maximum up to 550 micro-seconds from the Meter or the WOW. The Meter or the WOW receive-interrupt should not be disabled for more than 500 micro-seconds. Preferably, a receive-interrupt should be enabled at all times. After the MMP loads the <ADD.CMD> to the UART transmit register, it may receive a data byte in the UART receive register as fast as in 70 micro-seconds. This corresponds to bit shifting time at 375k bps rate.

After the (REPLY) is received, the MMP waits between minimum 250 μsec. and maximum 400 μsec before transmitting the <BYTECNT>. This process is repeated to send all <data>'s, <CRCH>, and <CRCL>. The MMP will receive the (ACK/NAK) within 250 μsec.

Whenever a message is destined to the WOW, the Meter listens to the command and then puts itself in the "sleep" mode. When the Meter receives an erroneous byte, it simply ignores it. The Meter will wake-up in a manner subsequently described. It is recommended that the MMP send the "wake-up" message if it does not have a message to the Meter immediately so that the Meter can talk to the Dater.

The Meter has a low priority in resolving the contention with the MMP. If the MMP transmits at the same time as the Meter, the Meter will detect the contention and will switch to receiving.

After transmitting the >ADD.CMD> of the MMP, the Meter expects a reply (REPLY) from the MMP within minimum 70 micro-seconds and maximum 550 micro-seconds. During the waiting period, the <ADD.CMD> can be received from the MMP instead of (REPLY). If the (REPLY) is received, the Meter transmits the reset of the message to the MMP. The MMP receive-interrupt should not be disabled for more than 500 micro-seconds. Preferably, the MMP should enable the receive-interrupt all times. On the other hand, if an <ADD.CMD> is received by the Meter, the Meter aborts the transmission and switches to receiving. As described in the message format, the (REPLY) and the <ADD.CMD> are clearly distinguishable. After the Meter receives the (REPLY), the Meter transmission of the rest of the message buffer.

The full-duplex feature of the communication hardware is utilized to resolve the contention. After the contention is resolved, the mode of operation is Two Way Alternate, i.e., the Meter is either in transmit mode or in receive mode.

In order to transmit to the Dater, the Meter first sends the "sleep" command to the MMP. Then it sends <ADD.CMD> to the Dater. The Dater will send the (REPLY) within 200 μsec. The Meter then sends the rest of the data message. If any data is in error, the Dater sends (NAK) and the message exchange is terminated. Otherwise, the Dater sends (ACK) and within 200 micro-seconds, it sends back a message to the Meter. The Dater module never initiates transmission. As soon as the Dater receives a message, it processes the message and starts to transmit a reply message within 200 micro-seconds. After the Meter has completed communication with the Dater, it will send the "wake-up" command to the MMP. Data transmission and receiving between the Meter and the Dater, except the handshaking, occurs within minimum 35 μsec to maximum 50 μsec per byte.

The MMP receives unwanted data when the Meter aborts a transmission. The Meter receives unwanted data which is destined to the WOW. The WOW receives unwanted data from the Meter and the WOW. Whenever a node cannot verify a received code, it simply ignores it. A node also ignores data if it is not addressed to the node.

When the Meter aborts transmission due to contention, the MMP UART hardware receives the <ADD.CMD> byte. This <ADD.CMD> data is cleaned up after the (REPLY) is received, preventing the unwanted receive-interrupt. During the MMP transmission, the receive-interrupt should be disabled.

Whether or not the receiving process is interrupt driven, reception of a byte should be always timed out in accordance with the transmission rate of the Meter or the WOW. If timing is violated, a receiving process should be aborted. Whenever data is received with the 9th bit set, the process should be restarted.

When the Meter sends the "sleep" command, the MMP enters a "sleep" mode, during which period it should not transmit. The MMP should wake up 1.5 milliseconds later automatically, or upon receiving a message or a "wake-up" message, whichever comes first. The MMP should control the UART hardware to receive or not to receive data of which the 9th bit is cleared. In order to support the automatic wake-up after 1.5 milliseconds, the interval between the two successive message transmissions, from the Meter to the Dater shall be greater than 2 milliseconds.

The MMP should abort a receiving process if a next data bit is not received within 400 $\mu$sec. Also, the MMP should not disable the receive-interrupt more than 500 microseconds.

The Meter transmission to the Dater is received by the MMP, and the WOW transmission to the MMP at this time surely garbles data. To prevent this type of contention between the Meter and the WOW, the MMP reserves the meter bus while it communicates with the WOW. During this period, the Meter enters the "sleep" mode.

As soon as the Meter receives the <ADD.CMD> destined to the WOW, it enters a "sleep" mode and during which period the meter only receives. The Meter is programmed so that the receive-interrupt is enabled when a data with the 9th bit set is received. As the MMP finishes communication with the WOW, it sends an explicit "wake-up" command to the Meter. The Meter cannot receive the WOW transmission.

The waiting period to receive one byte after a byte is up to 50 micro-seconds from the Dater, and up to 400 $\mu$sec from the MMP. The Meter aborts reception after the waiting period.

The data with the 9th bit set from the MMP initiates a WOW receiving process. If it is for the Meter, the WOW ignores the data and the subsequent data stream is also ignored because the 9th bit is not set. The data with the 9th bit cleared from the Dater will be transparent to the WOW, because a receive process is not even triggered. The receiving rate is the same as the transmission rate of the MMP.

When the Dater receives an <ADD.CMD> destined to the MMP, it simply reads the data and discards it. The receive-interrupt of the Dater is enabled when data is received with the 9th bit set. The data transmission from the WOW is transparent to the Dater. The receiving rate is same as the transmission rate. A receiving process is aborted if the data arrival exceeds 50 microseconds.

The protocol related control data is: <ADD.CMD>, (REPLY), and <ACK/NAK>. The codes for this data are defined in such a way that 4 bits are redundant. The detection of errors is accomplished by comparing the expected value with the received value when a certain control data is defined within the context of the protocol.

Error detection for meaningful data is based upon the ones complement arithmetic checksum proposed by the John G. Fletcher. Refer to the article "An Arithmetic Checksum For Serial Transmissions", John G. Fletcher, IEEE TRANSACTIONS ON COMMUNICATIONS, VOL. COM-30, NO. 1, JANUARY, 1982.

The selected scheme is designed for software implementation, and the 16 bit ones complement check-sum can be calculated within 15 micro-seconds using the 12 Mhz 8031 instructions. With this speed, it does not hamper the data transfer rate supported by hardware.

The checksum method can detect all one-bit errors and two-bit errors, since the message buffer length is less than 255 bytes. All 16-bit burst errors are detected with 99.999981 percent accuracy. The undetected error percentage is 0.001526% for the CCITT CRC, and 0.001538% for the selected checksum method.

To illustrate, two bytes of checksum, e.g., c0 and c1, are first initialized to zero. The checksum is calculated from the <BYTECNT> and to the last <data>. Whenever an 8 bit data, for example, b, is transmitted, the checksum is calculated using the one's complement arithmetic:

$c0 \leftarrow c0 + b$, the addition is in modulo 256, and if carry, carry is added.

$c1 \leftarrow c1 + c0$, the addition is in modulo 256, and if carry, carry is added.

(example: c0=249, c1-241, b-9, then c0=3, c1-244)

When all data is transmitted, the receiver expects the checksum to be zeros. The two check bytes are calculated by the sender. The first check byte, say f, is calculated as follows:

$f1 \leftarrow c0 + c1$, the addition is in modulo 256, and if carry, carry is added.

$f \leftarrow 256 - f1$, (taking minus sign in modulo 256).

(example: c0=3, c1=244, f1=247, f=9).

After the first check byte is sent out, the receiver still applies the same arithmetic procedure. (example: c0=3, c1=244, f=0, then c0=12, c1=256).

The second check byte is calculated as (s=256=c0) and it is sent to the receiver. (example: c0=12, s=244 c0=256). When all data is accumulated including the checksum, then the check bytes will be 256. The above example is summarized:

|  | data | c0 | c1 |
|---|---|---|---|
| initially | — | 0 | 0 |
| first data | 247 | 247 | 247 |
| second data | 2 | 249 | 241 |
| third data b | 9 | 3 | 244 |
| check byte f | 9 | 12 | 256 |
| check byte s | 244 | 256 | — |

The checksum method is very efficient to implement: using the 12 Mhz 8031 instructions, it takes 6 microseconds to accumulate the c0 and c1, 6 micro-seconds to calculate the first check byte, and 6 microseconds to check the checksum error.

The sender and receiver applies the same algorithm to calculate the checksum.

A transmitting node is always responsible for error recovery. The receiving node never requests a retransmission. When a receiving node detects an undefined code in the <ADD.CMD>, it simply ignores the data. When it receives a message before a link is established, it sends back OFFH, and aborts the receiving process.

When a receiving node detects an CRC error, it sends <NAK>. If any data byte with the 9th bit set is received in the middle of a receive process, then the process is restarted. Aborted transmission, or data reception which is shorter than the one specified in the byte count, or time out, will cause a receive process to be terminated abnormally.

A transmitting node detects an error by timeout for the <ADD.CMD>, or when <NAK> is received. When an error is detected, the node waits for a prescribed time and starts to initiate transmission again.

The status indicating unavailability of a receive buffer at the receiving node is not considered as an error. The MMP, the Meter, the WOW, and the Dater should process receive buffers as soon as possible to prevent grid lock of communication buffers.

The message exchange between the Meter and the Dater needs special error handling because one message is delivered to the Dater and a message is replied by the Dater in one message exchange. Both nodes should confirm a message delivery. When the (ACK) from the Dater or the <ACK> from the Meter is lost, only one side can firm a message delivery. And only the Meter can initiate a message exchange. For these reasons, the Dater communication will utilize a "confirmation command". Using the reply to the confirmation command, the Meter ensures that the Dater indeed received the <ACK> correctly. Using the confirmation command, the Dater knows that the Meter received a message even though the Dater did not receive the <ACK> correctly.

The Meter is required to send the confirmation command after it exchanged messages with the Dater (one byte to the dater and reply byte to the Meter). The Dater is required to start execution of the received message, after it received the confirmation message.

The message exchange with the Dater consists of two messages: a command to the Dater and a response to the Meter. Therefore, the transmit sequence number in the Meter is updated at the end of a successful message exchange. For the Dater, the receive sequence number is updated when a message is received without error. The Meter transmit sequence number for the Dater is updated when <ACK> is transmitted to the Dater. The Dater will not have the transmit sequence number because retry is controlled by the Meter, which means that the Dater does not transmit a duplicated message. For the same reason, the Meter will not have the receive sequence number for the Dater.

Error conditions examples (Dater - Meter)

Case 1: If a command message is not delivered correctly to the Dater, then the Dater does not send back (ACK). A recovery process is initiated by the Meter and a retransmission executed.

Case 2: A command message is delivered correctly to the Dater but the Dater receive buffer is full or the (ACK) is transmitted by the Dater but the Meter could not receive the return (ACK). As far as the Dater is concerned, it clears the receive buffer, calculates the transmit buffer and transmits it. But there will be no <ACK> from the Meter. Thus, the Dater transmit buffer is still full. The Meter will retransmit the same message. For the Dater, the received message is rejected due to the sequence number. Since the Dater transmit buffer is still full, it will be transmitted by the Dater.

Case 3: A command message is delivered to the Dater. (ACK) is delivered to the Meter. If an error is found in the response message from the Dater, error handling is same as in the case 2.

Case 4: A command is delivered to the Dater. A response message is delivered to the Meter. Suppose that the <ACK> from the Meter is not delivered to the Dater. To handle this case, the Meter is required to send the "confirmation" command, i.e., <E1>, to the Dater after it sends <ACK>. For <E1>, the Dater clears the transmit buffer, and reply with (69). If the transmit buffer is empty when the Dater receives the <E1>, the Dater simply replies with the code (69).

Case 5: The situations are same as in the case 4. If further suppose that the (69) is not received by the Meter. For the error recovery, the Meter retransmits the <E1>, instead of retransmitting the buffer all over again. The Meter will not set the Receive buffer full flag, even though it has one, until the Meter receives the (69).

For the <C3> command (buffer transmit command from the Meter), the Dater will respond as follows:
(1) receive buffer full or the processor is busy: reply code=(E1)
(2) receive buffer is empty: (D2)
(3) link error: (FF).

For the <E1> command the Dater will respond as follows:
(1) link error: (FF).
(2) all other cases: (69).

The communication driver of the controller implements the protocol. There shall be a driver for each node, i.e., the MMP, the Meter, the WOW, and the Dater. Each driver consists of receive-interrupt service routine, transmit routine, power-up initialization routine, and in addition, linking routines for the MMP and the Meter. The driver starts a receiving process when triggered by a receive-interrupt. The receive and transmit processes shall return to a calling program or to the interrupted point within finite time. An application process has to call the driver transmit routine to send a message. The initialization routine for a driver should be executed by an application program before using the driver functions, including the interrupt-driven receive function.

SYSTEM OPERATION

Figure 4B:
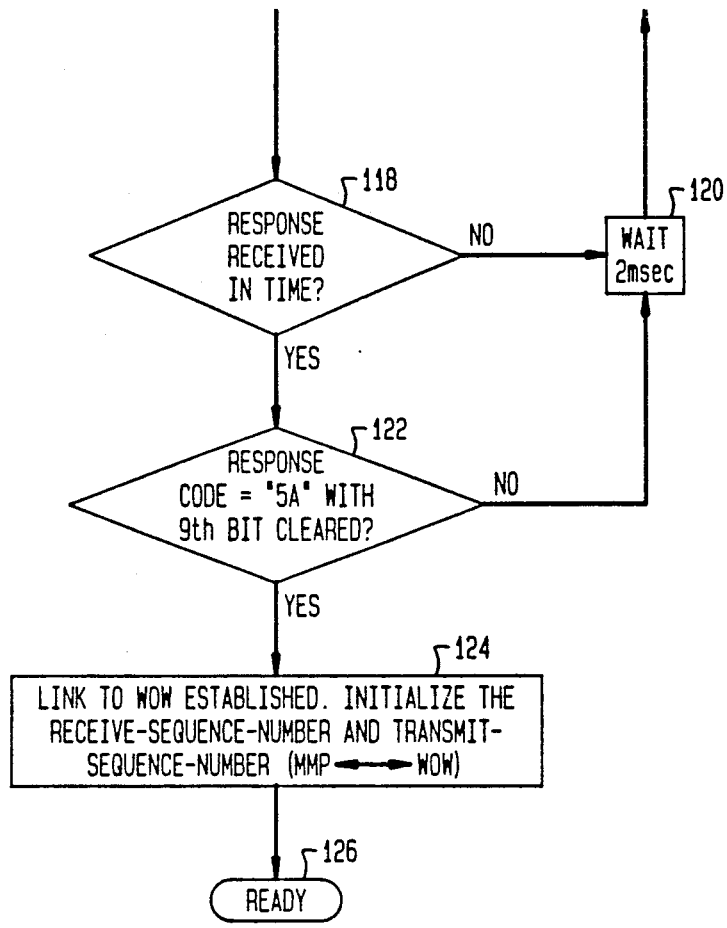

Referring now to FIGS. 4A and 4B, node 2 (MMP) can transmit at well. Upon powering up the system, the software commands initiate a start sequence at logic block 100 to link the MMP to the Meter and Scale. Upon initiation of the start sequence, the MMP under software instruction, transmits a address-command <ADD.CMD> at logic block 100 to which is directed to meter 18. Subsequently thereto, the MMP stands ready at logic block 104 to receive a response from the meter from between 30 to 500 micro-seconds. Subsequently thereto at logic block 106, a check is performed to ascertain whether a response (REPLY) has been received in time. If a response has not been received in time, the meter waits 2 micro-seconds at logic block 108 and then proceeds back to the initial point of the start routine at logic block 102. If the response is received in time, the communication logic then proceeds to logic block 110 to check if a response code "2D" with the 9th bit cleared has been received, i.e., handshake. If an improper code has been received or the 9th bit is not cleared, the communication logic then proceeds to logic block 108 and waits 2 micro-seconds and then again initiates the start sequence at logic block 102.

If the proper response has been received at logic block 110, the communication logic proceeds to logic block 112 whereupon initialization of the receive sequence number and transmit sequence number is performed between the MMP and the Meter. Thereafter, the MMP transmits an address-command <ADD.CMD> code with the 9th bit set is sent to the WOW with the 9th bit set. In similar fashion, the MMP communication logic is instructed to wait for the response from the WOW for a period of approximately 30 to 150 micro-seconds. The response received is checked at logic block 118 to see if it is received in time, if not, the communication logic proceeds to logic block 120 whereupon a 2 micro-second wait is performed and the system is returned to 114 to attempt to establish communication linking again with the WOW in the afore defined sequence. If the response is received in time, the communication logic proceeds to logic block 122 whereupon the response code is checked to see if the proper response code (5A) with the 9th bit cleared has been received, i.e., handshake. If an improper response code has been received or the 9th bit has not been cleared, the communication logic then proceeds again to logic block 120 for a 2 micro-second wait and then initiation of the linking sequence is re-performed at 114. If the proper code has been received and the 9th bit has been cleared, the communication logic of the MMP then proceeds to logic block 124 whereupon the WOW receive sequence number and transmit sequence numbers are initialized. Subsequent thereto, the communication logic proceeds to logic block 126 and stands ready for communication.

Figure 5C:
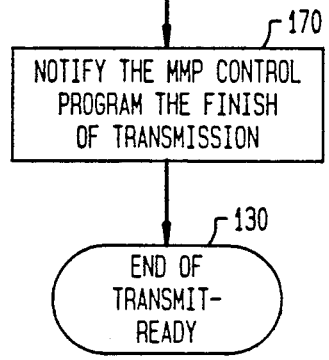

Referring to FIGS. 5A, 5B and 5C, should the MMP control program request to send a buffered message to the Meter. At the ready, illustrated at logic block 130, the meter then transmits a Meter address-command <ADD.CMD> at logic block 134 with the 9th bit set. The communication logic is then instructed to wait for a response within a 30 to 500 micro-seconds time period. The communication logic then proceeds upon receipt of a response to logic block 138 whereupon a check is performed to see if a response was received in time. If a response was not received in time, that is the time expired, the communication logic is directed to abort the transmission and record the error at logic block 140. Thereafter, a retry routine is initiated at logic block 142. If the response has been received in time, the communication logic proceeds to logic block 144 whereupon a check is performed to see if the 9th bit is cleared. Again, if the 9th bit is not cleared, the communication logic is directed again to logic block 140 and therefrom to logic block 142 for a retry. If the 9th bit of the response byte is cleared, then the communication logic proceeds to logic block 146 whereupon a check is performed to see if a valid reply code has been received and if the receiving buffer of Meter is ready to receive information from the meter. If a valid reply code has not been received, again the communication logic is directed to logic block 140 and therefrom to a retry routine ate logic block 142. If a valid code has been received, then the communication logic proceeds to logic block 148 whereupon the byte count and sequence number are transmitted with the 9th bit cleared and the start accumulation for the CRC's performed. The communication logic then proceeds to logic block 150 whereupon data byte with the 9th bit cleared is transmitted, CRC's continue to accumulate using the data byte, and the byte count is decremented. At this point, a loop is set where the send data byte proceeds until that byte count is decremented to zero. Once the byte counts are checked at logic block 152. When the byte count has been decremented to zero, all data has been transmitted, the communication logic proceeds to logic block 154 whereupon then the CRCH and CRCL is sent and the 9th bit is again cleared. Subsequently thereto, at logic block 158, the communication logic waits for an acknowledgement response from the Meter within the 30 to 500 micro-seconds response. The communication logic proceeds to logic block 158 to check to see if the response has been received in time. If the response is not received in time, the communication logic proceeds to logic block 160 where at an abort transmission is performed and the error recorded. The communication logic then proceeds to logic block 142 where the retry routine is initiated.

If a response is received in time, the communication logic proceeds from logic block 158 to logic block 164 where a check is performed to see if the 9th bit is cleared. If the 9th bit is not cleared, the communication routine proceeds to logic block 160 and therefrom to the retry routine logic block 142. If the 9th bit of the response has been cleared, the logic routine proceeds to logic block 166 where a check is performed to see if the receive message contains an acknowledgement message, if not, the logic routine proceeds to logic block 160 and therefrom to logic block 142 for a retry. If an acknowledgement is received, then an update is performed of the transmit sequence number in the memory bit at logic block 168, therefrom the logic routine proceeds to logic block 170 whereupon a notification routine is performed to the MMP control program that the transmission has been finished and logic is returned to the ready 130.

Figure 5D:
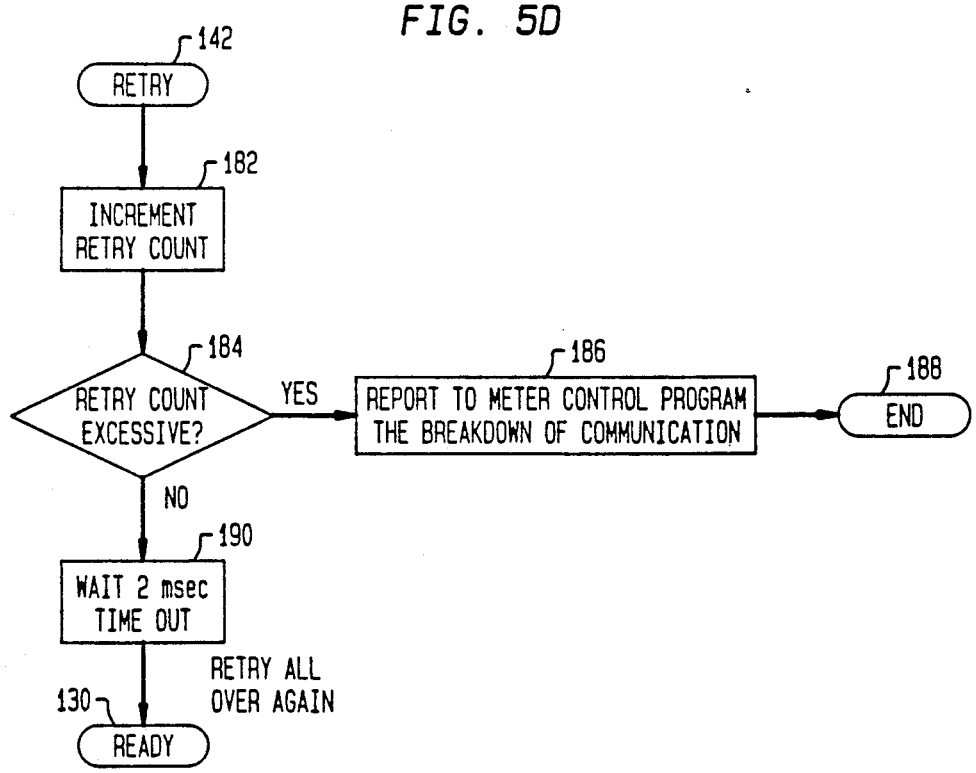
FIG. 5D is a logic chart of retry routine.
Figure 6A:
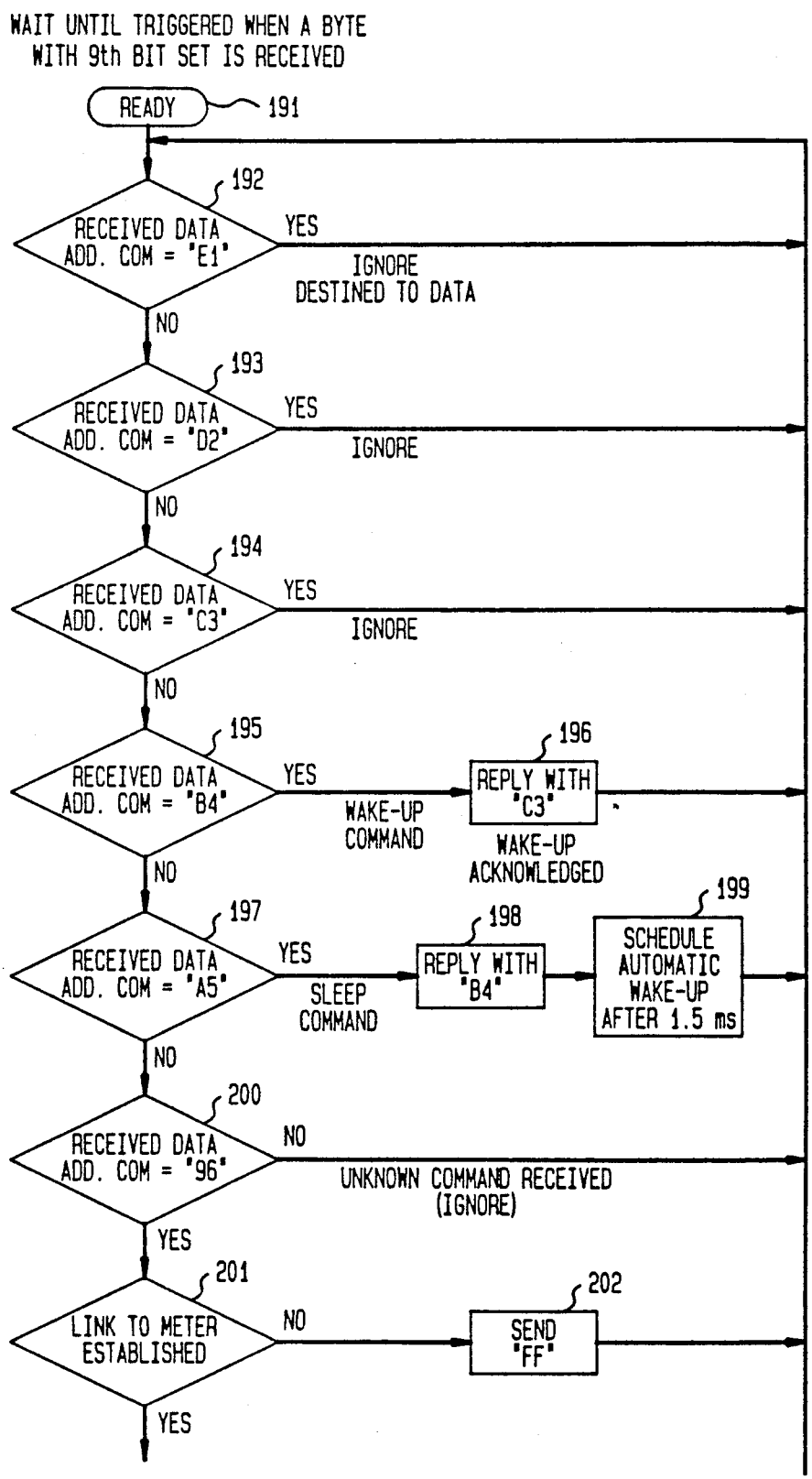
Figure 6B:
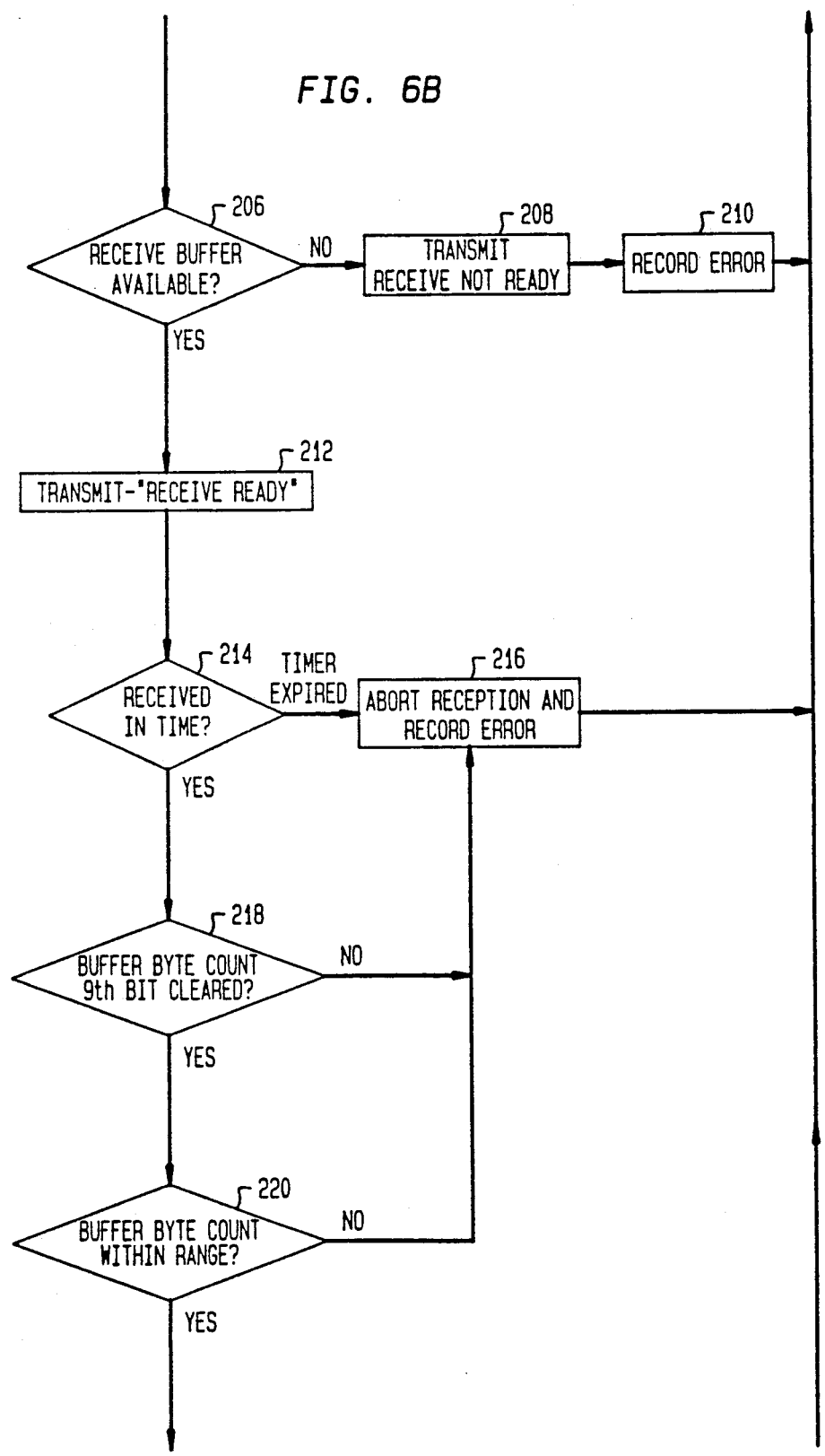
Figure 6D:
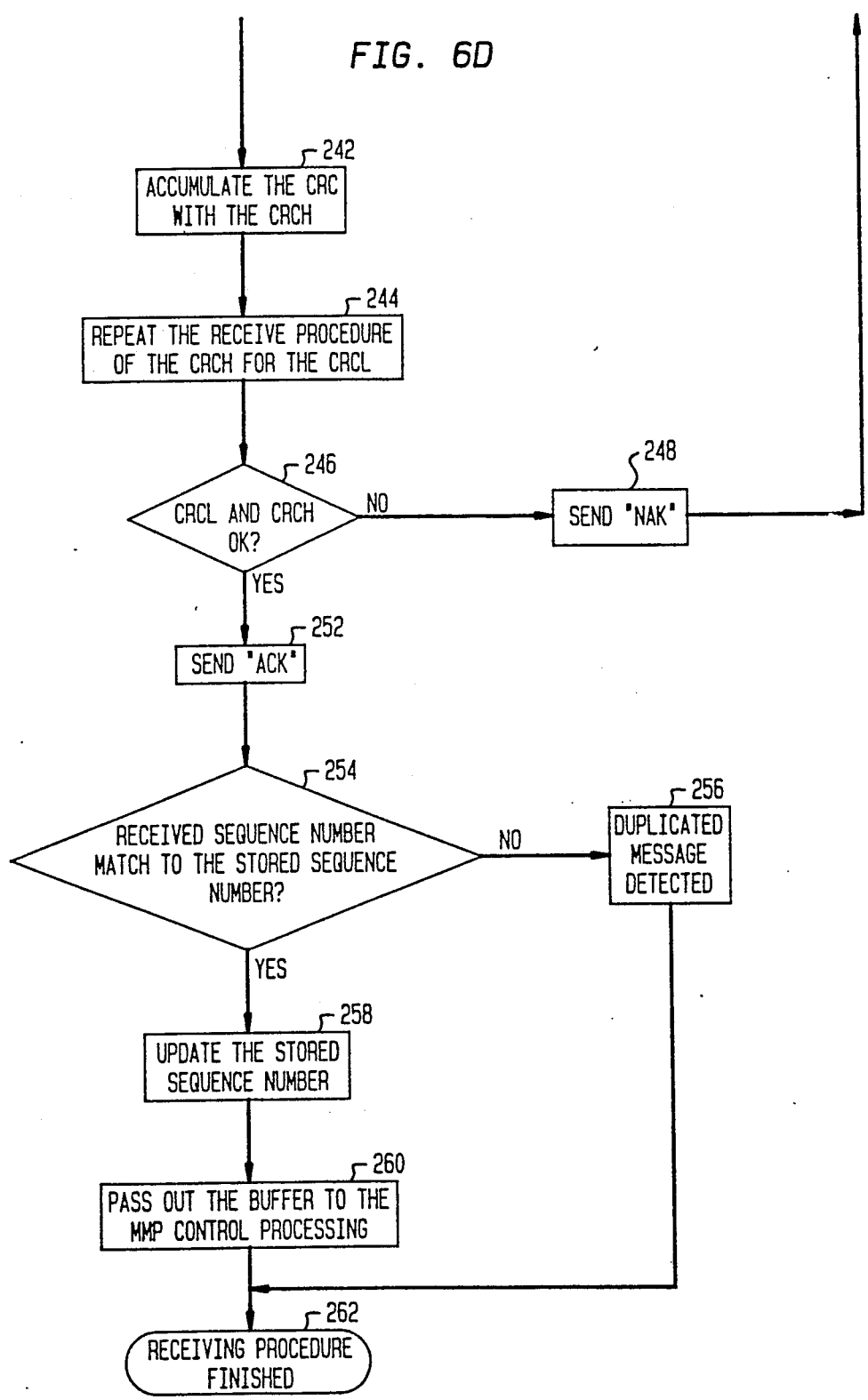

Referring to FIG. 5D, the retry routine 142 upon entry, proceeds to logic block 182 whereupon an increment of the retry counter is performed. The logic routine then proceeds to logic block 184 to determine whether the retry count exceeds the desired predetermined value. If the retry count is excessive, the routine proceeds to logic block 186 whereupon a report is generated to the meter control program that a breakdown of communication has occurred and communication end at 188. If the retry count is not excessive, then the routine proceeds from logic block 184 to logic block 190 whereupon a 2 millisecond wait or time-out is performed and therefrom a return to the ready at 130 whereupon retransmission is attempted.

Referring to FIGS. 6A, 6B, 6C and 6D, to receive a message, the MMP control program stands ready to receive any address-command message <ADD.CMD> with the 9th bit set at logic block 192. Upon receiving an address-command <ADD CMD> sourced from the Meter, the MMP performs a series of checks at logic blocks 192 through 194 to determine whether the received message is intended for the MMP or the PIN-dater. If the message is intended for the PIN-dater, the MMP ignores the command message. If the message is intended for the MMP, the communication logic proceeds to logic block 195. A check is performed at logic block 195 to determine whether the received message is a MMP wake-up command. If the command message is a wake-up, the MMP transmits a wake-up acknowledge at logic block 196 and returns to the ready. If the received command message is determined to be a sleep command at logic block 197, the MMP issues a sleep acknowledgement at logic block 198 and proceeds to a rescheduled wake after 1.5 milliseconds. Upon waking up, the MMP stands at the ready.

If the received message is a proper address-command message indicating data transmission, at logic block 200, the communication proceeds to logic block 201. If the received message is not recognized at logic block 200, the communication ignores the command message and returns to the ready. From logic block 200, the communication logic proceeds to logic block 201 whereupon the communication checks whether system linking has been performed, i.e., whether the command link routine has been executed, refer to FIGS. 4A and 4B. If the command link routine has not been executed, the communication logic transmits a link error message and returns to the ready at logic block 191.

From logic block 201 to logic block 206 where a test is performed to check to see if the MMP receive buffer is available. If the MMP receive buffer is not available, the MMP transmits at logic block 208 a buffer not ready message. The communication routine then proceeds to logic block 210 to record the error and then returns to the ready. If the receiving buffer is available, the logic routine proceeds from logic block 206 to logic block 212 and transmits at logic block 212 a receive ready <REPLY>. The communication logic of the MMP then proceeds to logic block 214 whereupon a check is performed to see if a data message, i.e., byte count, is received in time. If the time has expired, the communication logic routine proceeds to logic block 216 where an abort routine is executed and the error recorded. The routine then proceeds to the Ready. If the data message is received in time at logic block 214, the communication logic proceeds to logic block 218 where a check is performed to see if the buffer byte count 9th bit is clear in the received message. If the 9th bit is not clear, the communication logic routine proceeds from logic block 218 to logic block 216 for an abort routine and then to the Ready. If the 9th bit is cleared of the receive message, then the communication routine proceeds from logic block 218 to logic block 220 where a check of the buffer to see if the buffer byte count is within range. If the buffer count is not within range, again the routine proceeds to logic block 216 and therefrom to the Ready. If the buffer byte count is within the proper range, then the routine proceeds from logic block 220 to logic block 222. At logic block 222, the buffer byte count is assigned to the initial CRC value. The routine then proceeds to logic block 224 whereupon a wait for data to be received is executed. The communication logic then proceeds from logic block 224 to logic block 226 whereupon a test is performed to see if the data has been received in time. If the data has not been received in time, that is the timer has expired, an abort reception and error recorded function is performed at logic block 228 and the routine then proceeds back to the ready position at logic block 200. If the data was received in time, a check is performed at logic block 230 to see if the 9th bit of the data byte is cleared. If the 9th bit is not cleared, the logic proceeds to logic block 228 and therefrom to ready logic block 220. If the 9th bit is clear, then the routine proceeds from logic block 230 to logic block 232 whereupon the received data is stored in the memory, the CRC continues to accumulate using the received data and the byte count is decremented. Proceeding from logic block 232 to logic block 234, the buffer byte count is checked to see if it is equal to zero, if it is not, communication logic is returned to logic block 224 for the receipt of more data and the routine is looped therein from logic blocks 224, 226, 230 and 232 until the total data message is received and the byte count has been decremented to zero, the routine proceeds from logic block 234 to 236 where a wait is performed to receive the CRCH byte count within a prescribed timer time. Pursuant to the wait, the routine proceeds from logic block 236 to logic block 238 where a check is performed to see if the CRCH byte count has been received in time. If the time is expired, the routine then proceeds from logic block 238 to logic block 228 and then to logic block 191. If the information has been received in time, that is the CRCH byte, the routine proceeds from logic block 238 to logic block 240 where a check is performed to see if the 9th bit is cleared. If the 9th bit is not cleared, then the routine proceeds again from logic block 240 to logic block 228 and then to logic block 200.

If the 9th bit of the receive message has been cleared at logic block 240, then the communication routine proceeds to logic block 242 where the CRC is accumulated with the CRCH noted. From logic block 242, the communication routine proceeds to logic block 244 where a repeat of the receive procedure is performed for the CRCL. The receive procedure being a repeat of the steps from logic block 224 through logic block 242. Subsequent thereto from logic block 244, the communication routine proceeds to logic block 246 in which a check is performed of the CRCL and the CRCH. If an error appears in either variable, CRCL or the CRCH, then the routine proceeds from logic block 246 to logic block 248 where a negative acknowledgement <NAK> is sent, thereafter the routine proceeds back to logic block 200. If at logic block 246, both the CRCL and the CRCL are okay, then the routine proceeds to logic block 252 where an acknowledgement is sent. From logic block 252, the routine proceeds to logic block 254 where a check is performed to see if the receive sequence numbers match the stored sequence numbers. If they match, then the routine proceeds from logic block 254 to logic block 258 whereupon an update of the stored sequence numbers are performed and the routine proceeds to logic block 260 where buffer control is passed to MMP control processing. If at logic block 254, the sequence numbers do not match the stored sequence number, then the routine proceeds to logic block 256 where a detection of duplicate message is received and therefrom the routine proceeds from logic block 256 to logic block 262 where the receive procedure is noted as finished.

Figure 7B:
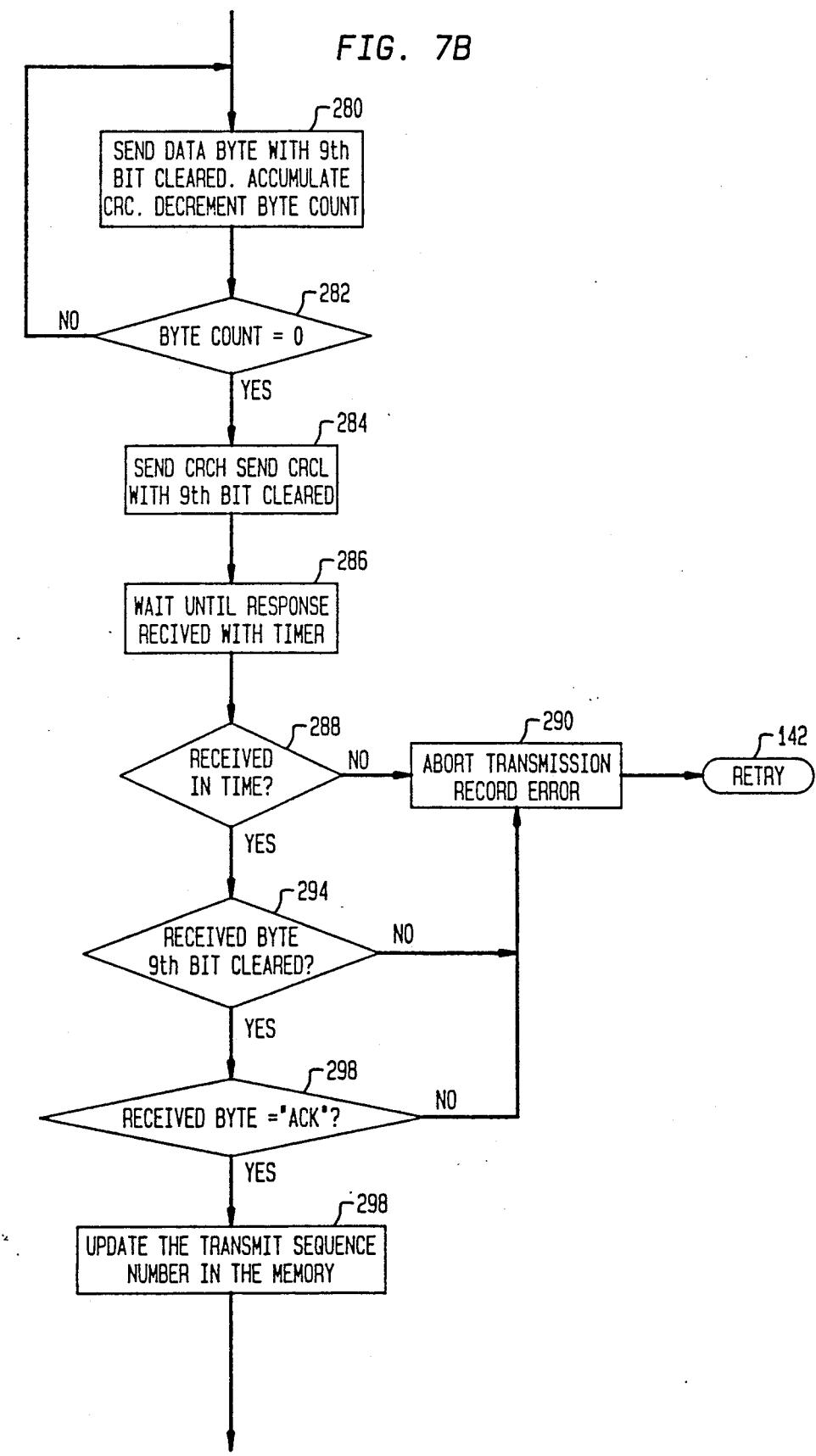
Figures 8, 8A:
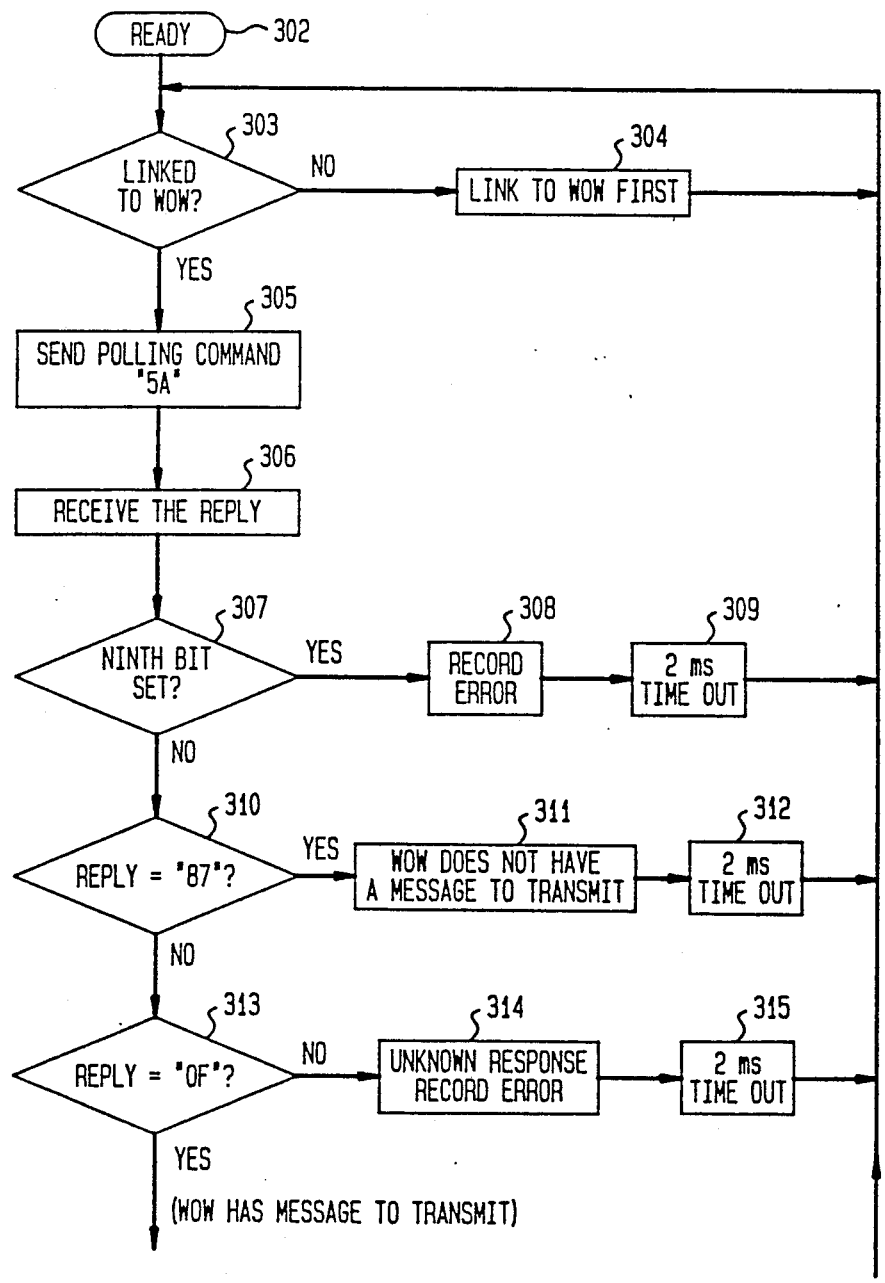
Figure 8D:
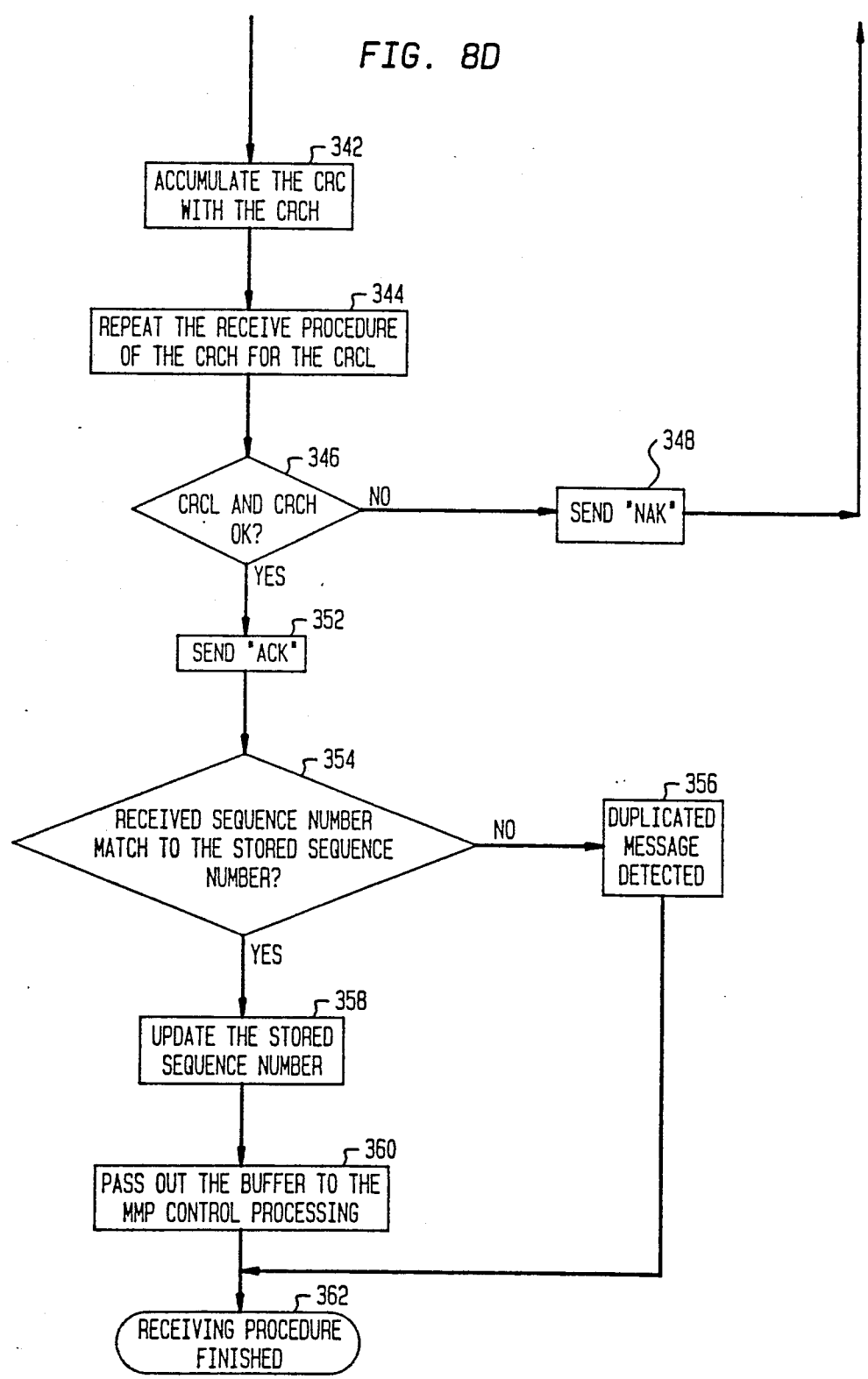

Referring to FIGS. 7A, 7B and 7C, should the MMP control program request to send a buffered message to the WOW. At the Ready illustrated at logic block 263, the MMP transmits the WOW address-command <ADD.CMD> at logic block 164 with the 9th bit set. The communication logic is then instructed to wait for a response within a 30 to 500 micro-seconds time period. The communication logic then proceeds upon receipt of a response to logic block 268 whereupon a check is performed to see if the response was received in time. If the response was not received in time, that is, the time expired, the communication logic is directed to abort the transmission and record the error at logic block 270. Thereafter, a retry routine is initiated at logic block 142. If the response has been received in time, the communication logic proceeds to logic block 274 whereupon a check is performed to see if the 9th bit is cleared. Again, if the 9th bit is not cleared, the communication logic is directed again to logic block 270 and therefrom to logic block 142 for a retry. If the 9th bit of the response byte is cleared, then the communication logic proceeds to logic block 276 whereupon a check is performed to see if a valid reply code has been received and if the receiving buffer of WOW is ready to receive information from MMP. If a valid reply code has not been received, again the communication logic is directed to logic block 270 and therefrom to a retry routine at logic block 142. If a valid code has been received, then the communication logic proceeds to logic block 278 whereupon the byte count and sequence number are transmitted with the 9th bit cleared and the start accumulation for the CRC's performed. The communication logic then proceeds to logic block 280 whereupon data byte with the 9th bit cleared, is transmitted, followed by the accumulate CRC's using the data byte and the byte count is decremented. At this point, a loop is set where the send data byte proceeds until that byte count is decremented to zero. The byte count is checked at logic block 282. When the byte count has been decremented to zero, all data has been transmitted, the communication logic proceeds to logic block 284 whereupon the CRCH and CRCL is sent with the 9th bit cleared. Subsequently thereto, at logic block 286, the communication logic waits for a response from the WOW within the 30 to 500 micro-seconds response. The communication logic proceeds to logic block 258 to check to see if the response has been received in time. If the response is not received in time, the communication logic proceeds to logic block 290 where at an abort transmission is performed and the error recorded. The communication logic then proceeds to logic block 142 where the retry routine is initiated.

If a response is received in time, the communication logic proceeds from logic block 288 to logic block 294 where a check is performed to see if the 9th bit is cleared. If the 9th bit is not cleared, the communication routine proceeds to logic block 290 and therefrom to the retry routine logic block 142. If the 9th bit of the response has been cleared, the logic routine proceeds to logic 298 where a check is performed to see if the receive message contains an acknowledgement message, if not the logic routine proceeds to logic block 290 and therefrom to logic block 142 for a retry. If an acknowledgement is received, then an update is performed of the transmit sequence number in the memory bit at logic block 298, therefrom the logic routines proceeds to logic block 300 whereupon a notification routine is performed to the MMP control program that the transmission has been finished and logic is returned to the ready at logic block 301.

Referring to FIGS. 8A, 8B, 8C and 8D, the MMP polling communication logic for the WOW begins at logic block 302. From logic block 302, the polling communication logic proceeds to logic block 303 to determine if the communication link with the WOW has been established. If the link has not been established, the routine proceed establishing the link at logic block 304 (refer to logic blocks 112 through 124) and therefrom to the Ready. If the link has been established, the logic proceeds to logic block 305 where at the polling command. The logic then proceeds to logic block 306 upon receiving a reply from the WOW. The communication logic proceeds to logic blocks 307, 310 and 313. At logic block 307, if the reply has the 9th bit set, the logics proceed to logic block 308 to record error and then to logic block 309 where a 2 millisecond time out is executed after which the logic returns to the ready. At logic block 310, the Reply code is a no message code from the WOW at logic block 311, the communication logic executes a 2 millisecond time out at logic block 312 and returns to the Ready. At logic block 313, the reply is checked, if the reply code is other than a WOW message ready, the communication logic interrupts the reply as unknown and records error at logic block 314, then executes a 2 millisecond time out at logic block 315 and returns to the ready. If the reply message is a WOW message ready at logic block 313, the communication logic proceeds to logic block 316.

At logic block 314 whereupon a check is performed to see if a byte count (BYTE.C) is received in time. If the time has expired, the communication logic routine proceeds to logic block 317 where an abort routine is executed and the error recorded. The routine then proceeds to the Ready. If the response is received in time at logic block 316, the communication logic proceeds to logic block 318 where a check is performed to see if the buffer byte count 9th bit is clear in the received message. If the 9th bit is not clear, the communication logic routine proceeds from logic block 318 to logic block 317 for an abort routine and then to the Ready. If the 9th bit is cleared of the receive message, then the communication routine proceeds from logic block 318 to logic block 320 where a check of the buffer to see if the buffer byte count is within range. If the buffer count is not within range, again the routine proceeds to logic block 317 and therefrom to the Ready. If the buffer byte count is within the proper range, then the routine proceeds from logic block 320 to logic block 322. At logic block 322, the buffer byte count is assigned to the initial CRC value. The routine then proceeds to logic block 324 whereupon a wait for data to be received is executed. The communication logic then proceeds from logic block 324 to logic block 326 whereupon a test is performed to see if the data has been received in time. If the data has not been received in time, that is the timer has expired, an abort reception and error recorded function is performed at logic block 328 and the routine then proceeds back to the Ready. If the data was received in time, a check is performed at logic block 330 to see if the 9th bit of the data byte is cleared. If the 9th bit is not cleared, the logic proceeds to logic block 328 and therefrom to Ready. If the 9th bit is clear, then the routine proceeds from logic block 330 to logic block 332 whereupon the received data is stored in the memory, the CRC accumulates using the received data and the byte count is decremented. Proceeding from logic block 332 to logic block 334, the buffer byte count is checked to see if it is equal to zero, if it is not, communication logic is returned to logic block 324 for the receipt of more data and the routine is looped therein from logic blocks 324, 326, 330 and 332 until the total data message is received and the byte count has been decremented to zero. Once the byte count has been decremented to zero, the routine proceeds from logic block 334 to 336 where a wait is performed to receive the CRCH byte count within a prescribed timer time. Pursuant to the wait, the routine proceeds from logic block 336 to logic block 338 where a check is performed to see if the CRCH byte count has been received in time. If the time is expired, the routine then proceeds from logic block 338 to logic block 328 and then to the Ready. If the information has been received in time, that is the CRCH byte, the routine proceeds from logic block 338 to logic block 340 where a check is performed to see if the 9th bit is cleared. If the 9th bit is not cleared, then the routine proceeds again from 340 to logic block 328 and then to the Ready.

If the 9th bit of the receive message has been cleared at 340, then the communication routine proceeds to logic block 342 where the CRC is accumulated with the CRCH noted. From logic block 342, the communication routine proceeds to logic block 344 where a repeat of the receive procedure is performed for the CRCL. The receive procedure being a repeat of the steps from logic block 324 through logic block 342. Subsequent thereto from logic block 344, the communication routine proceeds to logic block 346 in which a check is performed of the CRCL and the CRCH. If an error appears in either variable CRCL or the CRCH, then the routine proceeds from logic block 346 to logic block 348 where a negative acknowledgement <NAK> is sent to the MMP, thereafter the routine proceeds back to the Ready. If at logic block 346, both the CRCL and the CRCH are okay, then the routine proceeds to logic block 356 where an acknowledgement is sent. From logic block 352, the routine proceeds to logic block 354 where a check is performed to see if the receive sequence numbers match the stored sequence numbers. If they match, then the routine proceeds from logic block 354 to logic block 358 whereupon an update of the stored sequence numbers are performed and the routine then proceeds to logic block 360 where buffer control is passed to the MMP control software. If at logic block 354, the sequence numbers do not match the stored sequence number, then the routine proceeds to logic block 356 where a detection of duplicate message is recorded and therefrom the routine proceeds from logic block 356 to logic block 362 where the receive procedure is noted as finished.

Figure 9:
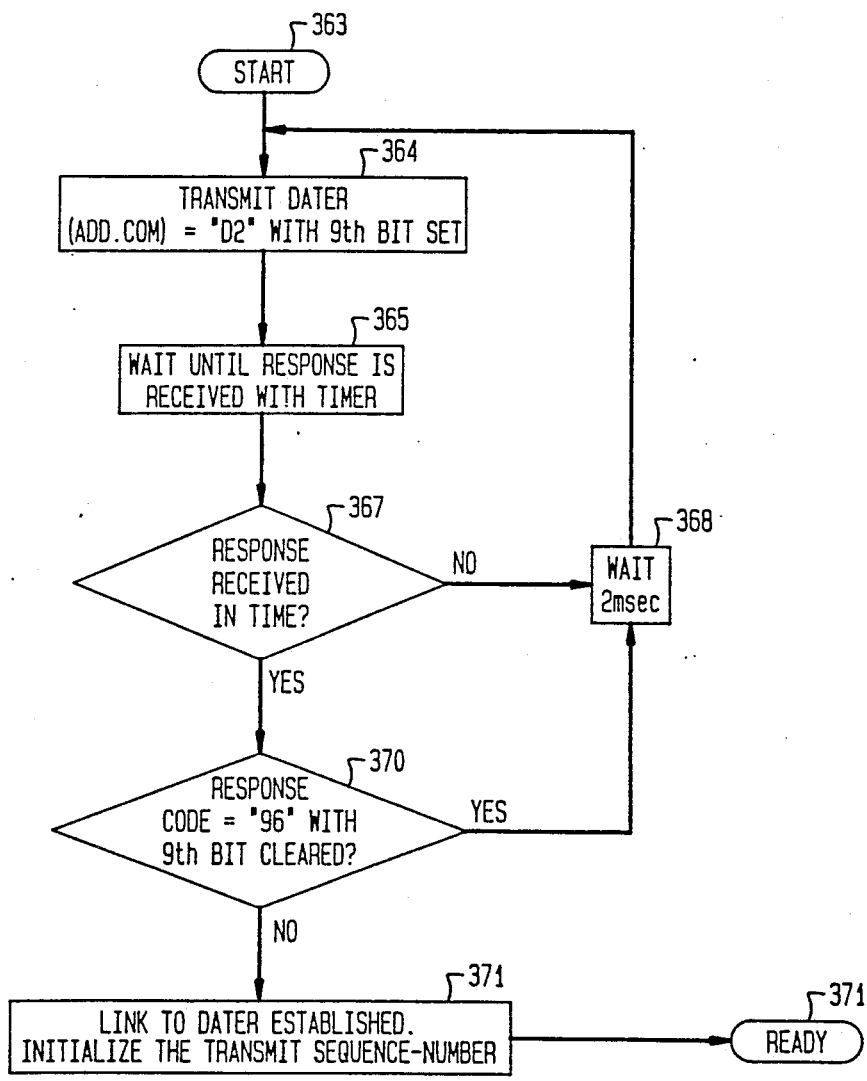
FIG. 9 is a logic chart of Meter commands to link Dater.

Referring to FIG. 9, upon powering up the system, the Meter software logic commands initiate a start sequence at logic block 363. Upon initiation of the start sequence, the Meter communication logic instruction transmits a address command <ADD.CMD> Code to the PIN at logic block 364. Subsequently thereto, the Meter stands ready at logic block 365 to receive a response from PIN from between 30 to 500 microseconds. Subsequently thereto at logic block 367, a check is performed to ascertain whether the response has been received in time. If the response has not been received in time, the Meter waits 2 micro-seconds at logic block 368 and then proceeds back to the start. If the response is received in time, the communication logic then proceeds to logic block 370 to establish whether communication has been linked by receiving a proper reply response code with the 9th bit cleared. If an improper code has not been received or the 9th bit is not cleared, the communication logic then proceeds to logic block 368 and waits 2 micro-seconds and then again initiates the Start.

If the proper response has been received at logic block 370, the communication logic proceeds to logic block 112 whereupon initialization of the receive sequence number and transmits sequence number is performed. Thereafter, communication logic proceeds to the Ready at logic block 372.

Figure 10B:
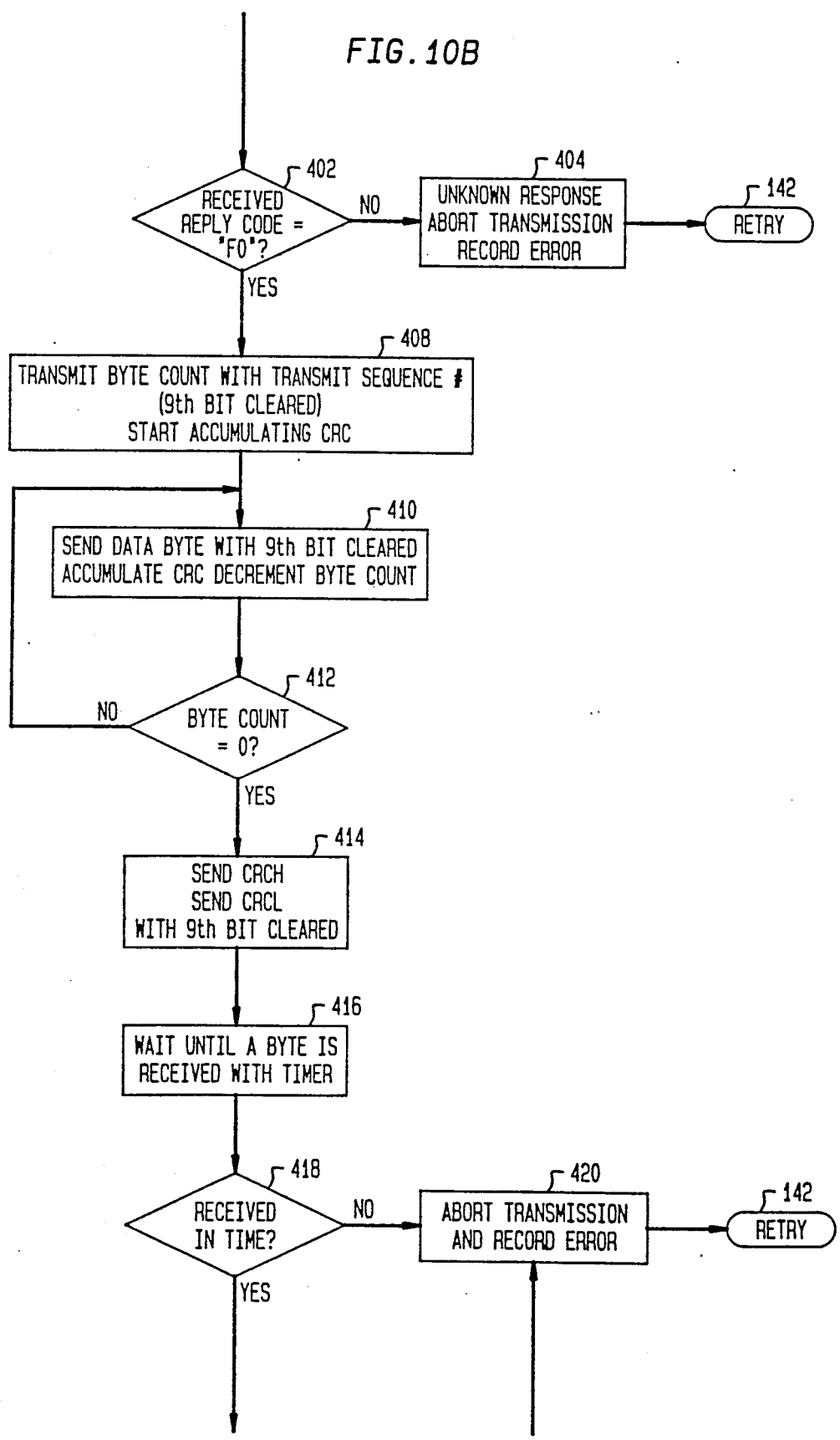
Figure 11B:
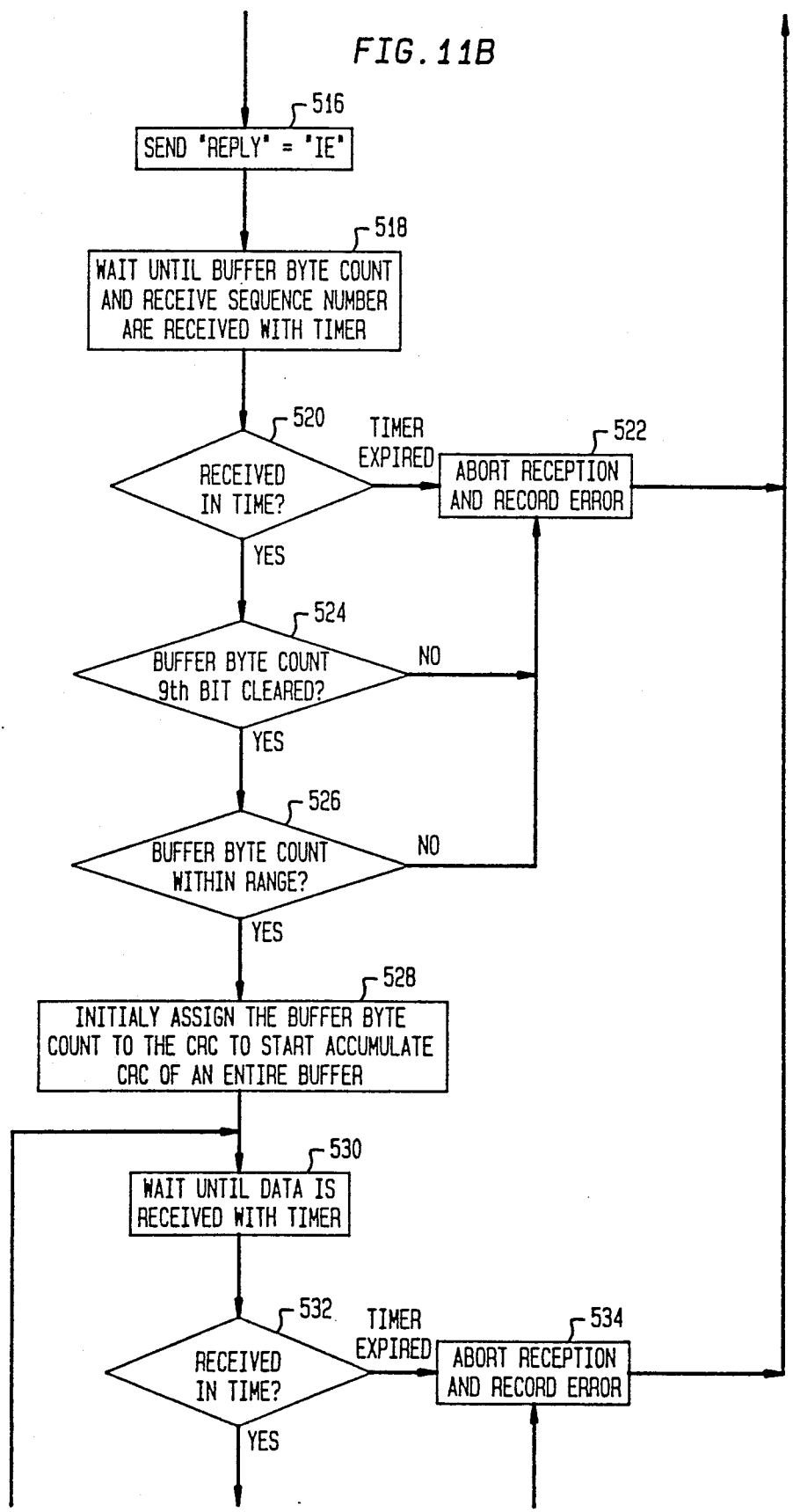
Figure 11C:
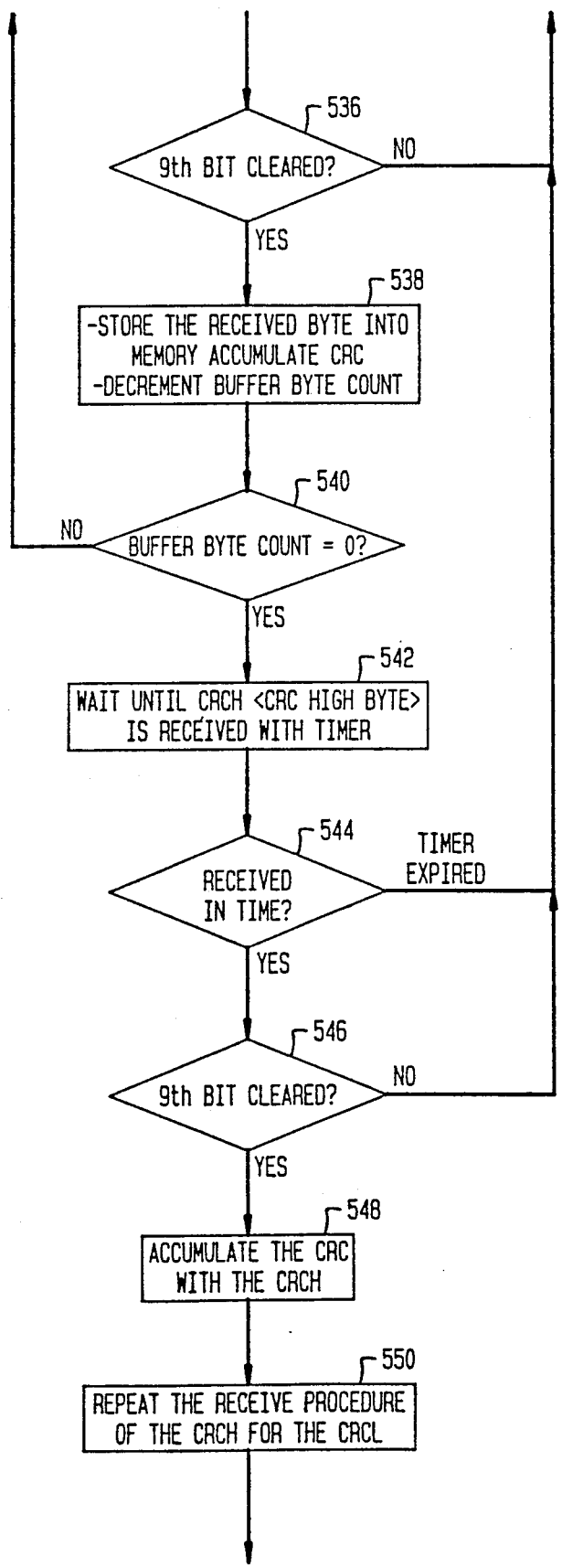
Figure 11D:
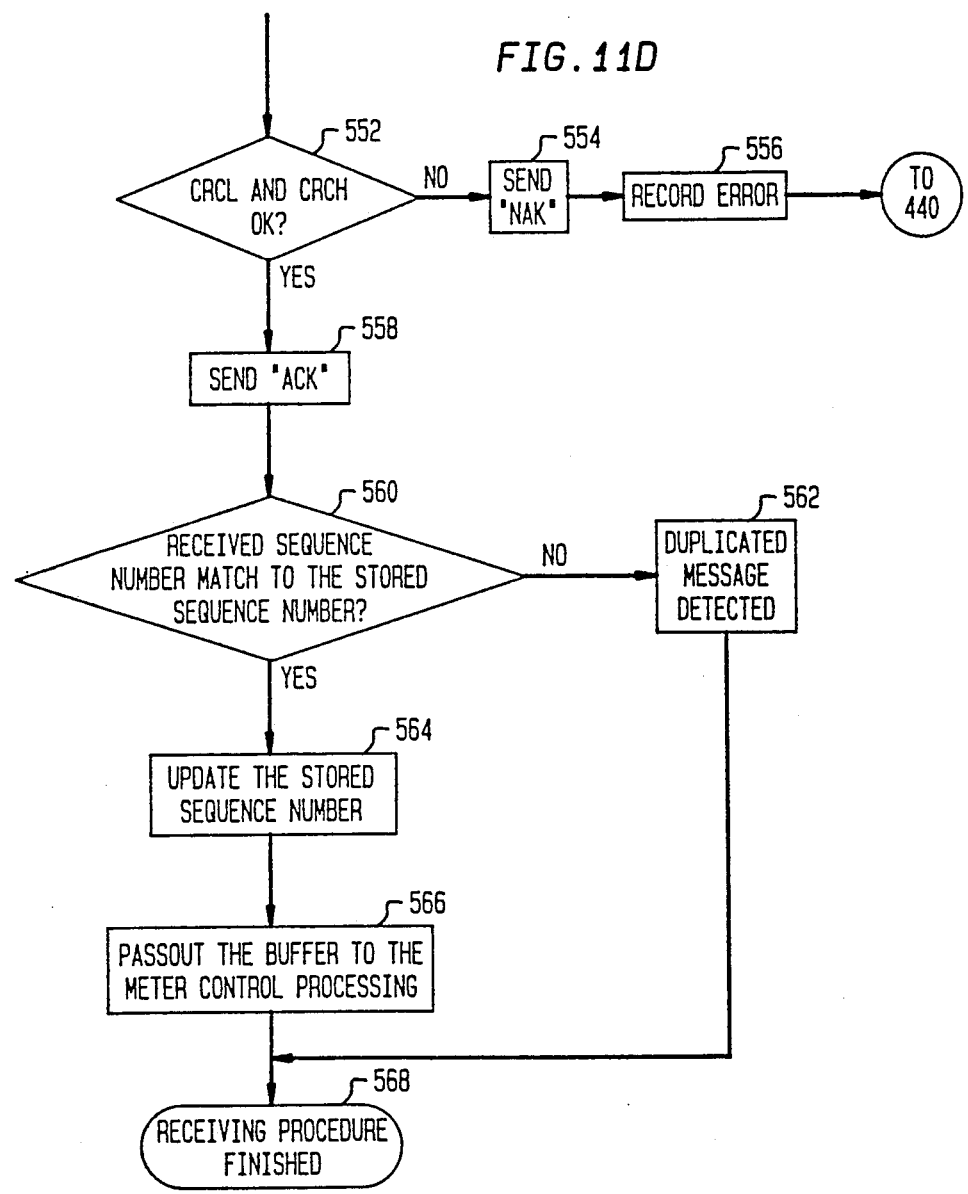
Figure 12B:
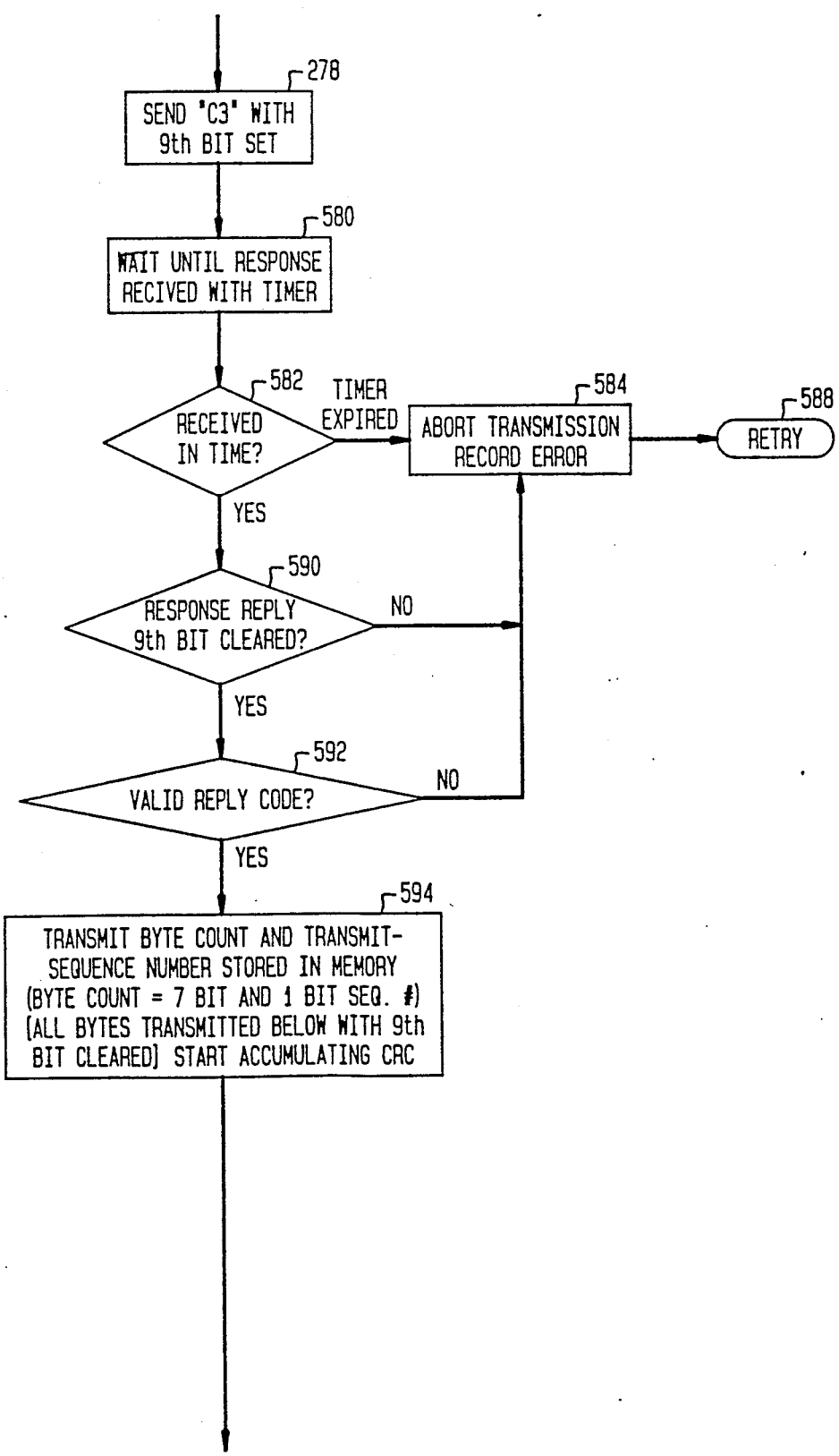
Figure 12C:
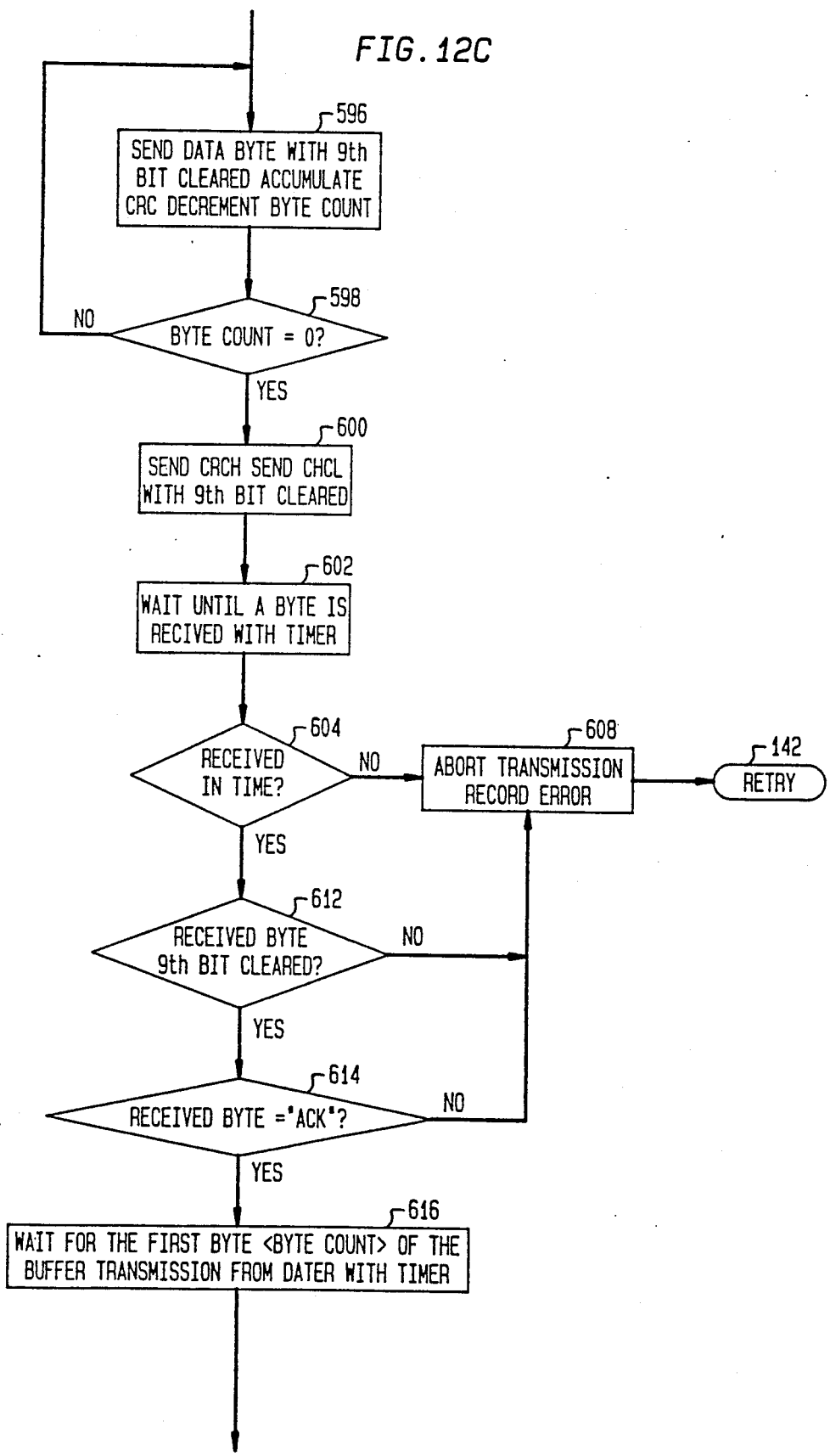
Figure 12D:
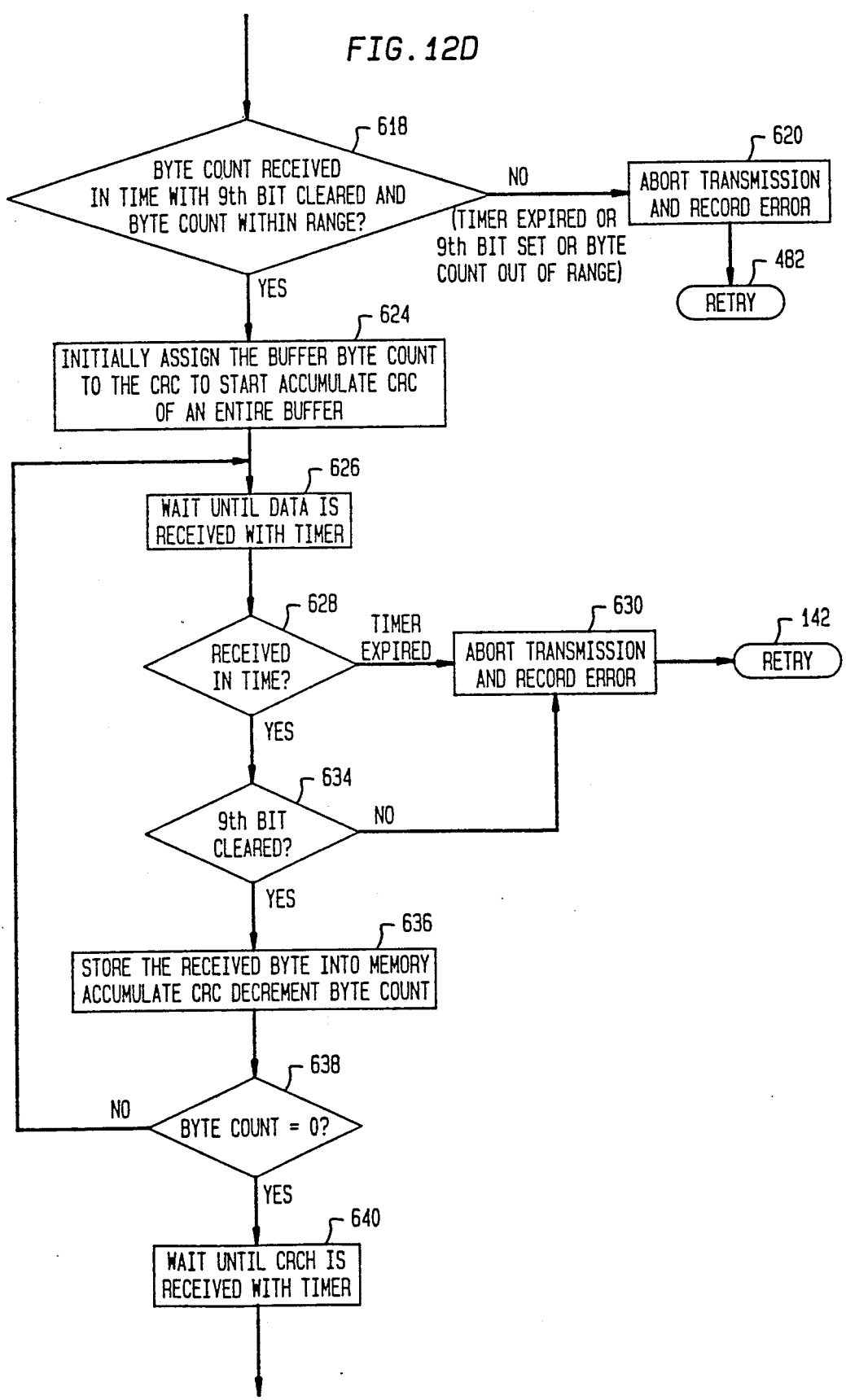
Figure 13D:
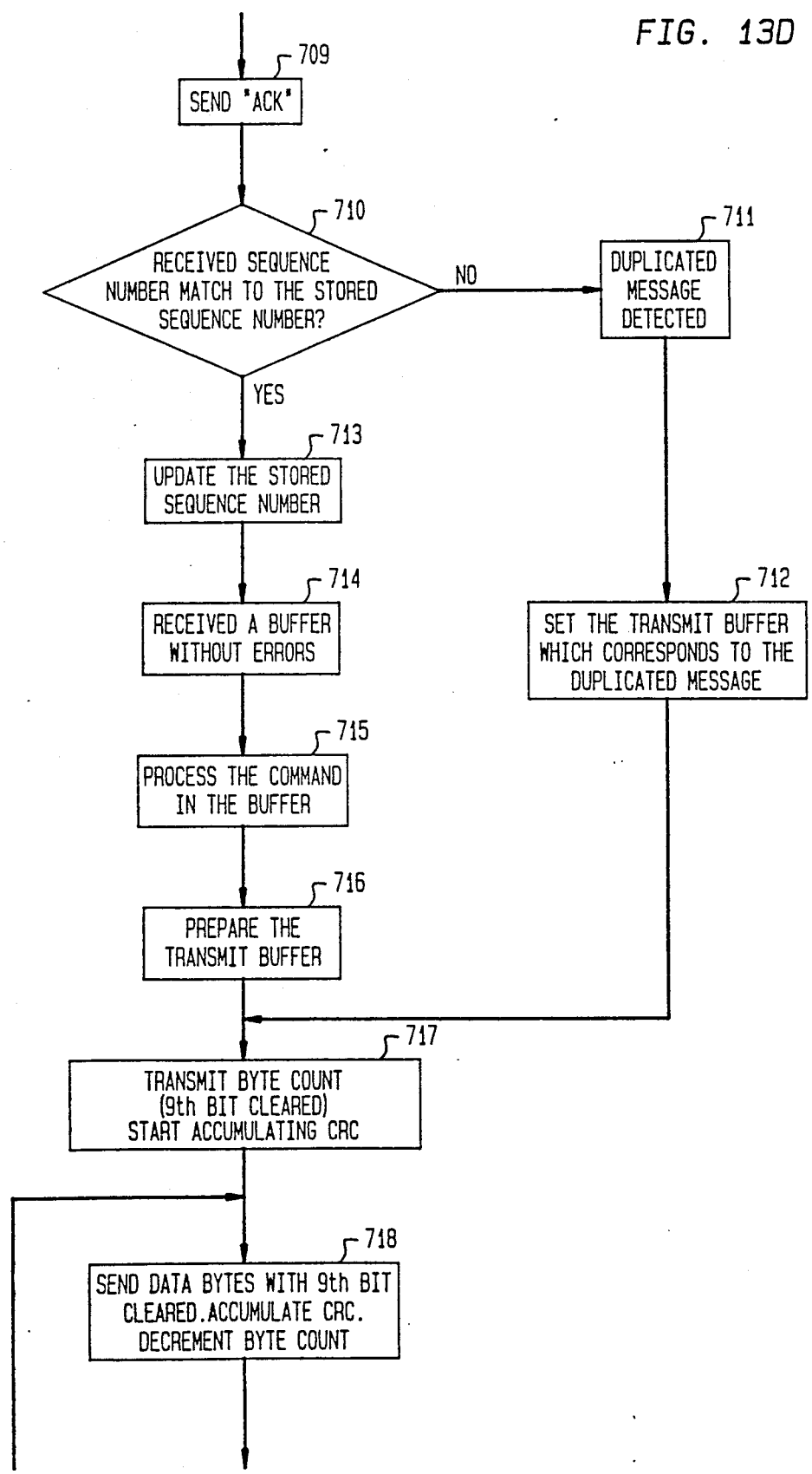

Referring to FIGS. 10A, 10B, and 10C, the Meter transmit procedure is activated when the Meter control program requesting to send a buffer of data at logic block 373 to MMP. From logic block 373 the communication logic procedure proceeds to logic block 376 to check if the Meter is in a "sleep" mode. If the Meter is in a "sleep" mode, the transmission is abort at logic block 376 and the present attempt is ended at logic block 377. If the Meter is not in a "sleep" mode, the communication logic proceeds to logic block 375.

At logic block 375 a check is performed to see if the Meter is linked to the MMP. If linkage has not been established, the routine proceeds from logic block 375 to logic block 376 where an abort transmission is performed and an end is thereafter executed at logic block 377. If the Meter is linked to the MMP, the routine proceeds from logic block 375 to logic block 378 where the Meter sends a address-command to the MMP with the 9th bit set. The communication logic then waits as instructed at logic block 380 for a response within the appropriate time. The communication routine then proceeds from logic block 380 to logic block 382 where a check is performed to see if the reply from the MMP is received in time. If the time has expired, the routine proceeds to logic block 384 where an abort transmission and a error record is made. Therefrom, the routine proceeds to logic block 142 where a retry routine is entered and executed. If the reply from the MMP is received in time, the routine proceeds from logic block 382 to logic block 388 where a check is performed of the reply to see if the 9th bit is set. If the 9th bit is set, then the communication routine proceeds to logic block 390 whereupon by the 9th bit being set, a contingent problem is detected, transmission is aborted and the Meter switches to receive mode. From logic block 390, the Meter then switches to receive a message at 392 according to the message receive routine subsequently described.

If the 9th bit is not set at logic block 388, the routine proceeds to logic block 394 to receive a reply code. At logic block 396 the receive reply code is checked, if the reply code is improper, the routine proceeds from logic block 396 to logic block 398 where the transmission is aborted and again to logic block 142 to enter the retry routine. If a proper reply code is received at logic block 396, the routine then proceeds to logic block 402 to check the received reply code indicates the MMP buffer is available. If the buffer is not available, the routine proceeds from logic block 402 to logic block 404 noting the unknown response transmission is abort and the error is recorded and the routine then again tries a retry at logic block 142.

If the respond message is correct, the routine proceeds from logic block 402 to logic block 408 where the Meter transmits the byte count and sequence numbers and the accumulated CRC's are started and noted that the data message 9th bit is cleared. At this point, the communication routine is identical to that of aforedescribed with respect to the MMP transmit mode and proceeds from logic block 408 through logic block 432 which is identical to respective logic blocks 150 through 130 which were aforedescribed.

Referring to FIGS. 11A, 11B, 11C and 11D the Meter received procedure is triggered by an address-command from the MMP with the 9th- bit set at logic block 440. From logic block 440, the communication routine of the Meter proceeds to logic block 442 to check the received data to see if the received data is a command for the establishment of the linking handshake (1E). If the data is a established communication command (1E), the routine proceeds to logic block 444 whereupon the Meter is awaken and the following messages are sent at logic block 444 to correspond to the message receiving format of the linking routine of the MMP, that is, a send of the communication received command; a link establish command, the reset of the transmit sequence numbers; and a reset device to receive sequence numbers.

At logic block 445, the received command message is checked to see if the message is a "wake-up" meter message. If the message is a meter "wake-up", the meter is awaken and the communication logic proceeds to logic block 440. If the received message is not a Mete "wake-up", a check is performed at logic blocks 446, 448 and 449 to determine if the MMP generated command is intended for the WOW. If the received command is intended for the WOW, the Meter communication logic proceeds to logic block 447 where the Meter is placed in a "sleep" mode and the logic proceeds to logic block 440.

At logic block 504, a check is performed to see if the address-command <ADD.CMD> is properly addressed to the Meter. If the address is improperly addressed to the Meter, then the logic proceeds to logic block 506 where the message is recorded as a unknown command error, therefrom the logic proceeds to logic block 404. If the address is proper, then the communication logic proceeds from logic block 504 to logic block where at the meter is awakened. The logic proceeds to logic block 288 to check if a link has already been established. If the link has not been established, it sends back to the MMP a response code indicating an error condition at logic block 510. If at this time the link has been established, then the routine proceeds from logic block 508 to logic block 512 which tests if the Meter receiving buffer is available to receive data. If the receiving buffer is not available, then a buffer not available response is sent to the MMP at logic block 514. Thereafter, the routine returns to the Ready.

If at logic block 512 the buffer is available, the communication logic proceeds from logic block 512 to logic block 516 in which the Meter sends back to the MMP a ready message. From logic block 516, the communication routine proceeds to logic block 518 whereupon the routine waits to receive a buffer count and sequence number for a prescribed time. At this point, the routine proceeds with its data receive sequence indicated by logic blocks 520 through 568 which receive procedure is identical to that receive procedure aforedescribed with respect to logic blocks 214 through 262 respectively as aforedescribed.

Referring to FIGS. 12A, 12B, 12C, 12D and 12E, the meter transmit-receive procedure to and from Node 3 is instigated by the Meter control program requesting to send a buffer of information to PIN at logic block 569. The meter communication logic checks at logic block 570 to see if the Meter is in a "sleep" mode. If the Meter is in the "sleep" mode, the logic proceeds to logic block 571 where a wait routine is entered until the MMP awakens the Meter after which the logic executes a retry routine at 142. If the meter is awake, the communication logic proceeds from logic block 570 to logic block 572. If at logic block 572 the data link has not been established, a error is recorded at logic block 573 and an end transmission routine is executed at logic block 574.

If a logic block 572, the communication link has been established between the Meter and the PIN, the communication logic sends a "sleep" message to the MMP at logic block 575 and receives a reply from the MMP at logic block 576. At logic block 577, the MMP reply is checked. If the reply message is not a "sleep" acknowledgement from the MMP, the communication logic proceeds to execute a retry at logic block 142. If the MMP reply is an "sleep" acknowledgement, the Meter communication logic proceeds to logic block 578.

At logic block 578 the PIN address-command <ADD.CMD> is sent to PIN with the 9th bit set. The communication software then proceeds from logic block 578 to logic block 580 where it waits for a response from the PIN for within 50 to 500 microseconds. Thereafter, the communication logic proceeds to logic block 582 where a check is performed to see if a response has been received in time. If the response has not been received in time, the communication logic proceeds from logic block 582 to logic block 584 and an abort transmission is carried out and the error recorded. The communication logic then proceeds to logic block 558 where a transmission retry routine is entered. If the response is received in time, the communication logic proceeds from logic block 582 to logic block 590 in which the response message is checked to see if the 9th bit is cleared. If the 9th bit is not cleared, the communication routine proceeds again to logic block 584 and therefrom to logic block 588. If the 9th bit is cleared, then the communication logic proceeds from logic block 590 to 592 where a check is performed to see if PIN reply is a valid. If the reply is not valid, the communication logic proceeds to logic block 584 and therefrom to logic block 448 for a retry. If a valid reply code is received, then the communication logic proceeds from logic block 592 to logic block 594 where after the communication logic proceeds in a manner identical to that previously described with the respect to Meter transmissions to the MMP. That is, the Meter proceeds in a manner such that from logic block 594 through logic block 614 is identical to the procedure followed aforedescribed logic block 148 through logic block 166.

At logic block 616, the Meter waits for the first byte count of the buffer transmission from PIN which is timed. The communication protocol between the Meter and the PIN is not disturbable until the Meter has fully transmissioned a data response to the Meter. From logic block 616, the communication logic procedures proceeds to logic block 618. At logic block 618, a check is performed to see if the byte count received from the PIN as been received in time and if the 9th bit is cleared, also, if the byte count is within the proper range. If either condition is not present, the communication logic then proceeds from logic block 618 to logic block 620 where an abort transmission is executed and subsequently at logic block 142 for execution of a retry routine.

At this point, the Meter enters a receive mode which is identical to the Meter receive procedure set forth at logic blocks 220 through 252 and are indicated by respective logic blocks 624 through 670.

The Meter communication logic proceeds from logic block 670 to sequentially logic blocks 672, 673 and 674 where the respective functions are performed: increment the transmit sequence numbers; send an acknowledgement confirmation message to Dater and a reply is received from Dater. The communication logic then proceeds to logic block 675 where the Dater reply is checked. If the reply is not good, then the logic enters the retry routine. If the reply is good, then a "wake-up" is sent to the MMP at logic block 676 following the Meter receiving a "wake-up" reply from the MMP at logic block 678. The Meter control program is then informed that the transmit-receive is complete at logic block 680.

Referring now to FIGS. 13A, 13B, 13C, 13D, and 13E, as aforenoted, the Dater cannot instigate a communication on its own. It can only respond to a communication initiated by the Meter. The Dater receive transmit procedure is triggered by a communication having the 9th bit set as indicated at logic block 621. Upon receiving a communication, the dater communication routine proceeds from logic block 691 to logic block 682 whereupon a check is performed to see if the address-command is a link establish code. If a start-up linking code has been sent, then the meter proceeds from logic block 582 to logic block 683 whereupon a linkage establish routine is performed in response to the link commands previously described whereby in response to the commands the Dater issues the reply code, linking establish code, and resets receive sequence numbers. The communication logic then proceeds from logic block 683 to the ready at logic block 681.

If at logic block 682, the address-command is not a link establish command, the routine proceeds to logic block 684 where a check is performed of the address-command to see if the address data is intended for the Dater. If the address-command is not intended for the Dater, the routine then proceeds from logic block 684 to logic block 681 at the ready. If the address-command is other than a linking establishing command, the routine proceeds from logic block 684 to logic block 685 where a check to see if the communication link has been established between. If the communication link has not been established, the logic proceeds from logic block 685 to logic block 686 where an error is recorded, thereafter the logic proceeds to logic block 681. If the communication has been established, the routine proceeds to logic block 687. If at logic block 687, the Dater receiving buffer is unavailable, the communication logic proceeds to logic block 689 where a buffer not available ("E1") is sent to the Meter. If the Dater receiving buffer is available, the logic proceeds to logic block 569 where at a buffer available and ready to receive is sent to Meter.

From logic block 590, the communication routine continues to logic block 591 whereupon the communication routine waits for a buffer byte count and a sequence number within a prescribed time. Subsequently thereto, the communication routine proceeds to a data receive mode illustrated by logic block 692 through 709 which sequence is identical to the receive routine set forth in respective logic blocks 214 through 252. At logic block 610, the acknowledgement is sent of a successfully received message, the receive communication routine of the dater proceeds to logic block 710 in which time a check is made to see if the receive sequence numbers match the stored sequence numbers. If the sequence numbers do not match, the routine proceeds from logic block 710 to logic block 711 where duplicate message is detected and therefrom to logic block 712 whereupon the transmission buffer is set which corresponds to the duplicate message. From logic block 712, the routine proceeds to logic block 717 which will be hereafter described.

Should the sequence numbers match at logic block 710, the communication routine proceeds from logic block 710 to logic block 713 where an update of the stored sequence numbers is performed followed by a message to the Meter application program citing receipt of the buffer without error at logic block 714. Subsequent, the routine proceeds from logic block 714 to logic block 715 where it processes the command in the buffer. From logic block 715, the communication routine proceeds to logic block 716 where it prepares to transmit a buffer message to the Meter. From logic block 716, the routine proceeds into logic block 717 at which logic step the Dater communication logic switches to a transmit mode and proceeds to transmit the data byte count, sequence numbers which are stored in its memory and accumulation of the CRC's is started. Subsequent thereto, the communication logic enters a data send loop at logic block 718. At logic block 718, the data bytes with the 9th bit clear and accumulator CRC decrement byte count are transmitted. The routine proceeds from logic block 718 to logic block 719 where a check is performed to see if the byte count is equal to zero, if not, the routine then proceeds back to 718 until all data is sent. When the byte count has been decremented to zero at logic block 719, the routine proceeds to logic block 720 where the Dater transmits the CRCH and the CRCL. From logic block 720, the communication logic proceeds to logic block 721 where the routine is instructed to wait for the received byte. At logic block 723 a check is performed to see if the response message has been received in time. If not, the routine proceeds to logic block 724 and an error is recorded, and from logic block 724 it returns back to logic block 681. It is noted that a retransmission retry routine is not entered into at this point, instead the Dater is set to re-receive the message from the Meter. If the response is received in time, that is an acknowledgement, then the routine proceeds from logic block 723 to logic block 725 where a check is performed to see if the 9th bit is cleared. If the 9th bit is not cleared, then the routine proceeds to logic block 724 and therefrom to 681. If the 9th bit has been cleared, the transmit routine proceeds to logic block 726 to check if a acknowledgement has been received. If an acknowledgement has not been received from the Meter, the logic proceeds to logic block 724 and therefrom to logic block 681. If an acknowledgement has been received, the logic proceeds to logic 727 and 728 where the confirming message is received and replied to. Thereafter, the communication proceeds to logic block 646 to signal end of transmission.

Figure 14B:
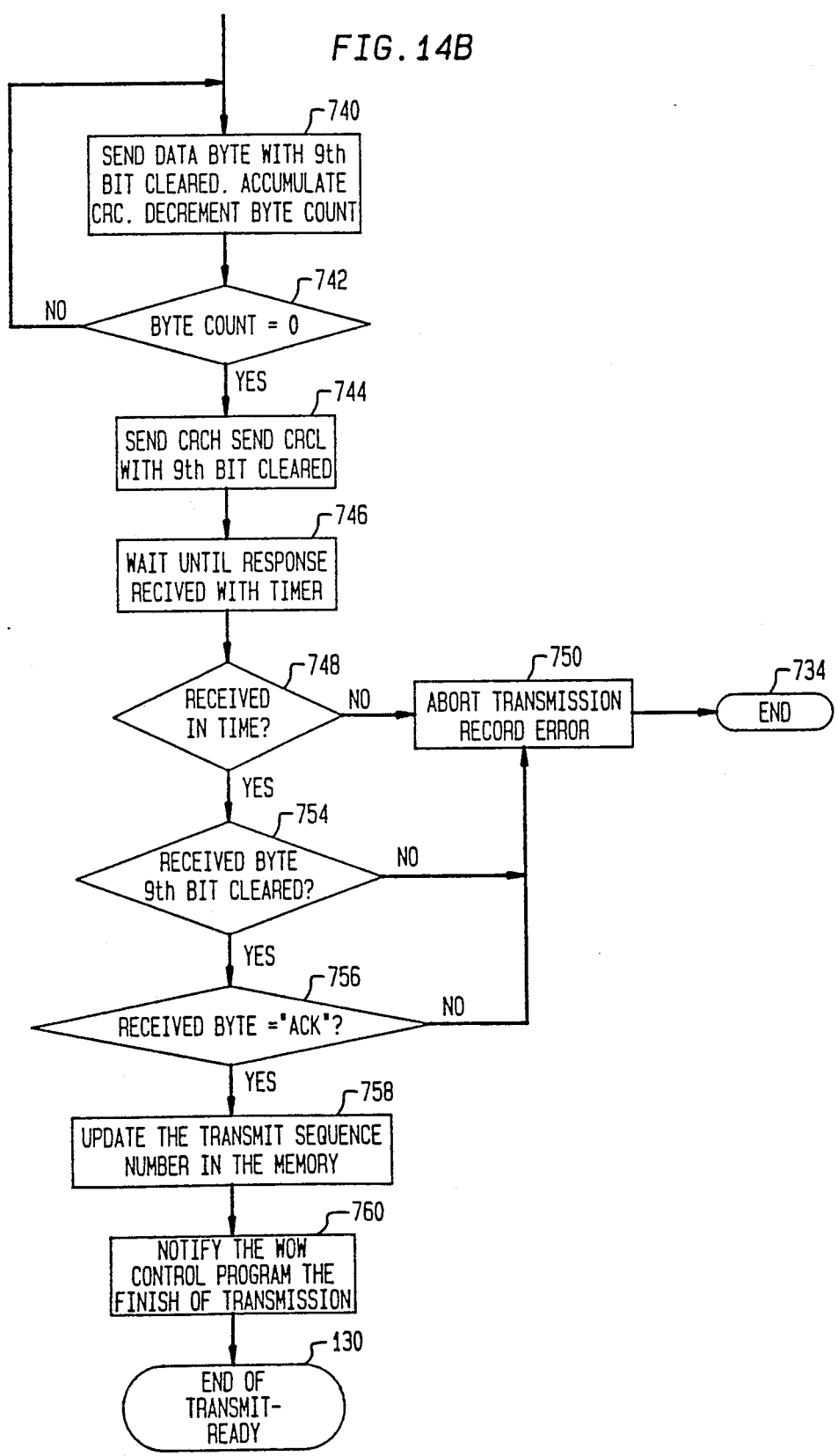

Referring to FIGS. 14A, 14B and 14C should the WOW control program request to send a buffered message to the MMP. At the ready illustrated at logic block 730, when the WOW receives a poll command from the MMP at logic block 731, it performs a check to see if the communication link has been established at logic block 732. If the communication link has not been established, the logic proceeds to logic block 733 where a link error message is sent to the MMP therefrom the logic proceeds to an end at logic block 734. If the communication link has been established, the logic proceeds to logic block 735 where the WOW transmit buffer is checked. If the transmit buffer is not fully enabled by the WOW control program, the logic proceeds to logic block and sends to the MMP a reply message of no transmission (code "87") and then proceeds to the ready at 730. If the transmit buffer is enabled, the WOW sends a ready to transmit message to the MMP at logic block 737.

The communication logic proceeds to logic block 738 from logic block 737 whereupon the byte count and sequence number are transmitted with the 9th bit cleared and the start accumulation for the CRC's performed. The communication logic then proceeds to logic block 740 whereupon data by the accumulate CRC's using the data transmitted, followed by the accumulate CRC's using the data byte and the byte count is decremented. At this point, a loop is set where the send data byte proceeds until that byte count is decremented to zero. The byte count is checked at logic block 742. When the byte count has been decremented to zero, all data has been transmitted, the communication logic proceeds to logic block 744 whereupon then the CRCH and CRCL is sent and the 9th bit is again cleared. Subsequently thereto, at logic block 746, the communication logic waits for a response from the MMP within the 30 to 500 micro-seconds response. The communication logic proceeds to logic block 748 to check to see if the response has been received in time. If the response is not received in time, the communication logic proceeds to logic block 750 where at an abort transmission is performed and the error recorded. The communication logic then proceeds to logic block 734 to a transmit end is executed.

If a response is received in time, the communication logic proceeds from logic block 748 to logic block 754 where a check is performed to see if the 9th bit is cleared. If the 9th bit is not cleared, the communication routine proceeds to logic block 750 and therefrom to logic block 734. If the 9th bit of the response has been cleared, the logic routine proceeds to logic 756 where a check is performed to see if the receive message contains an acknowledgement message, if not the logic routine proceeds to logic block 750 and therefrom to logic block 734. If an acknowledgement is received, then an update is performed of the transmit sequence number in the memory bit at logic block 758, therefrom the logic routines proceeds to logic block 760 whereupon a notification routine is performed to the WOW control program that the transmission has been finished and logic is returned to the ready 130.

Figure 15B:
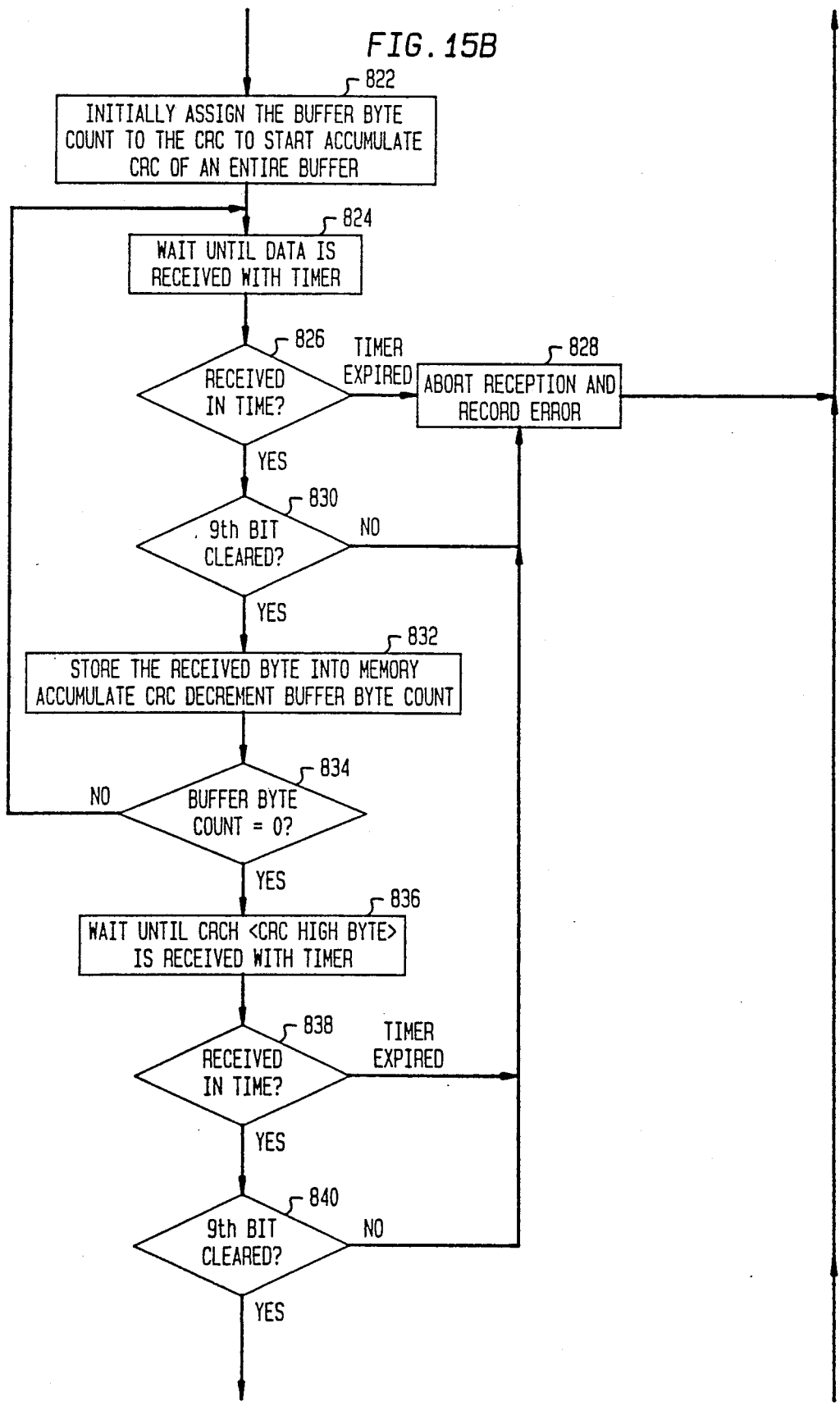
Figure 15C:
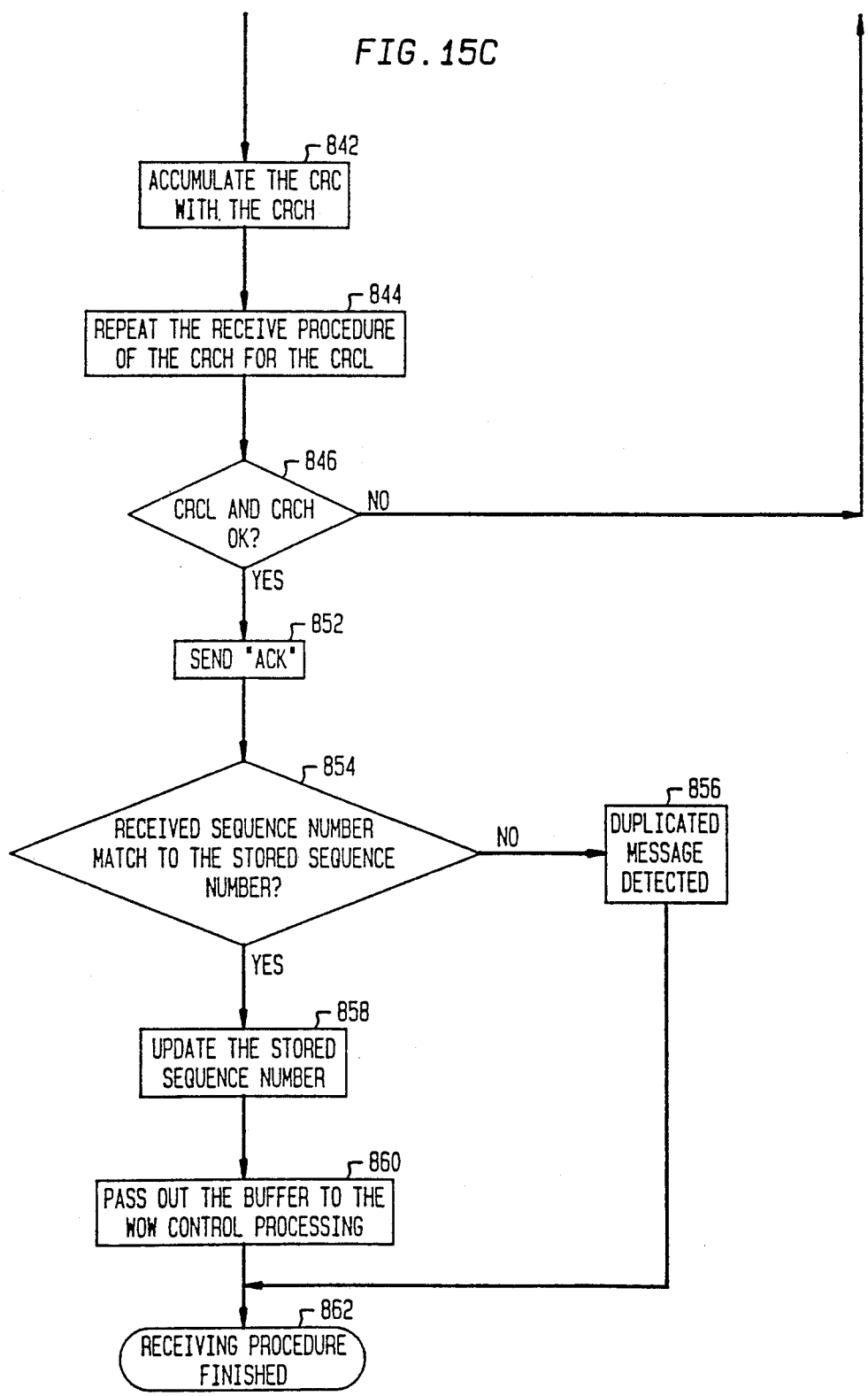

Referring to FIGS. 15A, 15B, and 15C, the WOW control program stands ready to receive any message with the 9th bit set at logic block 800. Any received address-command message is checked at logic block 801. If the received message is a communication link establish command, the WOW communication logic proceeds to logic block 802 where at the communication link is established and the sequence numbers are reset. Thereafter, the logic proceeds to logic block 864 for an end execution. If the received message is a NO establishment message, the logic proceeds to logic block 803, where the address-command is checked. If the message is not addressed to the WOW, the logic proceeds to logic 864. If the message is addressed to the WOW, the logic proceeds to logic block 804 to check if the link has been established. If the link has not been established, a link error message is sent to the MMP at logic block 805 and the logic proceeds to logic block 864.

If the link has been established, the logic proceeds to logic block 806 where the availability of the WOW receiving buffer is checked. If the buffer is not available, a buffer not available message is sent to the MMP at logic block 807 and the logic proceeds to logic block 864. If the buffer is available, a buffer available message is sent to the MMP at logic block 809 and the WOW stands ready to receive the data message byte count at logic block 810.

The communication logic then proceeds to logic block 814 whereupon a check is performed to see if a response is received in time. If the time has expired, the communication logic routine proceeds to logic block 816 where an abort routine is executed and the error recorded. The routine then proceeds to the ready at logic block 800. If the response is received in time at logic block 814, the communication logic proceeds to logic block 818 where a check is performed to see if the buffer byte count 9th bit is clear in the received message. If the 9th bit is not clear, the communication logic routine proceeds from logic block 818 to logic block 816 for an abort routine and then to the ready at logic block 800. If the 9th bit is cleared of the receive message, then the communication routine proceeds from logic block 818 to logic block 820 where a check of the buffer to see if the buffer byte count is within range. If the buffer count is not within range, again the routine proceeds to logic block 816 and therefrom to the ready at logic block 800. If the buffer byte count is within the proper range, then the routine proceeds from logic block 820 to logic block 822. At this point, the WOW receive logic, logic blocks 824 through logic blocks 862 is identical to the afore-described logic blocks 224 through logic blocks 262.

APPENDIX

The following applications, filed contemporaneously with the present application, are related to the subject matter of the present application, and the contents thereof are incorporated by reference herein:

| U.S. Pat. OR Ser. No. | INVENTOR(S) | TITLE |
| --- | --- | --- |
| 07/921,094 | Robert Tolmie | THICKNESS MEASURING APPARATUS |
| 4,930,441 | Robert Tolmie | FLAP MOISTENING SYSTEM |
| 4,873,941 | Kevin O'Dea | ENVELOPE FLAP MOISTENER |
| 5,007,371 | Kevin O'Dea Norm Bergman Peter Digiulio Donald Dolan James Vanderpool | CONTROL SYSTEM FOR MOISTENER |
| 07,291,093 | Ralph K. Rand John O'Brien | TILTED DECK MAIL HANDLING MACHINE |
| 4,924,106 | Robert Tolmie | ENVELOPE FLAP PROFILING APPARATUS |
| 4,887,976 | Robert Tolmie | DRIVER CIRCUITRY FOR MULTIPLE SENSORS |
| 07/291,035 | Danilo Buan Patrick Murphy | INKING MODULE AND INK PUMP THEREOF |
| 4,922,085 | Hugh Dannat Carl Miller | MAILING MACHINE TAPE MODULE AND TAPE DRIVE THEREOF |
| 4,935,078 | Norm Bergman | HIGH THROUGHPUT MAILING MACHINE |

-continued

| U.S. Pat. OR Ser. No. | INVENTOR(S) | TITLE |
|---|---|---|
| | Donald Dolan<br>Peter Digliulio<br>Mort Silverberg | TIMING |
| 4,924,804 | Kevin O'Dea<br>Donald Dolan<br>Norm Bergman | NOZZLE CONTROL SYSTEM FOR MOISTENER |
| 4,945,831 | Danilo Buan<br>Arny Eventor | INK TRAY DRIVE |
| 4,955,483 | Kevin O'Dea<br>Frank McDermott | MAIL HANDLING MACHINE WITH MIS-SEALED ENVELOPE DETECTOR |
| 4,909,499 | John O'Brien<br>Russell Holbrook | MAIL SINGULATING APPARATUS |
| 4,931,712 | Peter C. DiGiulio<br>Norman J. Bergman<br>Edilberto I. Salazar | MULTIPLE CHANNEL SERVO CONFIGURATION |
| 4,930,764 | Russell Holbrook<br>Walt Kulpa<br>James Morabito | FRONT END FEEDER |
| 07/921,036 | Terrence M. Doeberl<br>Ralph K. Rand<br>Larry S. Payne<br>Kazutoshi Fujimoto<br>William C. Monday | POWER STACKING APPARATUS |
| 07/291,478 | Danilo Buan<br>Bettie Ryberg<br>Jerome Jackson | INK TRAY |
| 07/291,484 | Terrence M. Doeberl<br>Ralph K. Rand<br>Larry S. Payne<br>Kazutoshi Fujimoto<br>William C. Monday | CODE BREAKER MECHANISM FOR STACKING APPARATUS |
| 4,958,782 | Hugh Dannat<br>Thomas Alesi<br>Walt Kulpa | MAILING MACHINE TAPE MODULE AND REELED TAPE SUPPLY THEREOF |
| 5,007,370 | Hugh Dannat | MAILING MACHINE TAPE MODULE AND TAPE TAKE-UP AND MOISTENING SYSTEM THEREOF |
| 07/291,466 | Hugh Dannat | MAILING MACHINE TAPE MODULE AND TAPE MODULE AND TAPE CUTTER THEREOF |
| 4,953,842 | Robert Tolmie<br>Donald Dolan | MAILING THICKNESS MEASURING APPARATUS |
| 5,003,538 | David Lee<br>Peter C. Digiulio | COMMUNICATION NETWORK AND PROTOCOL FOR REAL-TIME CONTROL OF MAILING MACHINE |
| 4,924,805 | Kevin O'Dea | PUMP SYSTEM FOR MOISTENER NOZZLE |
| 07/291,470 | Hugh Dannat | SPRING CLUTCH DEVICE |
| 07/291,481 | Thomas Alesi<br>Hugh Dannat | ROLLED SHEET OR STRIP MATERIAL SUPPLY SYSTEM |
| 4,911,268 | Walt Kulpa | TORQUE OR FORCE LINEARIZING DEVICE |
| 07/291,461 | Norm Bergman | CONTROL SYSTEM FOR NOZZLE POSITIONING MOTOR |
| 07/291,462 | Joe Abellana<br>Danilo Duan | REMOVABLE POSTAGE METER HAVING AN INDICIA COVER AND LOCKING DEVICE THEREOF |

What is claimed is:

1. A communication network, comprising:
a first, second, third and fourth controller node;
each of said controller nodes respectively having a transmit and receive pin and a processor means for generating data message at said transmit pin and receiving data messages received at said receive pin, said transmit pin of said first node in line communication with the receive pin of said second and third nodes and the transmit pin of said fourth node having said receive pin of said first node in line communication with said transmit pin of said second and third node and the receive pin of said fourth pin;
said processor means being programmable to respond to and generate data message bytes, each data byte having a start bit, eight data bits, a ninth programmably settable bit and one stop bit;
said processor means being further programmable to respond only to a unique address-command data message byte, said address-command byte having said ninth settable bit set, said processor means to then generate in response to said address-command byte a reply message byte with the ninth bit not set, said processor to then receive a message count byte followed uninterrupted by said data message bytes, said count byte and said data message bytes having the ninth bit not set, said processor upon receiving a complete data message conforming to the received count of said count by to then generate an acknowledgement byte;
said processor means of said first and second controller being further programmable to generate a unique address-command data message byte, said address-command byte having said settable bit set, said processor means to then respond to a reply message byte, said reply message to have said ninth bit not set, said processor to then transmit a message count byte followed uninterrupted by the data message bytes, said count byte and said data message bytes having the ninth bit not set, said processor to then receive an acknowledgement byte indicating whether the received message was error free;

said processor means of said third controller node being further programmable to generate a data message byte only in response to a data message from said first node, said processor means to then generate a message count byte followed uninterrupted by a data message byte, said count byte and said data message bytes having the ninth bit not set, said processor to then receive an acknowledgement byte indicating whether the received message was error free.

2. A communication network as claimed in claim 1, further comprising:

said processor of said second node further programmable to abort said transmission and wait for a predetermined amount of time and subsequent thereto attempt said transmission upon receiving a reply byte with the ninth bit set.

3. A process controller node as claimed in claim 1, wherein said processor means further comprises:

error message detection means for detecting whether said data bytes received are error free such that should said data bytes contain an error said processor to generate a negative acknowledgement byte or should said data bytes contain no errors said processor to generate a positive acknowledgement byte.

4. A processor controller node as claimed in claim 1, wherein said error message detection means comprises:

said message count byte containing a sequence number, said processor being programmed to calculate a cyclic redundancy checksum as a function of the data bytes and compare said cyclic redundancy checksum with a checksum calculated as a function of said sequence number such that should said checksums match said data message is error free, should said checksums not match said data message contains a error.

* * * * *